(12) United States Patent
Fujishima et al.

(10) Patent No.: US 8,447,311 B2
(45) Date of Patent: May 21, 2013

(54) RADIO COMMUNICATIONS SYSTEM

(75) Inventors: Kenzaburo Fujishima, Kokubunji (JP); May Takada, Koganei (JP); Katsuhiko Tsunehara, Hachioji (JP); Satoshi Tamaki, Kokubunji (JP); Shinya Sasaki, Koganei (JP); Go Ono, Musashino (JP); Koki Uwano, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 411 days.

(21) Appl. No.: 12/710,663

(22) Filed: Feb. 23, 2010

(65) Prior Publication Data

US 2010/0234035 A1 Sep. 16, 2010

(30) Foreign Application Priority Data

Mar. 10, 2009 (JP) ................................. 2009-057044

(51) Int. Cl.
*H04W 72/00* (2009.01)
(52) U.S. Cl.
USPC ........................................................ 455/450
(58) Field of Classification Search
USPC ................. 375/222, 132, 316, 295, 130, 268,
375/240.26; 455/444, 554.1, 67.13, 75, 404.1,
455/62, 69, 509, 450; 370/313, 330, 345,
370/252, 342, 315, 343
See application file for complete search history.

(56) References Cited

U.S. PATENT DOCUMENTS

| 7,599,660 | B2 | 10/2009 | Fujishima | |
|---|---|---|---|---|
| 2007/0232238 | A1* | 10/2007 | Kawasaki | 455/69 |
| 2007/0280340 | A1* | 12/2007 | Hwang et al. | 375/222 |
| 2008/0170601 | A1* | 7/2008 | Fails et al. | 375/132 |
| 2009/0011711 | A1* | 1/2009 | Kawasaki et al. | 455/62 |
| 2009/0059836 | A1* | 3/2009 | Hamilton | 370/313 |
| 2010/0035562 | A1* | 2/2010 | Alberth et al. | 455/75 |

FOREIGN PATENT DOCUMENTS

| CN | 1825991 A | 8/2006 |
|---|---|---|
| JP | 2007-228213 A | 9/2007 |

OTHER PUBLICATIONS

3GPP TSG RAN, Physical Channels and Modulation, Release 8, 3GPP TS 36.211 V8.4.0, pp. 41-73, Sep. 2008.
3GPP2, Physical Layer Standard for CDMA 2000 Spread Spectrum Systems Release A, 3GPP2 C.S0002-A, Version 6.0, pp. 3-22-3-34, Feb. 2002.
L. Mailaender, Indoor Network MIMO Performance with Regularized Zero-Forcing Transmission, IEEE ISSSTA 2008, pp. 129-132, Aug. 2008.
NTT DoCoMo, Inter-cell Radio Resource Management for Heterogeneous Network, 3GPP TSG RAN WG1 Meeting #54, R1-083019, Aug. 18-22, 2008.

(Continued)

*Primary Examiner* — Kiet Doan
(74) *Attorney, Agent, or Firm* — Mattingly & Malur, PC

(57) ABSTRACT

A radio communications system includes at least one terminal communication unit having one antenna that conducts a radio communication with a plurality of terminals; and at least one baseband modem that generates and decrypts a data signal, a cell being configured by at least one of the antenna, wherein the baseband modem divides a radio frequency band used for the radio communication into two or more subbands, generates and decrypts the data signal specific to each of the divided subbands, and allocates the data signal specific to the subband to the terminal communication unit, and wherein the terminal communication unit receives the data signal specific to the subband generated by the baseband modem, and forms the cell of each the subband by the data signal specific to the received subband.

19 Claims, 45 Drawing Sheets

OTHER PUBLICATIONS

CPRI, Common Public Radio Interface (CPRI); Interface Specification, Version 4.0, Jun. 30, 2008.

3GPP TSG RAN, Physical layer procedures (Release 8), 3GPP TS36.213 V8.4.0, pp. 33-36, Sep. 2008.

* cited by examiner

CELL CONFIGURATION IN SUBBAND #1

CELL CONFIGURATION IN SUBBAND #2

FIG. 10A

| CELL NO. | BASEBAND MODEM NO. | THE NUMBER OF TERMINALS | DOWNLINK COMMUNICATION DATA VOLUME [Gbit/hour] | UPLINK COMMUNICATION DATA VOLUME [Gbit/hour] |
|---|---|---|---|---|
| 1 | 1 | 60 | 120 | 30 |
| 2 | 2 | 90 | 180 | 45 |
| 3 | 3 | 60 | 120 | 30 |
| 4 | 4 | 60 | 120 | 30 |
| 5 | 5 | 180 | 360 | 90 |
| 6 | 6 | 60 | 120 | 30 |
| 7 | 7 | 60 | 120 | 30 |
| 8 | 8 | 90 | 180 | 45 |
| 9 | 9 | 60 | 120 | 30 |

FIG. 10B

| BASEBAND MODEM NO. | CELL NO. | STATE |
|---|---|---|
| 1 | 1 | ACTIVE |
| 2 | 2 | ACTIVE |
| 3 | 3 | ACTIVE |
| 4 | 4 | ACTIVE |
| 5 | 5 | ACTIVE |
| 6 | 6 | ACTIVE |
| 7 | 7 | ACTIVE |
| 8 | 8 | ACTIVE |
| 9 | 9 | ACTIVE |

FIG. 13A

| BASEBAND MODEM NO. | CELL NO. | STATE |
|---|---|---|
| 1 | 1 | ACTIVE |
| 2 | 2 | ACTIVE |
| 3 | 3 | ACTIVE |
| 4 | 4 | ACTIVE |
| 5 | 5 | ACTIVE |
| 6 | 6 | ACTIVE |
| 7 | 7 | ACTIVE |
| 8 | 8 | ACTIVE |
| 9 | 9 | ACTIVE |

FIG. 13B

| BASEBAND MODEM NO. | CELL NO. | STATE | |
|---|---|---|---|
| 1 | 1, 3, 4, 6 | ACTIVE | ··· THE NUMBER OF TERMINALS 240 |
| 2 | 2, 8 | ACTIVE | ··· THE NUMBER OF TERMINALS 180 |
| 3 | — | INACTIVE | |
| 4 | — | INACTIVE | |
| 5 | 5 | ACTIVE | ··· THE NUMBER OF TERMINALS 180 |
| 6 | — | INACTIVE | |
| 7 | 7, 9 | ACTIVE | ··· THE NUMBER OF TERMINALS 120 |
| 8 | — | INACTIVE | |
| 9 | — | INACTIVE | |

FIG. 14A

| | CELL ID | | | | | | | | |
|---|---|---|---|---|---|---|---|---|---|
| | 1 | 2 | 3 | 4 | 5 | 6 | 7 | 8 | 9 |
| 1 | ○ | × | × | × | × | × | × | × | × |
| 2 | × | ○ | × | × | × | × | × | × | × |
| 3 | × | × | ○ | × | × | × | × | × | × |
| 4 | × | × | × | ○ | × | × | × | × | × |
| 5 | × | × | × | × | ○ | × | × | × | × |
| 6 | × | × | × | × | × | ○ | × | × | × |
| 7 | × | × | × | × | × | × | ○ | × | × |
| 8 | × | × | × | × | × | × | × | ○ | × |
| 9 | × | × | × | × | × | × | × | × | ○ |

(row labels: BASEBAND MODEM ID)

FIG. 14B

| | CELL ID | | | | | | | | |
|---|---|---|---|---|---|---|---|---|---|
| | 1 | 2 | 3 | 4 | 5 | 6 | 7 | 8 | 9 |
| 1 | ○ | × | ○ | ○ | × | ○ | × | × | × |
| 2 | × | ○ | × | × | × | × | × | ○ | × |
| 3 | × | × | × | × | × | × | × | × | × |
| 4 | × | × | × | × | × | × | × | × | × |
| 5 | × | × | × | × | ○ | × | × | × | × |
| 6 | × | × | × | × | × | × | × | × | × |
| 7 | × | × | × | × | × | × | ○ | × | ○ |
| 8 | × | × | × | × | × | × | × | × | × |
| 9 | × | × | × | × | × | × | × | × | × |

(row labels: BASEBAND MODEM ID)

FIG. 16A

| BASEBAND MODEM NO. | CELL NO. | STATE | |
|---|---|---|---|
| 1 | 1, 3, 4, 6 | ACTIVE | ··· THE NUMBER OF TERMINALS 240 |
| 2 | 2, 8 | ACTIVE | ··· THE NUMBER OF TERMINALS 180 |
| 3 | – | INACTIVE | |
| 4 | – | INACTIVE | |
| 5 | 5 | ACTIVE | ··· THE NUMBER OF TERMINALS 180 |
| 6 | – | INACTIVE | |
| 7 | 7, 9 | ACTIVE | ··· THE NUMBER OF TERMINALS 120 |
| 8 | – | INACTIVE | |
| 9 | – | INACTIVE | |

FIG. 16B

| BASEBAND MODEM NO. | CELL NO. | STATE | |
|---|---|---|---|
| 1 | 1, 3 | ACTIVE | ··· THE NUMBER OF TERMINALS 120 |
| 2 | 2, 8 | ACTIVE | ··· THE NUMBER OF TERMINALS 180 |
| 3 | 4, 6 | ACTIVE | ··· THE NUMBER OF TERMINALS 120 |
| 4 | – | INACTIVE | |
| 5 | 5 | ACTIVE | ··· THE NUMBER OF TERMINALS 180 |
| 6 | – | INACTIVE | |
| 7 | 7, 9 | ACTIVE | ··· THE NUMBER OF TERMINALS 120 |
| 8 | – | INACTIVE | |
| 9 | – | INACTIVE | |

FIG. 17A

| | CELL ID | | | | | | | | |
|---|---|---|---|---|---|---|---|---|---|
| | 1 | 2 | 3 | 4 | 5 | 6 | 7 | 8 | 9 |
| 1 | ○ | × | ○ | ○ | × | ○ | × | × | × |
| 2 | × | ○ | × | × | × | × | × | ○ | × |
| 3 | × | × | × | × | × | × | × | × | × |
| 4 | × | × | × | × | × | × | × | × | × |
| 5 | × | × | × | × | ○ | × | × | × | × |
| 6 | × | × | × | × | × | × | × | × | × |
| 7 | × | × | × | × | × | × | ○ | × | ○ |
| 8 | × | × | × | × | × | × | × | × | × |
| 9 | × | × | × | × | × | × | × | × | × |

(Row label: BASEBAND MODEM ID)

FIG. 17B

| | CELL ID | | | | | | | | |
|---|---|---|---|---|---|---|---|---|---|
| | 1 | 2 | 3 | 4 | 5 | 6 | 7 | 8 | 9 |
| 1 | ○ | × | ○ | × | × | × | × | × | × |
| 2 | × | ○ | × | × | × | × | × | ○ | × |
| 3 | × | × | × | ○ | × | ○ | × | × | × |
| 4 | × | × | × | × | × | × | × | × | × |
| 5 | × | × | × | × | ○ | × | × | × | × |
| 6 | × | × | × | × | × | × | × | × | × |
| 7 | × | × | × | × | × | × | ○ | × | ○ |
| 8 | × | × | × | × | × | × | × | × | × |
| 9 | × | × | × | × | × | × | × | × | × |

(Row label: BASEBAND MODEM ID)

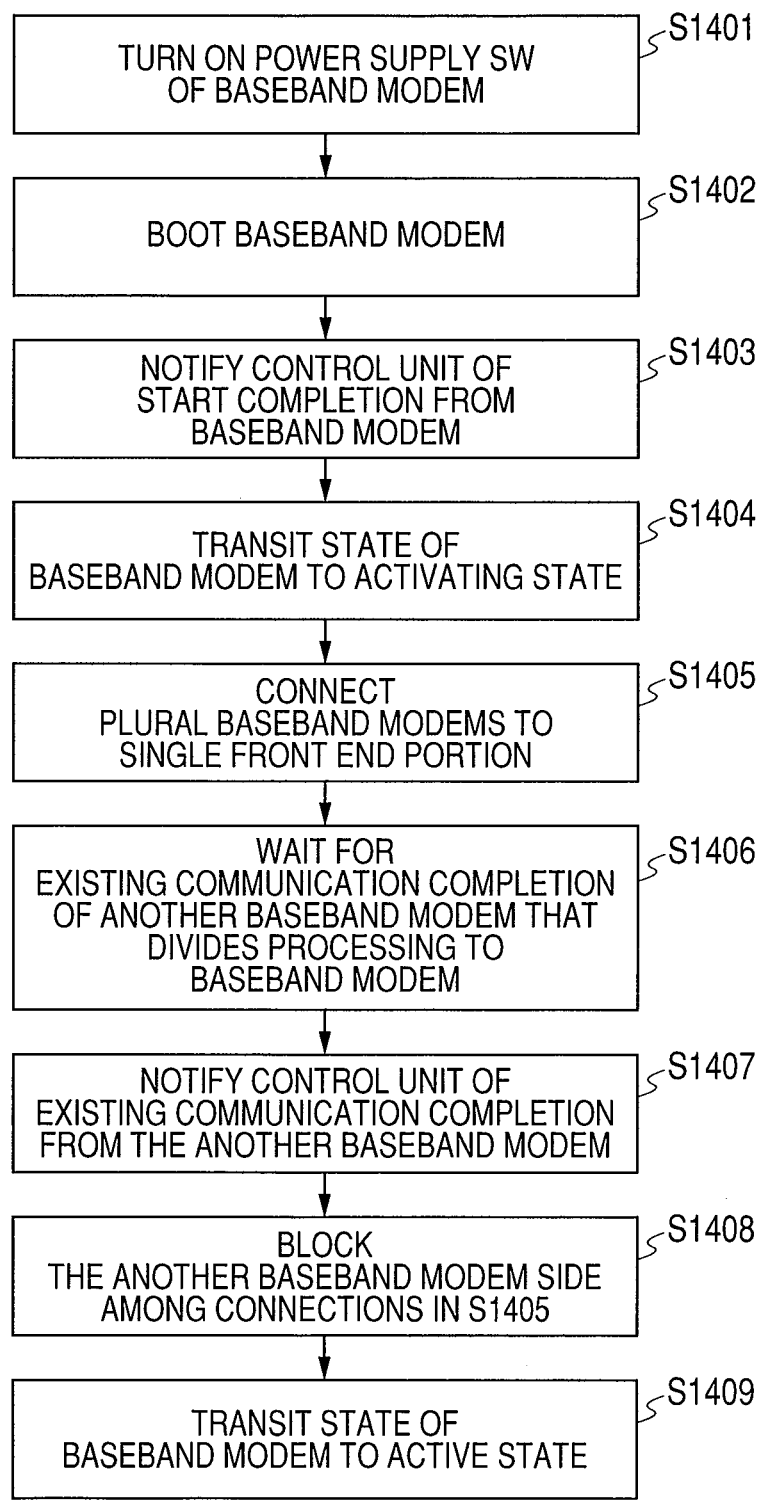

INSERT HEADER

RADIO COMMUNICATIONS SYSTEM

CLAIM OF PRIORITY

The present application claims priority from Japanese patent application JP 2009-057044 filed on Mar. 10, 2009, the content of which is hereby incorporated by reference into this application.

FIELD OF THE INVENTION

The present invention relates to a radio communications system, and more particularly to a radio communications system in which a plurality of base stations communicate with a terminal at the same frequency.

BACKGROUND OF THE INVENTION

With an aim to ensure data throughput of a terminal in a radio communication, it is essential to widen a radio band, and for the purpose of widening the band, research and development as well as standardization has been actively conducted on a multicarrier communication method.

In 3GPP ($3^{rd}$ Generation Partnership Project being a radio communication standards body, standardization of the specification called "LTE (Long Term Evolution)" has been advanced.

The LTE applies an OFDM (Orthogonal Frequency Division Multiplexing). The OFDM is a multicarrier communication method for generating a data signal in a frequency region, which is a method in which the data signal that has been converted into a data signal in a time domain by inverse Fourier transform is transmitted through a radio interval. A receive side in the LTE conducts compensation, demodulation and decoding of a channel variation after the data signal converted into the time domain has been returned to the data signal in the frequency domain by Fourier transform (for example, refer to 3GPP TSG RAN, "Physical Channels and Modulation (Release 8)", 3GPP TS 36.211 ver 8.4.0, pp. 41-73, 2008/9).

Also, there is also applied a communication method of spatially multiplexing and transmitting the data signal at the same time and at the same frequency, called "LTE MIMO (Multi Input Multi Output)". The MIMO is a method in which a transmitter station and a receiver station use a plurality of antennas, and data is spatially multiplexed and transmitted with the number of ranks of a propagation channel response formed between the transmitter and receiver antennas of the transmitter station and the receiver station as the upper limit. In the case of using the MIMO, the throughput of the terminal is improved as much as the data spatially multiplexed and transmitted, ideally times larger than the number of ranks (for example, refer to 3GPP TSG RAN, "Physical Channels and Modulation (Release 8)", 3GPP TS 36.211 ver 8.4.0, pp. 41-73, 2008/9).

Also, as the same multicarrier communication method as that of the OFDM, there is an MC-CDMA (Multi Carrier Code Division Multiple Access) standardized by 3GPP2 being the standards body. This method is a method in which CDMA signals in a narrow band are bundled together in a plurality of carriers to apparently realize a wideband communication, which is standardized as spreading rate 3 (for example, refer to 3GPP2, "Physical Layer Standard for CDMA 2000 Spread Spectrum Systems Release A", 3GPP2 C. S0002-A, Version 6.0, pp. 3-22-3-34, 2002/2).

In the radio communications system in which a plurality base stations communicate with terminals at the same frequency, there arises a problem of an intercell interference between the base stations. Also, there arises a problem that the communication quality of a terminal located on the boundary of cells produced by the base stations is degraded. To cope with those problems, a network-MIMO that conducts a communication by using the above-mentioned MIMO in cooperation with the plurality of base stations has been actively discussed (for example, refer to Laurence Mailaender, "Indoor Network MIMO Performance with Regularized Zero-Forcing Transmission", IEEE ISSSTA 2008, pp 0.124-128, 2008/8). The network-MIMO eliminates the intercell interference being the problem with the conventional cellular system.

A manner of solving the problem by the network-MIMO executes signal processing so as to deal with a signal of another cell, which has been conventionally an interference signal with respect to a terminal that communicates with an arbitrary base station, because a component of the signal that has been conventionally dominant interference becomes a component of the desired signal, the communication quality of the terminal that is particularly located at the cell boundary is remarkably improved. In this example, there is a need to cooperate signal processing with data flow between the base stations.

With an aim to facilitate cooperation between the base stations for the above-mentioned network-MIMO, a cellular system has been proposed as a system for an IMT-advanced generation by the standards body 3GPP (for example, refer to NTT DoCoMo, "Inter-cell Radio Resource Management for Heterogeneous Network", 3GPP TSG RAN WG1, R1-083019, 2008/8). FIG. 38 shows the overview picture of the cellular system disclosed in "Inter-cell Radio Resource Management for Heterogeneous Network".

FIG. 38 is an explanatory diagram showing the cellular system in which baseband modems are aggregated at one place in the related art.

The cellular system shown in FIG. 38 includes cells 101-1 and 101-2, terminals 102-1 to 102-6, baseband modems 103-1 and 103-2, optical fibers 104-1 and 104-3, and front end portions 105-1 to 105-8. The cells 101-1 and 101-2 are represented by a cell 101, the terminal 102-1 to 102-6 are represented by a terminal 102, the baseband modem 103-1 and 103-2 are represented by a baseband modem 103, the optical fiber 104-1 and 104-3 are represented by an optical fiber 104, and the front end portion 105-1 to 105-8 are represented by a front end portion 105.

The feature of the cellular system shown in FIG. 38 resides in that the baseband modems 103 that have been conventionally allocated to the cells 101 at 1:1 are aggregated at one place. The aggregation of the baseband modems 103 at one place enables the above-mentioned cooperation that has been conventionally conceived to require communication at a distant place to be implemented by inter-substrate communication or inter-chip communication within the same rack. As a result, it is conceivable to ease cooperation between the base stations for the network-MIMO.

SUMMARY OF THE INVENTION

An object of the present invention is to reduce interference between cells which induces degradation of the communication quality in a broadband radio communications system. In order to achieve this object, according to the present invention, the entire radio communication band is divided into a plurality of subbands, and the combination of antennas configuring the cell is changed for each of the subbands, to thereby generate at least one subband where each terminal is not located at the cell boundary. Also, loads among the baseband modems 103 are dispersed, and the number of baseband modems 103 in the entire system is reduced, to thereby reduce the power consumption in the entire radio communications system. That is, an object of the present invention is to compatibly eliminate the boundaries between the cells in the entire radio communications system, and reduce the power consumption in the entire system due to the load dispersion. A specific object of the present invention will be described below.

In FIG. 38, the baseband modem 103 and the front end portion 105 having the antenna are connected to each other through an optical fiber 104. The cell 101 is formed as an area in which a radio communication signal can be transmitted and received by the baseband modem 103. Each the terminal 102 conducts a radio communication with any baseband modem 103 that is radio-communicatable with the highest electric field intensity as a serving cell.

In the cellular system shown in FIG. 38, the terminal 102-3 is located at a boundary of the cell 101-1 and the cell 101-2 of two cells. Even if any cell 101 is the serving cell, the terminal 102-3 receives a signal having the same level as that of a desired signal from another cell 101, or a signal having the same or higher level interfered with the cell 101. As a result, the communication quality of the terminal 102-3 is remarkably degraded. A first object of the present invention is to provide a system that eliminates a cell boundary for the purpose of preventing the communication quality from being degraded.

As a related art, there is disclosed a radio communications system that disperses a load between the baseband modems 103 (for example, refer to JP-A-2007-228213). FIG. 39 shows the radio communications system disclosed in JP-A-2007-228213.

FIG. 39 is an explanatory diagram showing the radio communications system that disperses the load between the baseband modems 103.

The feature of the radio communications system shown in FIG. 39 resides in that a radio unit switch 106 and an inter-base station switch 107 are located between the baseband modem 103 and the front end portion 105. The radio unit switch 106 changes over a path for transmitting a signal between the baseband modem 103 and the front end portion 105 within the cell 101. The inter-base station switch 107 changes over a path for transmitting a signal over a plurality of cells 101.

The radio unit switch 106 and the inter-base station switch 107 change over a path for transmitting a signal according to the traffic distribution of the terminal 102. The total traffic volume of the entire radio communications system is proportional to the number of terminals 102 that receive the service of the radio communications system in the entire radio communications system, and not proportional to the number of cells 101. Accordingly, a load exerted on the baseband modems 103 is dispersed according to the distribution of the terminals, thereby enabling the maximum traffic throughput (a margin to a mean traffic throughput) of the baseband modem 103 to one cell 101 to be reduced, or the number of baseband modems 103 to be reduced. As a result, the scale of the baseband modem 103 in the entire radio communications system can be reduced, and an electric power consumed by the entire baseband modem 103 can be reduced.

However, the above-mentioned related art cannot compatibly realize the elimination of the cell boundaries in the entire radio communications system and a reduction in the power consumption of the entire system due to the load dispersion.

A typical example of the present invention will be described below. That is, there is provided a radio communications system, including: at least one terminal communication unit having one antenna that conducts a radio communication with a plurality of terminals; and at least one baseband modem that generates and decrypts a data signal, a cell being configured by at least one of the antenna, wherein the baseband modem divides a radio frequency band used for the radio communication into two or more subbands, generates and decrypts the data signal specific to each of the divided subbands, and allocates the data signal specific to the subband to the terminal communication unit, and wherein the terminal communication unit receives the data signal specific to the subband generated by the baseband modem, and forms the cell of each the subband by the data signal specific to the received subband.

According to an embodiment of the present invention, the cell boundary is eliminated, and the load is dispersed in the entire radio communications system.

BRIEF DESCRIPTION OF THE DRAWINGS

FIG. 10A is an explanatory diagram showing traffic information included in a control unit according to the first embodiment of the present invention;

FIG. 10B is an explanatory diagram showing a correspondence between the baseband modems included in the control unit and the cells configured by the front end portions, and the operating states of the baseband models according to the first embodiment of the present invention;

FIG. 13A is an explanatory diagram showing a relationship of the baseband modem, the front end portion, and the cell before processing shown in FIG. 12 according to the first embodiment of the present invention;

FIG. 13B is an explanatory diagram showing a relationship of the baseband modem, the front end portion, and the cell after processing shown in FIG. 12 according to the first embodiment of the present invention;

FIG. 14A is an explanatory diagram showing a state of a switch control by the modem-to-RRU switch in correspondence to the state of FIG. 13A according to the first embodiment of the present invention;

FIG. 14B is an explanatory diagram showing a state of a switch control by the modem-to-RRU switch in correspondence to the state of FIG. 13B according to the first embodiment of the present invention;

FIG. 16A is an explanatory diagram showing a relationship of the baseband modem, the front end portion, and the cell before processing shown in FIG. 15 according to the first embodiment of the present invention;

FIG. 16B is an explanatory diagram showing a relationship of the baseband modem, the front end portion, and the cell after processing shown in FIG. 15 according to the first embodiment of the present invention;

FIG. 17A is an explanatory diagram showing a state of a switch control by the modem-to-RRU switch in correspondence to the state of FIG. 16A according to the first embodiment of the present invention;

FIG. 17B is an explanatory diagram showing a state of a switch control by the modem-to-RRU switch in correspondence to the state of FIG. 16B according to the first embodiment of the present invention;

FIG. 23A is a flowchart showing a detailed process of starting the baseband modem according to the first embodiment of the present invention;

DETAILED DESCRIPTION OF THE PREFERRED EMBODIMENTS

Figure 1:
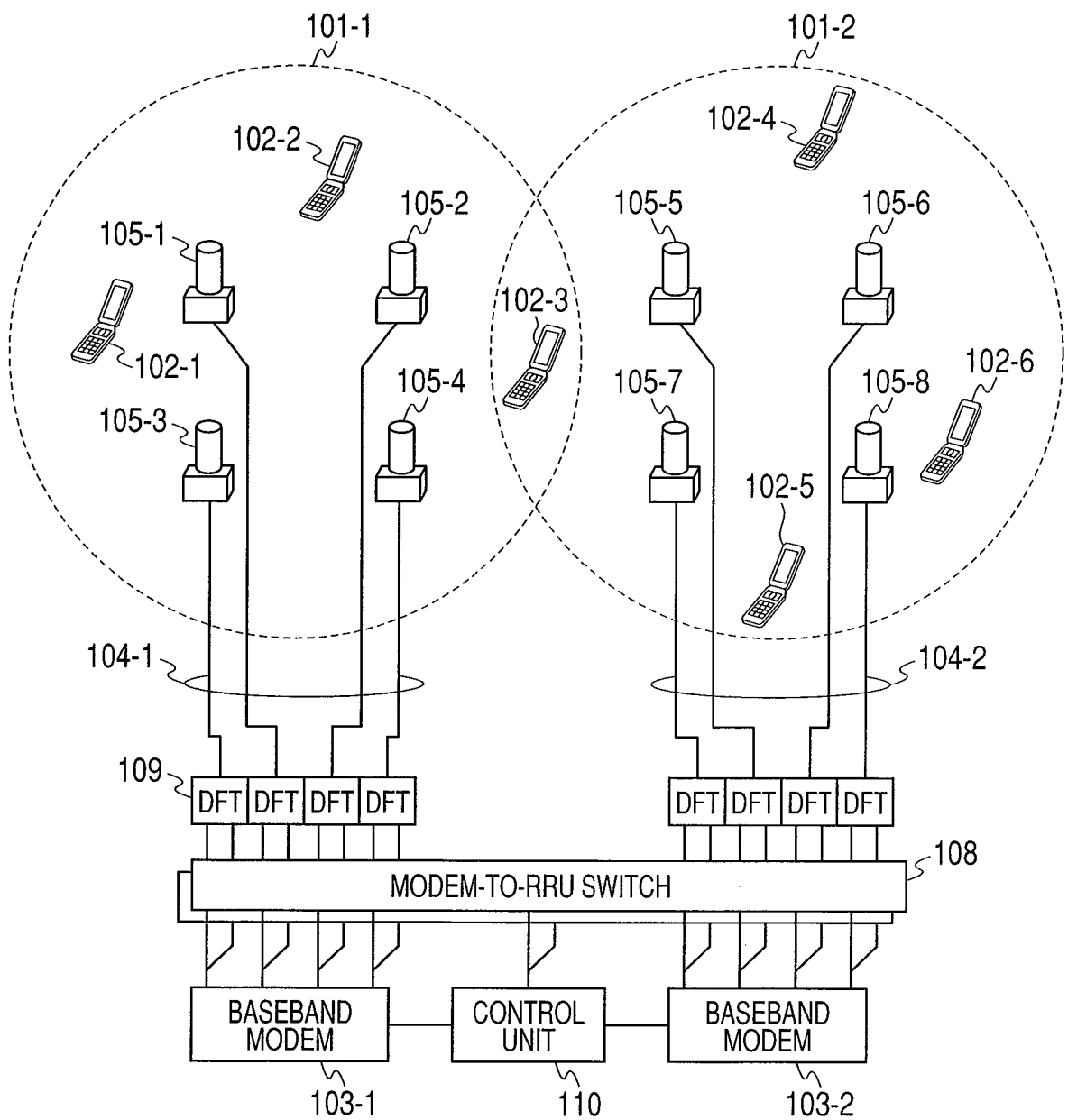
FIG. 1 is an explanatory diagram showing the configuration of a network system according to a first embodiment of the present invention.

FIG. 1 is an explanatory diagram showing the configuration of a network system according to a first embodiment of the present invention.

Figure 38:
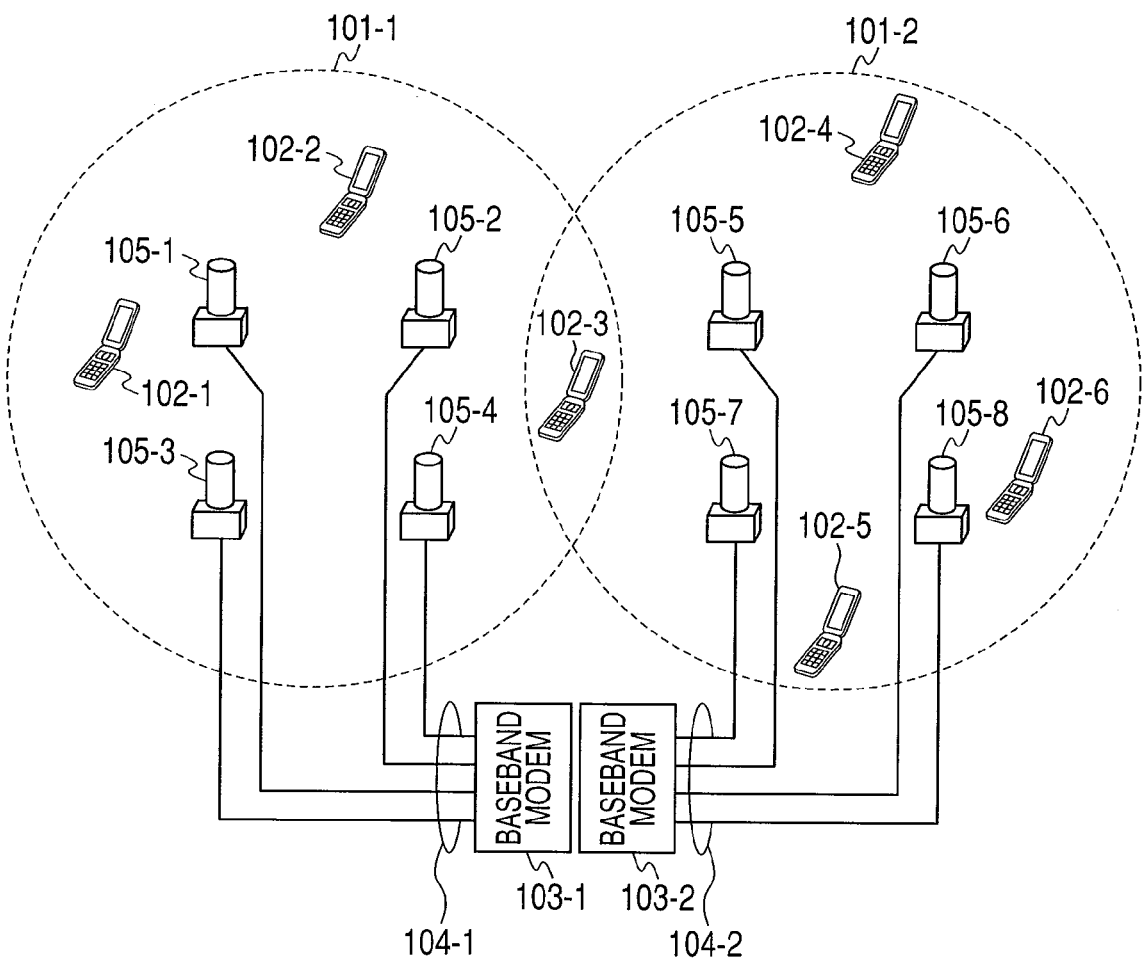
FIG. 38 is an explanatory diagram showing a cellular system in which the basebands are aggregated at one place in a related art.
Figure 39:
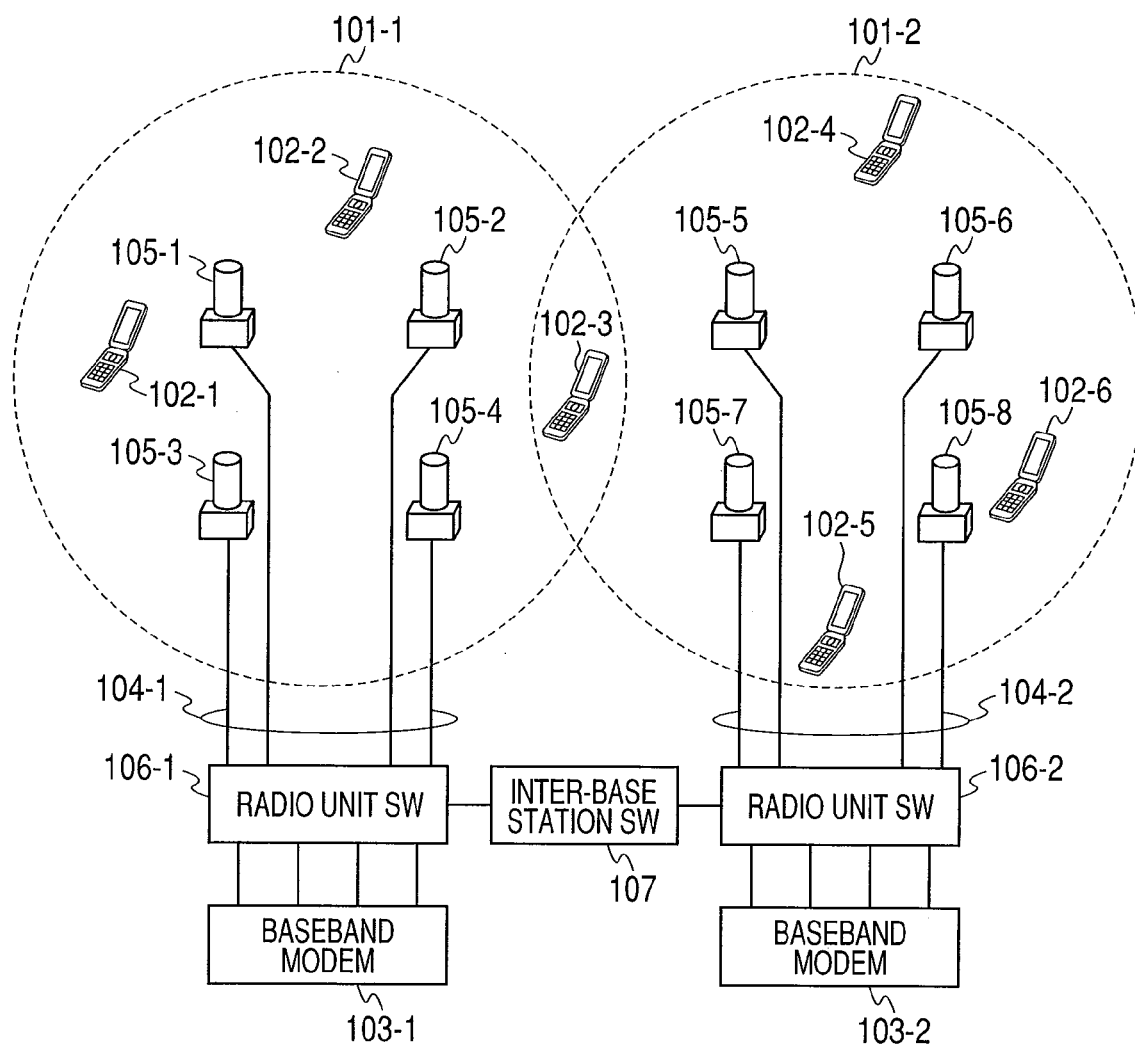
FIG. 39 is an explanatory diagram showing the radio communications system that disperses the load between the baseband modems in the related art.

Cells 101-1 and 101-2, terminals 102-1 to 102-6, baseband modems 103-1 and 103-2, optical fibers 104-1 and 104-3, and front end portions 105-1 to 105-8 shown in FIG. 1 are identical with those in FIG. 38 or 39. The network system shown in FIG. 1 includes a modem-to-RRU switch 108, a DFT processing unit 109, and a control unit 110.

The baseband modem 103 shown in FIG. 1 has respective input/output ports allocated to a plurality of antennas, and one or plural base station modems 103 are arranged in the network system. The baseband modem 103 communicates a baseband signal for each of the subbands between the baseband modem 103 and the modem-to-RRU switch 108 (RRU: Remote Radio Unit), and also communicates a data bit series with a core network. Also, the modem 103 transmits traffic information for changing over the modem-to-RRU switch 108 to the control unit 110. The baseband modem 103 is implemented by a logic circuit such as an ASIC or an FPGA. Also, the baseband modem 103 is implemented by a processor such as a DSP or a CPU depending on a required processing capacity.

The control unit 110 has a function of controlling the modem-to-RRU switch 108 for each of the subbands. More specifically, the control unit 110 receives traffic information from the baseband modem 103, and controls the modem-to-RRU switch 108 for each of the subbands according to the received traffic information. The control unit 110 is implemented by a logic circuit such as an ASIC or an FPGA, or a processor such as a DSP or a CPU. It is desirable that the control unit 110 is implemented by a processor such as a DSP which facilitates updating of a control algorithm.

The modem-to-RRU switch 108 has a function of changing over a route for transmitting a signal between an input/output port (antenna port) allocated to the respective antennas of the baseband modem 103 and the front end portion 105 for each of the subbands. The modem-to-RRU switch 108 is implemented by a logic circuit, an optical switch, or a mechanical switch such as a rotary switch. The modem-to-RRU switch 108 readily enables distribution and coupling of the signal to the plurality of antenna ports and the front end portion 105 by addition and subtraction. Also, it is desirable that the modem-to-RRU switch 108 is implemented by a logic circuit that is high in the degree of freedom of wiring.

The DFT processing unit 109 has a function of Fourier transform and inverse Fourier transform in the radio communications system using an OFDM (Orthogonal Frequency Division Multiplexing). The DFT processing unit 109 executes Fourier transform and inverse Fourier transform for each of the front end portions 105.

In the case of a downlink communication that conducts a communication from the DFT processing unit 109 toward the terminal 102, the DFT processing unit 109 combines input signals from the plurality of modem-to-RRU switches 108 to which the respective subbands are allocated together to generate a signal in a frequency domain for each of the OFDM symbols, and generates a downlink transmit signal in a time domain by inverse Fourier transform. In the case of an uplink communication that conducts a communication from the terminal 102 toward the DFT processing unit 109, the DFT processing unit 109 subjects an uplink receive signal in a time domain to Fourier transform, and transmits the signal in a frequency domain to the separate modem RRU switches 108 for each of the subbands. Because the Fourier transform and the inverse Fourier transform particularly require real time processing in the OFDM signal processing, it is desirable that the DFT processing unit 109 is implemented by the logic circuit.

The DFT processing unit 109 and the front end portion 105 are connected to each other by the optical fiber 104. An optical modulator/demodulator and a photoelectric converter are disposed at both ends of the optical fiber 104. The optical fiber 104 transmits a baseband digital signal or a radio frequency analog signal.

The terminal of the optical fiber 104 is connected with the front end portion 105. The front end portion 105 has a function of transmitting and receiving the radio signal, but is different in the configuration depending on the kind of signal transmitted by the optical fiber 104. The front end portion 105 according to this embodiment includes a digital to analog converter (DAC), an analog to digital converter (ADC), an up converter for increasing the baseband signal up to the radio frequency band, a down converter that executes inverse conversion, a power amplifier and a low noise amplifier which are amplifiers, a duplexer having a filter for sharing the antenna in the uplink radio signal and the downlink radio signal, and an antenna.

Figure 2A:
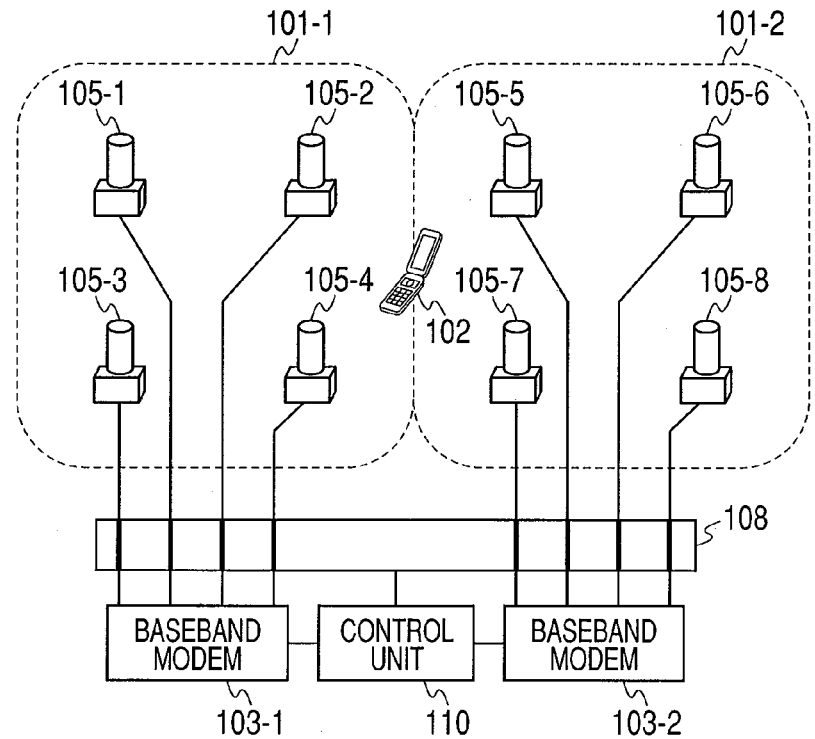
FIG. 2A is an explanatory diagram showing the effect of changing the configuration of the cell in each of the subbands according to the first embodiment of the present invention.
Figure 2B:
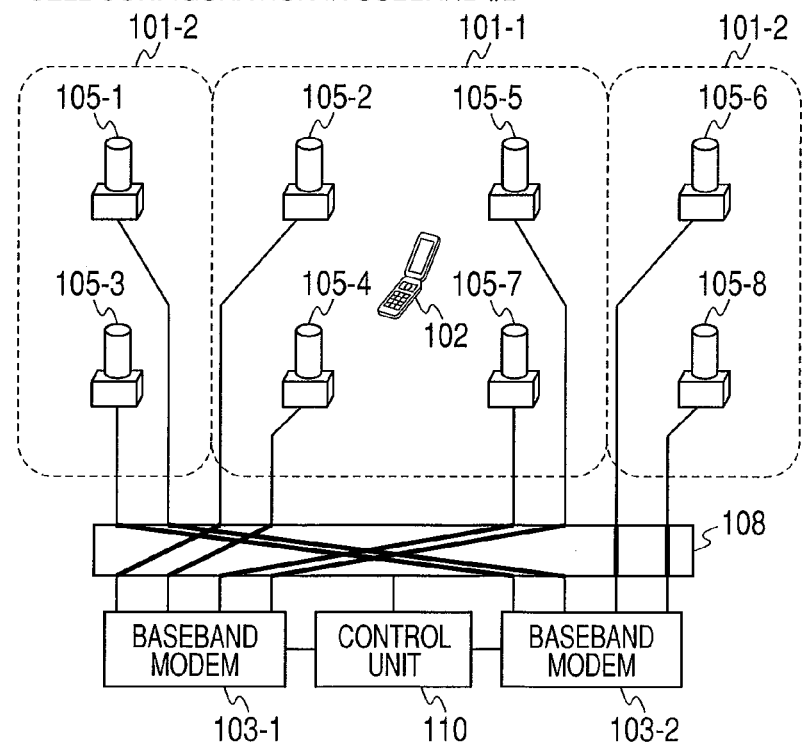
FIG. 2B is an explanatory diagram showing the effect of changing the configuration of the cell in each of the subbands according to the first embodiment of the present invention.

FIGS. 2A and 2B are explanatory diagrams showing the effect of changing the configuration of the cell 101 in each of the subbands according to the first embodiment of the present invention.

The configuration of the cell 101 in the subband is changed by changing over the connection by the aid of the switch 108 between the modem RRU.

In a subband #1 shown in FIG. 2A, the cell 101-1 and the cell 101-2 are formed by four front end portions 105 at the right and left sides, respectively. In the subband #1, the terminal 102 is located at a boundary of the cell 101-1 and the cell 101-2.

In a subband #2 shown in FIG. 2B, the modem-to-RRU switch 108 makes a connection different from the connection shown in FIG. 2A, to thereby form the cell 101-1 configured by four center front end portions 105, and the cell 101-2 configured by the four front end portions 10 in total, having two at each end.

When the modem-to-RRU switch 108 changes over the connection, in the subband #1 shown in FIG. 2A, the terminal 102 that has been located at the boundary of the cells 101 (hereinafter referred to as "cell boundary") is located at the center of the cell 101 in the subband #2 of FIG. 2B. The terminal 102 selects the subband in which the largest communication capacity can be ensured by the terminal 102, and feeds a CQI (Channel Quality Indicator) to the base station in order to ensure a communication channel with the base station (for example, refer to 3GPP TSG RAN, "Physical layer procedures (Release 8)", 3GPP TS36.213 ver. 8.4.0, pp. 34-35, 2008/9). By feeding back the CQI, the terminal 102 selects not the subband in which the terminal 102 is located at the cell boundary, but the subband in which the terminal 102 is not located at the cell boundary. That is, the cell boundary is eliminated without affecting the radio communication protocol, thereby enabling interference between the cells 101 to be reduced.

As described above, in the case of using the radio communications system in which the configuration of the cell 101 is changed for each of the subbands, there arises a new problem from which the conventional radio communications system has not suffered. The new problem is that the cells 101 in all of the subbands are formed, and how a synchronization signal for controlling and a common control signal within the cell are generated, and transmitted and received.

The simplest solution to the new problem is to transmit the synchronization signal and the common control signal for each of the subbands. However, when the synchronization signal and the common control signal are transmitted for each of the subbands, the overheads of the synchronization signal and the common control signal increase in proportion to the number of subbands. As a result, the efficiency of transmitting data in the system is deteriorated.

Accordingly, in this embodiment, the radio frequency band is divided into an anchor subband for transmitting the synchronization signal common to the cells 101 and the common control signal, and other subbands. Then, the cells of the anchor subband according to this embodiment are partially overlapped with the cells of the other subbands. That is, the anchor subband and the respective other subbands partially share the front end portions 105. With this arrangement, all of the subband according to this embodiment can form the cells 101 by using the synchronization and the common control signal which have been transmitted by the anchor subband.

Figure 3:
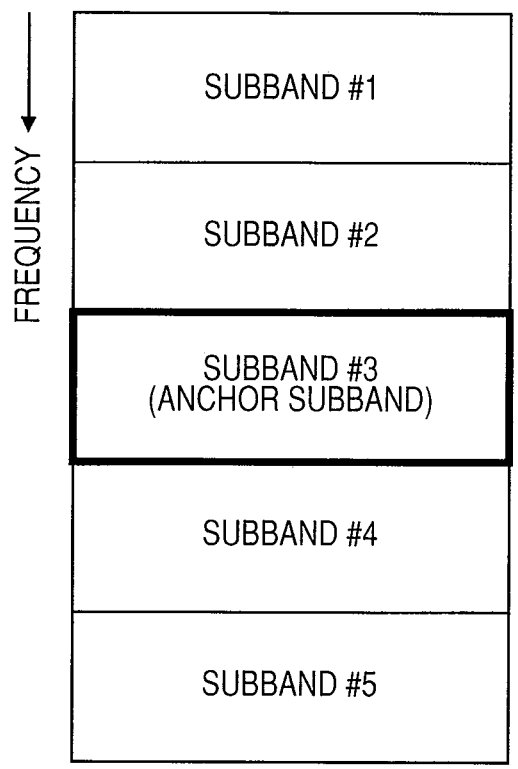
FIG. 3 is an explanatory diagram showing an anchor band and other subbands according to the first embodiment of the present invention.

FIG. 3 is an explanatory diagram showing an anchor band and other subbands according to the first embodiment of the present invention.

Among all of the subbands shown in FIG. 3 (divided into five subbands in this embodiment), the subband #3 is defined as the anchor subband. The subband #3 transmits the synchronization signal and the common control signal. The subbands #1, #2, #4, and #5 partially share the front end portions 105 with the subband #3 which is the anchor subband.

The synchronization signal and the common control signal may be transmitted by the anchor subband, or may be transmitted by using the anchor symbol.

Figure 40:
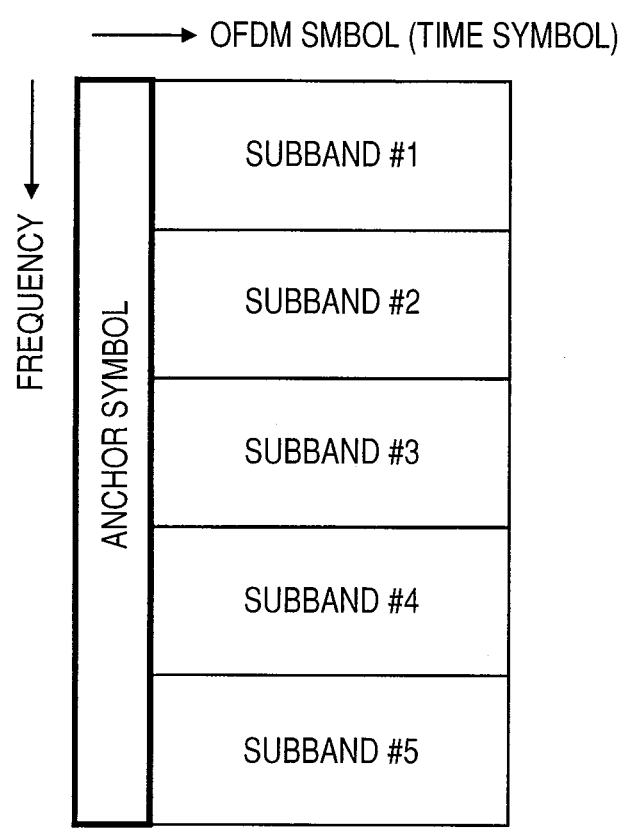
FIG. 40 is an explanatory diagram showing the subbands in an anchor symbol and other symbols according to the first embodiment of the present invention.

FIG. 40 is an explanatory diagram showing the subbands in an anchor symbol and other symbols according to the first embodiment of the present invention.

In the subbands shown in FIG. 3, a specific subband is defined as the anchor subband. On other hand, in the subbands shown in FIG. 40, a specific time symbol (OFDM symbol) is defined as the anchor symbol, and the synchronization signal and the common control signal are transmitted over all of the subbands by the aid of the anchor symbol.

Figure 4A:
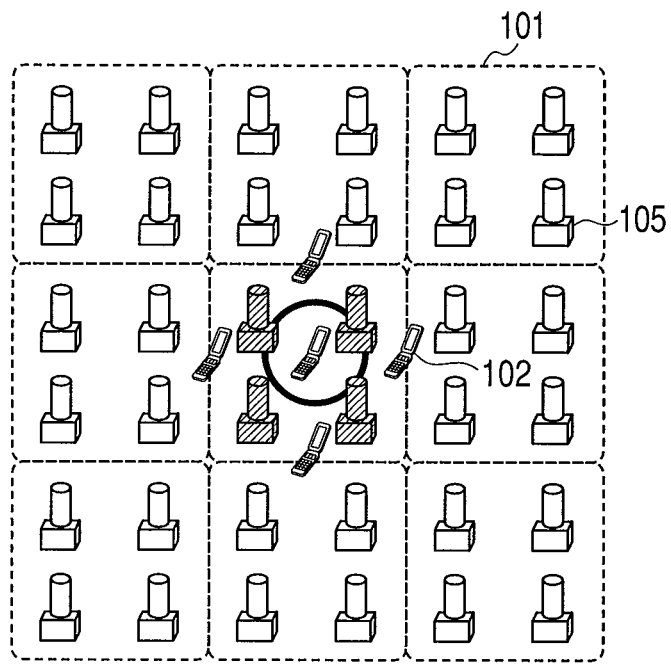
FIG. 4A is an explanatory diagram showing the configuration of a cell in the anchor band according to the first embodiment of the present invention.
Figure 4B:
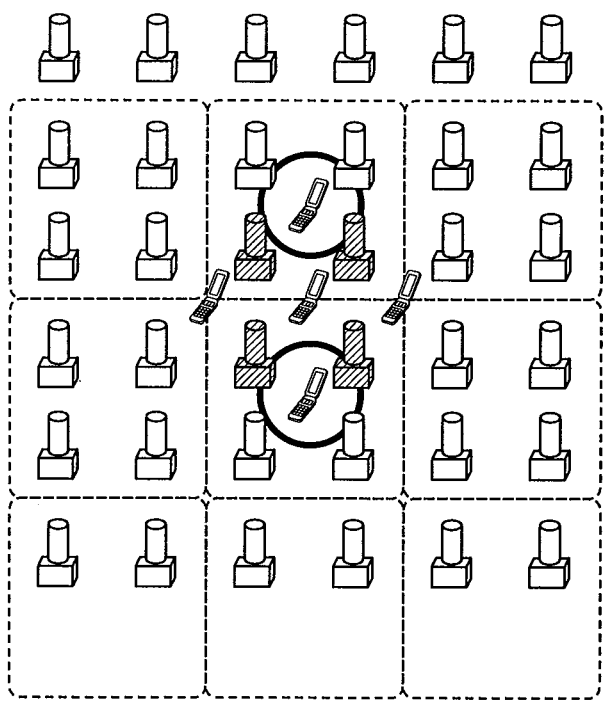
FIG. 4B is an explanatory diagram showing the configuration of a cell in another subband according to the first embodiment of the present invention.

FIGS. 4A and 4B are explanatory diagrams showing the configuration of the cells 101 in the anchor band and the other subbands.

In FIGS. 4A and 4B, the cells 101, the front end portions 105, and the terminals 102 are shown, but other devices are omitted from those figures.

FIG. 4A is an explanatory diagram showing the configuration of the cells 101 in the anchor subband according to the first embodiment of the present invention.

For the purpose of identifying the correspondence of the cells 101 and the front end portions 105 shown in FIGS. 4A and 4B, the front end portions 105 forming the center cell 101 are blacked out. In the following description, the center cell 101 that is located in the center of the cells 101 is called "center cell", and the cell 101 that is located at the upper side of the center cell is called "upper cell".

The same synchronization signals and the same common control signals are transmitted from the front end portions 105 within the cells 101 at the same time. FIG. 4A shows five terminals 102 that can most strongly receive the synchronization signal and the common control signal from at least one of the front end portions 105 in the center cell 101. In this anchor subband, only the center terminal among the five terminals 102 is located at a place other than the cell boundary, and the other four terminals 102 are located at the cell boundary. In the following description, the five terminals 102 are called "upper terminal", "left terminal", "center terminal", "right terminal", and "lower terminal" on the basis of an arrangement shown in FIG. 4A, respectively.

FIG. 4B is an explanatory diagram showing the configuration of the cells 101 in the other subbands according to the first embodiment of the present invention.

The cells 101 shown in FIG. 4B result from offsetting downward all of the cells 101 in FIG. 4A as compared with the cells 101 shown in FIG. 4A. The center cell 101 is also offset downward. Among the five terminals 102, the lower terminal 102 is located in the center of the center cell 101, and instead, the center terminal 102 that has been located in the center of the center cell in the anchor subband shown in FIG. 4A is located at the cell boundary. With this arrangement, the upper terminal 102 and the lower terminal 102 are not located at the cell boundary in at least one subband.

Also, among those five terminals 102, the upper terminal 102 is not also located at the cell boundary, and is located not in the center of the center cell 101, but in the center of the upper cell 101. Because the upper terminal 102 is located in the center of the upper cell 101, in the case where the upper terminal 102 sets the center cell 101 as the serving cell in synchronization with the center cell 101 in the anchor subband, the upper terminal 102 gets far from all of the front end portions 105 in the center cell 101. As a result, the communication quality of the upper terminal in the subject subband is degraded. In order to improve the communication quality of the upper terminal, there is a need to additionally generate a subband in which all of the cells 101 shown in FIG. 4A are offset upward.

The same is applied to the right terminal 102 and the left terminal 102, and it is necessary that all of the cells 101 are offset to the right side and the left side.

Figure 41:
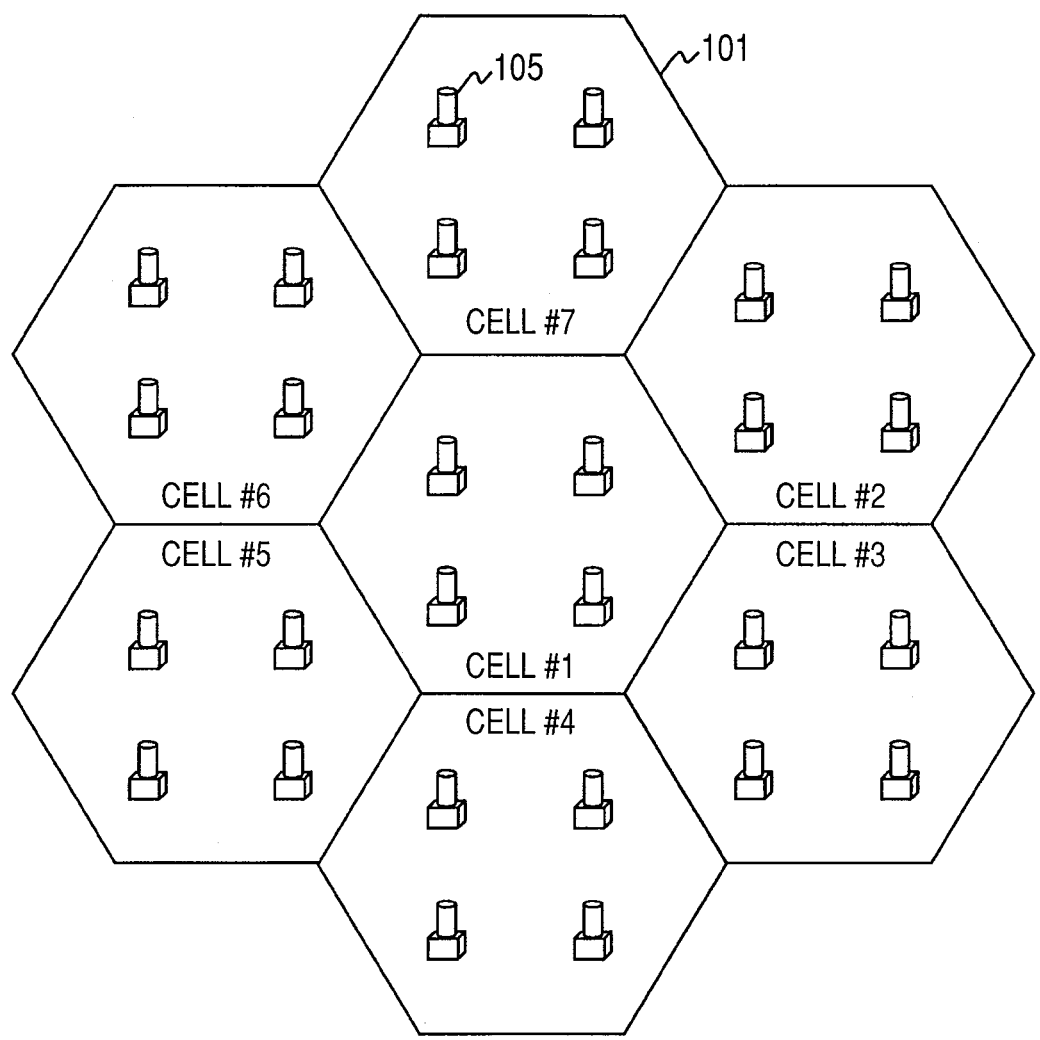
FIG. 41 is an explanatory diagram showing the configuration of the cells in the anchor symbol according to the first embodiment of the present invention.
Figure 42:
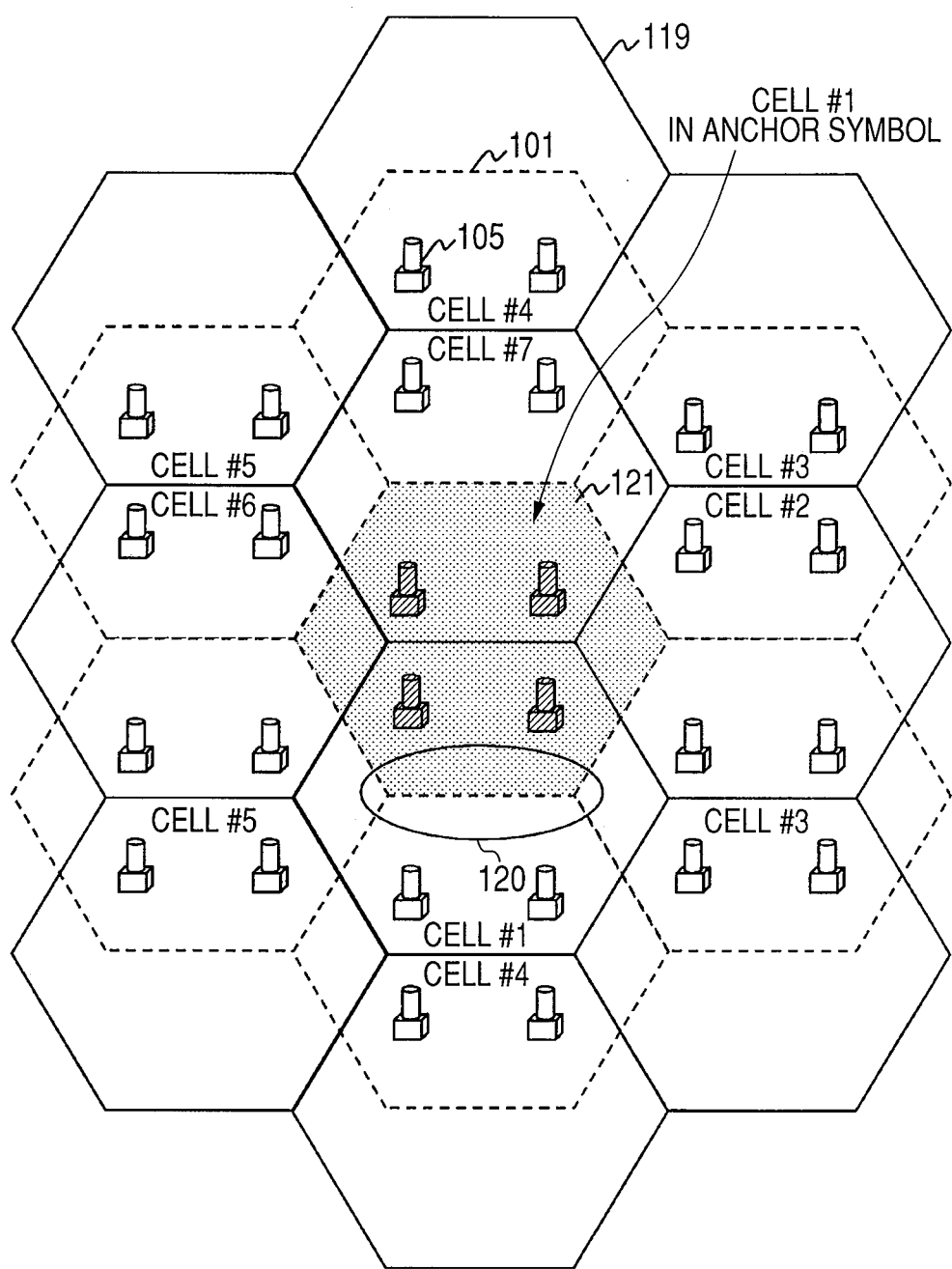
FIG. 42 is an explanatory diagram showing the configuration of the cells in the subbands other than the anchor symbol according to the first embodiment of the present invention.

FIGS. 41 and 42 show the configuration of the cells 101 in the subband of the anchor symbol and the subband other than the anchor symbol.

FIG. 41 is an explanatory diagram showing the configuration of the cells 101 in the anchor symbol according to the first embodiment of the present invention.

In the configuration of the cells 101 shown in FIG. 41, 28 front end portions 105 are arranged, and each of the cells 101 is formed by four front end portions 105. Each of the cells 101 is an area formed by a set of four front end portions including a front end portion 105 being an originating source of the signal that can be most strongly received by the terminals 102. The respective cells 101 shown in FIG. 41 are indicated by cell #1 to cell #7.

It is assumed that the configuration of the cells 101 according to this embodiment is hexagonal. One set of front end portions 105 that form one cell 101 is connected to one baseband modem 103. The synchronization signal and the common control signal are generated by each of the baseband modems 103, independently, and the same synchronization signal and the same common control signal are transmitted by all of the front end portions 105 which are connected to the baseband modem 103.

The terminal 102 that exists within the cell 101 can most strongly receive the synchronization signal and the common control signal the cell 101 which are transmitted from the front end portions 105 that form the cell 101. For that reason, it can be assumed that the terminal 102 is put under the control of the baseband modem 103 that is connected to the front end portions 105. Accordingly, a data signal to the terminal 102 and a reference signal related to the data signal are also generated by the baseband modem 103. However, the combination of the front end portions 105 that form the cell 101 is different depending on the respective subbands.

FIG. 42 is an explanatory diagram showing the configuration of the cells 101 in the subbands other than the anchor symbol according to the first embodiment of the present invention.

The configuration of the cells 101 shown in FIG. 42 shows an example of the configuration of the cells 101 in the subband for transmitting the data signal or the like, and a time symbol (OFDM symbol).

Offset cells 119 obtained by totally offsetting the cells 101 for transmitting the synchronization signal and the common control signal shown in FIG. 41 downward are generated for transmitting the data signal and the reference signal related to the data signal.

A solid line shown in FIG. 42 indicates the offset cells 119, and a broken line indicates the cells 101 for transmitting the synchronization signal and the common control signal. Also, the respective cells 101 in the offset cells 119 shown in FIG. 42 are expressed by the corresponding cells #1 to cell #7 shown in FIG. 41.

The offset cells 119 shown in FIG. 42 are formed by parts of the subbands among a plurality of subbands that exist in the entire system. The offset cells 119 of the other subbands are generated by changing the offset direction of the cells 101 to upper or left directions.

The cell #1 that generates the synchronization signal and the common control signal shown in FIG. 41 is a cell 121 shown in FIG. 42. The terminal 102 that exists in the cell 121 is put under the control of the baseband modem 103 that transmits the synchronization signal and the common control signal from the blacked-out front end portions 105 (the front end portions 105 that forms the cell #1 in FIG. 41).

In the cells 119 shown in FIG. 42, the baseband modem 103 is connected to the front end portions 105 different from the front end portions 105 connected to the cells 101 shown in FIG. 41. That is, the front end portions 105 that are connected to the baseband modem 103 are the front end portions 105 that form the cell #1 of the cells 119 shown in FIG. 42. More specifically, the front end portions 105 are two blacked-out front end portion 105, and two whitened front end portion 105 located therebelow.

As the configuration of the cells 101 shown in FIG. 42, in the subband that forms the cells 101 and the offset cells 119 shown in FIG. 42 and the time symbol, the communication quality of the terminal 102 that is located at a boundary 120 below the cell 121 is improved.

One of the reasons that the communication quality of the terminal 102 that is located at the boundary 120 is improved is that all of the front end portions 105 around the terminal 102 which is located at the boundary 120 transmit a signal desired by the terminal 102 to the terminal 102. Also, another reason is that because the front end portion 105 that transmits an interference signal to the terminal 102 is located far from the terminal 102, a signal power to interference signal power ratio SIR (signal to interference ratio) of the terminal 102 that is located at the boundary 120 is improved.

On the other hand, it is extremely difficult that the terminal 102 that is located at the upper side of the cell 121 communicates with the baseband modem 103 that manages the front end portions 105 which form the cell #1 in the offset cells 119. That is, this is because all of the front end portions 105 around the terminal 102 that is located at the upper side of the cell 121 transmit the interference signal to the terminal 102 that is located at the upper side of the cell 121.

The originating source of the interference signal to the terminal 102 located at the upper side of the cell 121 is the baseband modem 103 that manages the front end portion 105 which forms the cell #7 in the offset cell 119. The baseband modem 103 that manages the front end portion 105 which forms the cell #1 in the offset cell 119 is located far from the terminal 102 that is located at the upper side of the cell 121. In the case where the terminal 102 located at the upper side of the cell 121 conducts a data communication with the baseband modem 103 that forms the cell #1, there is a need to newly generate a subband that totally shifts the offset cells 119 to the upper side with respect to the cell 101.

The cells #3, #4, and #5 shown in FIG. 42 are turned up because the offset cells 119 are offset downward with respect to the cell 101.

Figure 5:
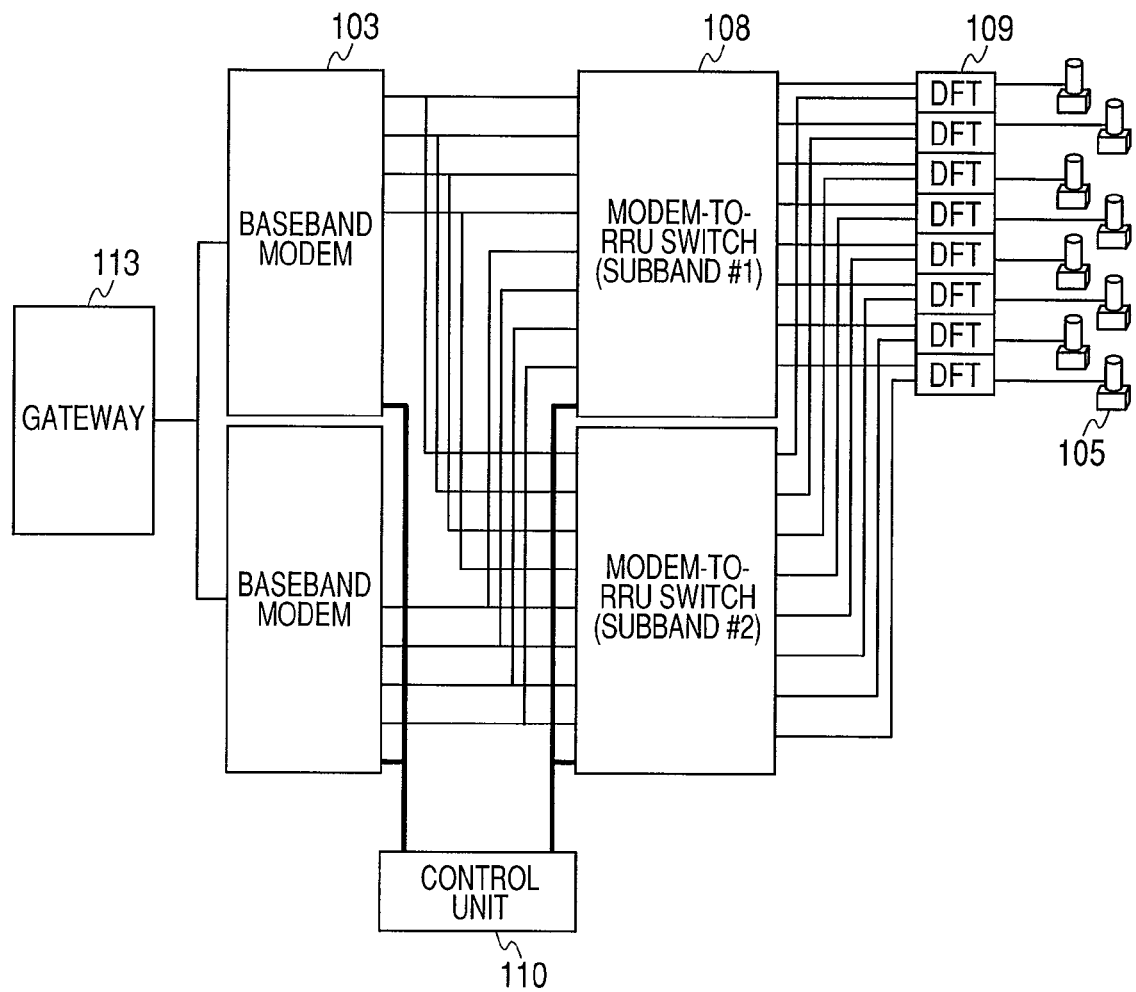
FIG. 5 is an explanatory diagram showing the configuration of a network device according to the first embodiment of the present invention.

FIG. 5 is an explanatory diagram showing the configuration of a network device according to the first embodiment of the present invention.

The baseband modem 103 has a plurality of antenna ports (four antenna ports in FIG. 5), and transmits and receives a baseband digital signal between the baseband modem 103 and the modem-to-RRU switch 108 by the antenna ports. Also, the baseband modem 103 transmits and receives an IP packetized data signal with respect to a gateway 113. The baseband modem 103 converts the IP packet and the baseband digital signal.

The baseband modem 103 conducts a data communication with the separate modem-to-RRU switches 108 for each of the subbands. For that reason, switching for each of the subbands between the baseband modem 103 and the modem-to-RRU switch 108 is additionally required, and a device for controlling the switching is the control unit 110 that will be described later.

The gateway 113 is a terminating device of the network in the radio communications system, and converts protocol with respect to the core network.

The control unit 110 has a function of receiving information on the traffic distribution of the terminals 102 from one or plural baseband modems 103, and controlling the modem-to-RRU switch 108 for each of the subbands according to the received information on the traffic distribution. A method of receiving the information on the traffic distribution, and a method of generating information for controlling the switching will be described later.

The modem-to-RRU switch 108 has a function of changing over a route of transmitting the signals between the respective antenna ports of the baseband modem 103 and the respective front end portions 105 for each of the subbands. Also, the modem-to-RRU switch 108 copies the same baseband signal with respect to the plurality of front end portions 105, and combines the baseband signals from the plurality of front end portions 105 together. The modem-to-RRU switch 108 may be physically divided for each of the subbands, or may be physically mounted on each device, and logically divided in time.

The DFT processing unit 109 has a function of Fourier transform and inverse Fourier transform in the radio communications system using the OFDM. The DFT processing unit 109 conducts Fourier transform and inverse Fourier transform for each of the front end portions 105. In the case of the downlink communication, the DFT processing unit 109 combines the input signals from the plurality of modem-to-RRU switches 108 to which the respective subbands are allocated together to generate the signal in the frequency domain for each of the OFDM symbols, and generates the downlink transmit signal in the time domain by the inverse Fourier transform. In the case of the uplink communication, the DFT processing unit 109 subjects the uplink receive signal in the time domain to Fourier transform, and transmits the generated signal in the frequency domain to the separate modem-to-RRU switches 108 for each of the subbands.

The front end portions 105 each have a function of transmitting and receiving the radio signal, and are provided with an antenna for radio communication. The front end portions 105 are different in the configuration depending on the kind of the signal transmitted by the optical fiber 104. Each of the front end portions 105 according to this embodiment is configured to include a digital to analog converter (DAC), an analog to digital converter (ADC), an up converter for pulling up the baseband signal to a radio frequency band, a down converter for the inverse conversion, a power amplifier and a low noise amplifier which are amplifiers, a duplexer having a filter for sharing the antenna in the up radio signal and the down radio signal, and the antenna.

Figure 6A:
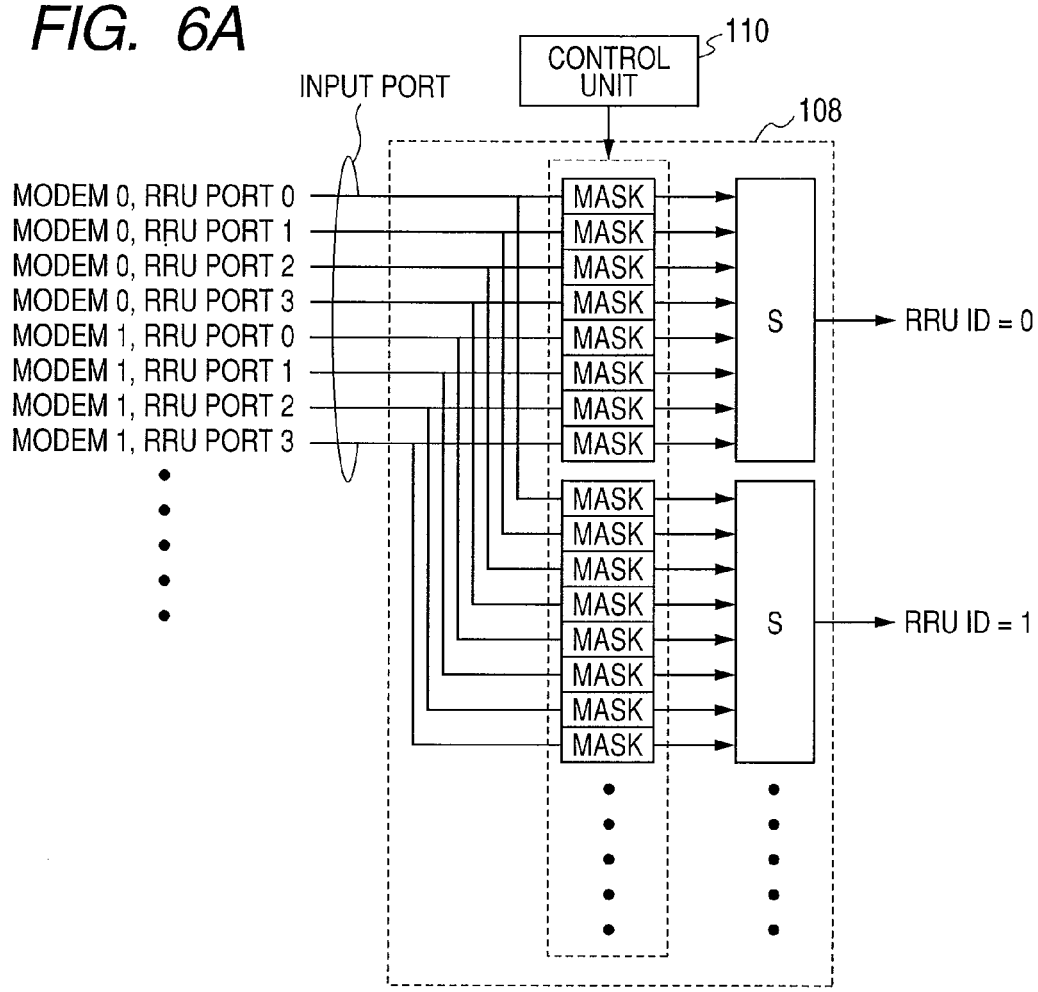
FIG. 6A is an explanatory diagram showing a modem-to-RRU switch according to the first embodiment of the present invention.

FIG. 6A is an explanatory diagram showing the switch 108 between the modem RRUs according to the first embodiment of the present invention.

The switch 108 between the modems RRU shown in FIG. 6A is implemented by a logic circuit.

The modem-to-RRU switch 108 first copies the input signals from the input ports by the number of output ports, respectively, and distributes the input signals to the output ports. Thereafter, the modem-to-RRU switch 108 subjects the distributed input signals to bit mask processing. The modem-to-RRU switch 108 conducts AND masking of all bits 1 on the input signal when allowing the input signal to pass therethrough, and conducts AND masking of all bits 0 on the input signal when allowing the input signal to pass therethrough. After masking for each of the output ports, the modem-to-RRU switch 108 adds the masked input signals by the number of all the input ports, and outputs the added signals.

The modem-to-RRU switches 108 are provided in the uplink communication and the downlink communication, separately. In the case of the downlink communication, the modem-to-RRU switch 108 has an input port connected to the respective antenna port outputs of the baseband modem 103, and an output port connected to the respective front end portions 105, as shown in FIG. 6A. Also, in the case of the uplink communication, the modem-to-RRU switch 108 has the input port connected to the respective front end portions 105, and the output port connected to the respective antenna port outputs of the baseband modem 103.

Figure 6B:
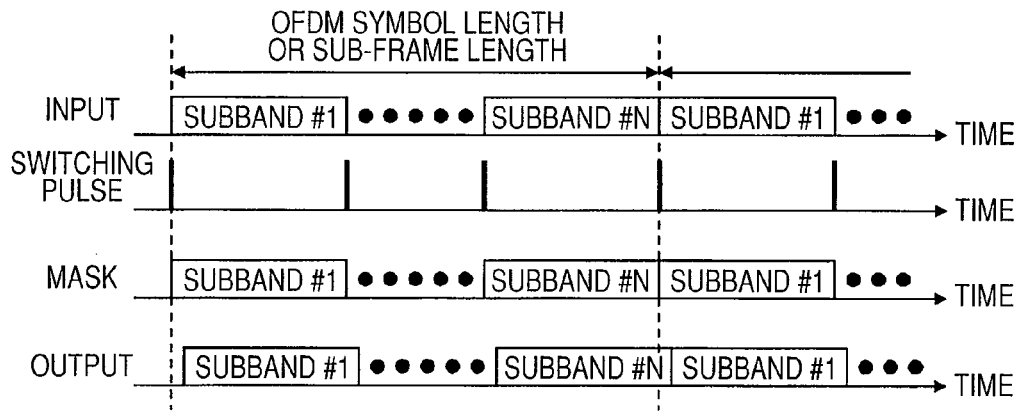
FIG. 6B is a timing chart for explaining a case in which the modem-to-RRU switch is shared by the subbands and physically put together according to the first embodiment of the present invention.

FIG. 6B is a timing chart for explaining a case in which the modem-to-RRU switch 108 is shared between the subbands and physically put together according to the first embodiment of the present invention.

The modem-to-RRU switch 108 receives the signals of the different subbands from the input port in order within a time interval for transmitting a signal having an OFDM symbol length, or a sub-frame length in the general multicarrier system OFDM. It is desirable that a pulse for changing over the switch is inserted at the input side of the modem-to-RRU switch 108. The control unit 110 records a mask pattern, which is switch changeover information, in a register disposed within the control unit 110 in advance, inserts the switch changeover pulse to the input side of the modem-to-RRU switch 108, and changes over the mask according to a timing of the switch changeover pulse. After the signal input to the modem-to-RRU switch 108 has been subjected to the mask processing, a signal is output from the output port with a delay as long as addition processing after the addition processing.

Figure 43:
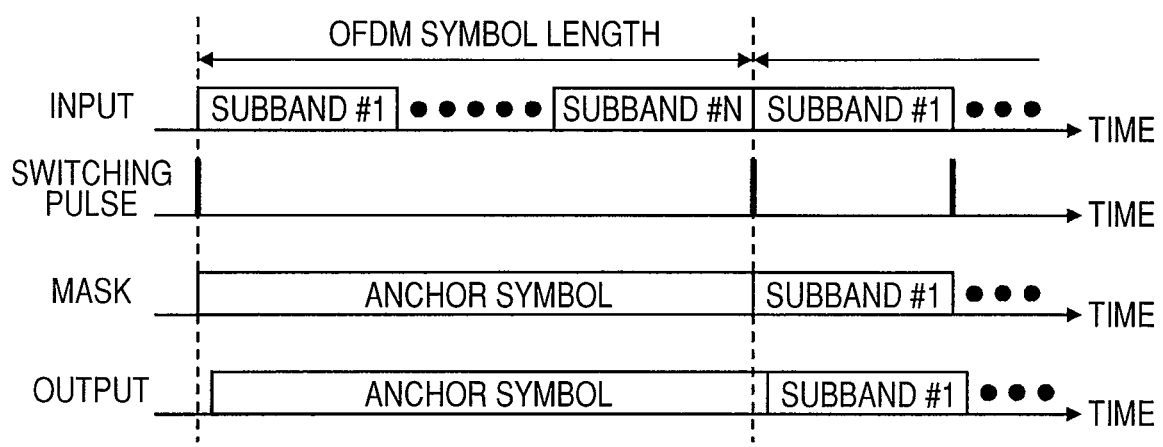
FIG. 43 is a timing chart for explaining the modem-to-RRU switch when the anchor symbol is used according to first embodiment of the present invention.

FIG. 43 is a timing chart for explaining the modem-to-RRU switch 108 when the anchor symbol is used according to first embodiment of the present invention.

Differently from the timing chart shown in FIG. 6B, in a timing chart in the case where the anchor symbol is used, the modem-to-RRU switch 108 is fixed over all of the subbands in the anchor symbol. The modem-to-RRU switch 108 is changed over for each of the subbands in the time symbol other than the anchor symbol as in FIG. 6B.

Figure 7:
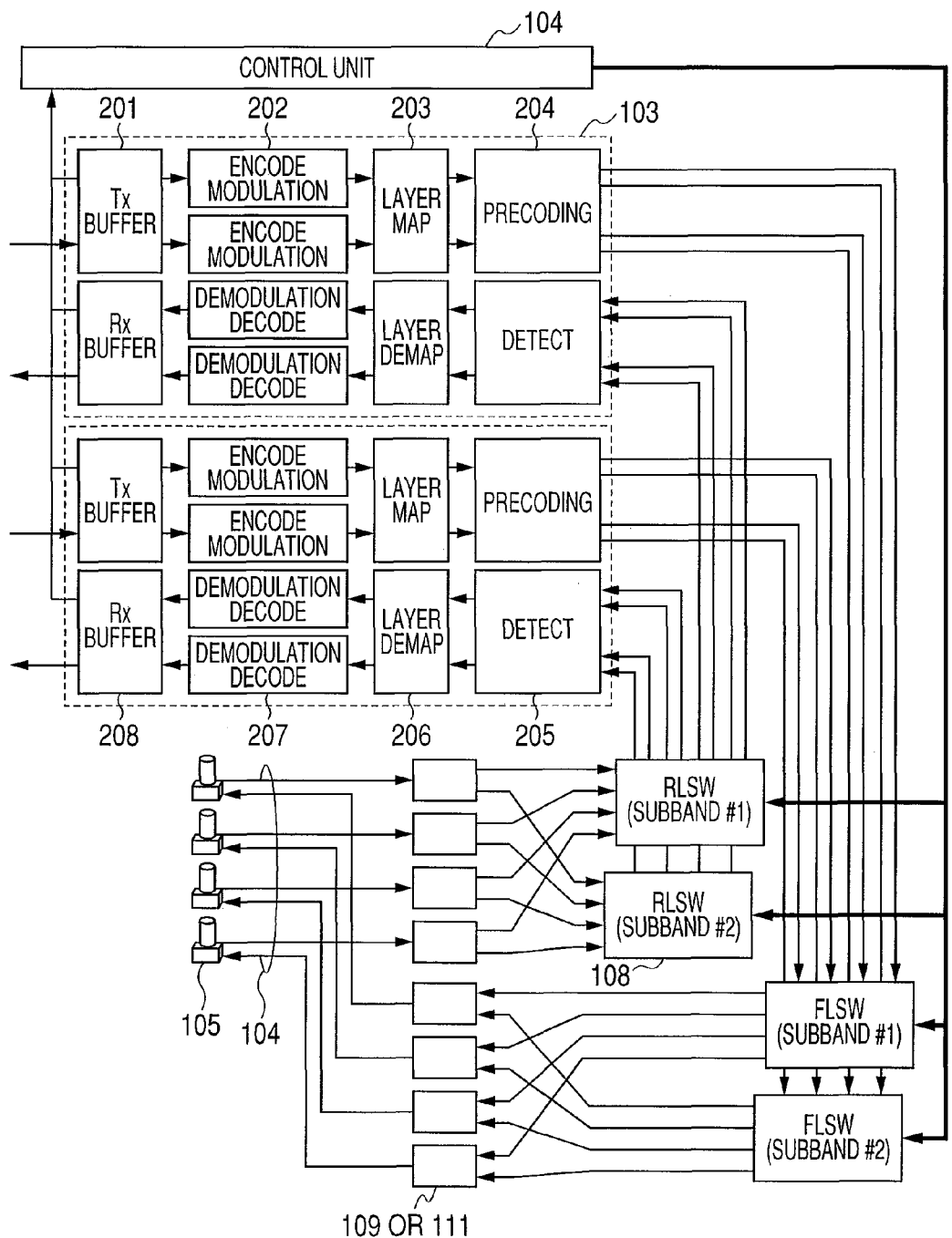
FIG. 7 is an explanatory diagram showing the detailed configuration of the network device according to the first embodiment of the present invention.

FIG. 7 is an explanatory diagram showing the detailed configuration of the network device according to the first embodiment of the present invention.

The baseband modem 103 includes a transmit buffer 201 that temporarily records the downlink transmit data, coding/modulation units 202 that each conduct coding and modulation for each of codewords, a layer mapping 203 that maps a primary modulation symbol being an output from the coding/modulation unit 202 into a signal for each of layers spatially superimposed by the same time and the same frequency, a precoder 204 that subjects a transmit signal vector including the transmit signal for each of the layers as a component to precoding matrix, a channel estimation unit 205 that estimates a reply of a radio propagation path from a reference signal known at the receive side included in the uplink receive data, and a layer demapping 206 that is inverse processing of the layer mapping 203, and demaps the receive signal for each of the layers into a codeword unit. The baseband modem 103 also includes demodulation/decoding units 207 that each conduct likelihood estimation on the basis of a Euclidean distance of a transmit symbol candidate generated from the channel estimation result and a receive point of the receive signal, and demodulate the transmit signal on the basis of the likelihood ratio, and a receive buffer 208 that temporarily stores the outputs of the demodulation/decoding units 207. The transmit buffer 201 and the receive buffer 208 each have a buffering function in the data communication with the gateway 113.

The output signals from the precoder 204 in the downlink communication are outputs for each of the antenna ports, and the output signals are input to the modem-to-RRU switch 108 from the other input ports. In the first embodiment shown in FIG. 7, the modem-to-RRU switch 108 is disposed for each of the subbands. In the case where one modem-to-RRU switch 108 is shared by the plurality of subbands as shown FIG. 6B, one modem-to-RRU switch 108 can be prepared for each of uplink and downlink.

The input signals to the channel estimation unit 205 of the uplink communication are output from the other output ports from the modem-to-RRU switch 108, respectively. The inputs to the modem-to-RRU switch 108 in the uplink communication are the receive signals from the front end portions 105. The channel estimation unit 205 receives the receive signals for the plurality of subbands. The receive signals for the plurality of subbands are stored once in a buffer within the channel estimation unit 205, and sequentially processed for each of the subbands. Alternatively, it is possible that a channel estimation circuit is disposed for each of the subbands, and the receive signals for all of the subbands are processed all together.

The front end portion 105 side of the modem-to-RRU switch 108 is equipped with DFT processing units 109 or multicarrier coupling/separation units 111 which will be described later, each having a function of coupling signals of the plural subbands together in the downlink communication, and separating the signals from each other in the uplink communication. The DFT processing units 109 or the multicarrier coupling/separation units 111, and the front end portions 105 are connected to each other by the optical fibers 104. Also, both ends of each optical fiber 104 are equipped with an optical modulator/demodulator and an electrical/optical converter. The optical fibers 104 may be disposed for each of the uplink communication and the downlink communication, or the optical fibers 104 may be shared by the uplink communication and the downlink communication.

Figure 8:
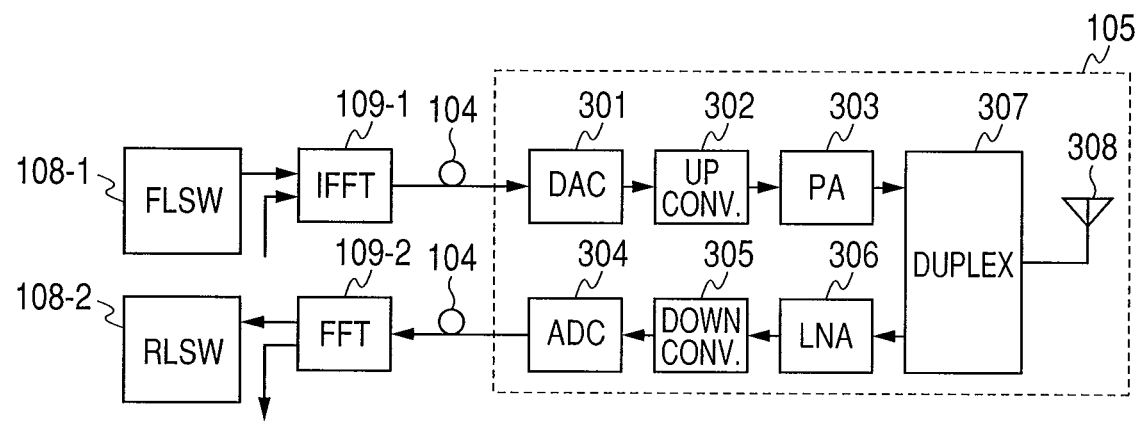
FIG. 8 is a block diagram showing a connection between the modem-to-RRU switch and the front end portion in the OFDM system according to the first embodiment of the present invention.

FIG. 8 is a block diagram showing a connection between the modem-to-RRU switch 108 and the front end portion 105 based on the OFDM system according to the first embodiment of the present invention.

The configuration shown in FIG. 8 is a configuration for transmitting the baseband digital signal through the optical fibers 104. This transmitting method is based on the communication standard called "CPRI (Common Public Radio Interface) (for example, refer to CPRI, "Common Public Radio Interface (CPRI) Interface Specification", Version 4.0, 2008/6).

The configuration shown in FIG. 8 includes a modem-to-RRU switch 108-1 for a downlink communication, a modem-to-RRU switch 108-2 for an uplink communication, an IFFT processing unit 109-1, an FFT processing unit 109-2, a digital to analog converter (DAC) 301, an analog to digital converter (ADC) 304, an up converter 302, a down converter 305, a power amplifier 303, a low noise amplifier 306, a duplexer 307, and an antenna 308.

The modem-to-RRU switch 108 is provided with the modem-to-RRU switch 108-1 for the downlink communication and the modem-to-RRU switch 108-2 for the uplink communication in each of the downlink communication and the uplink communication. The modem-to-RRU switch 108-1 for the downlink communication is connected to the IFFT processing unit 109-1 which is a downlink communication unit of the DFT processing unit 109. The modem-to-RRU switch 108-2 for the uplink communication is connected to the IFFT processing unit 109-2 which is an uplink communication unit of the DFT processing unit 109.

The IFFT processing unit 109-1 receives an input signal from the plural modem-to-RRU switches 108-1 for the downlink communication, subjects the received signal to inverse Fourier transform, and transmits the transformed signal to the DAC 301. The FFT processing unit 109-2 subjects an input signal received from the ADC 304 to Fourier transform, and outputs the transformed signal to the plural modem-to-RRU switches 108-2 for the uplink communication for each of the subbands.

The optical fibers 104 are connected between the IFFT processing unit 109-1 and the DAC 301, and between the FFT processing unit 109-2 and the ADC 304, respectively. Also, both ends of the optical fiber 104 are equipped with an optical modulator/demodulator and an electrical/optical converter which are not shown.

Referring to FIG. 8, a right side of the optical fiber 104 is the front end portion 105.

The output designation of the DAC 301 is equipped with the up converter 302 that conducts baseband to radio frequency band conversion, and the output designation of the up converter 302 is equipped with the power amplifier 303 for amplifying the signal converted into the downlink radio frequency band. Also, the input source to the ADC 304 is equipped with the down converter 305 that conducts radio frequency band to baseband conversion, and the input source to the down converter 305 is equipped with the low noise amplifier 306 for amplifying the uplink radio frequency band signal.

The duplexer 307 having a bandpass filter for sharing the antenna in the uplink signal and the downlink signal is disposed between the power amplifier 303 as well as the low noise amplifier 306 and the antenna 308.

FIGS. 17 to 28 show the configuration in which the power consumption of the baseband modem is reduced in the entire radio communications system by dispersing the load on the baseband modems 103 in the entire radio communications system.

Figure 9A:
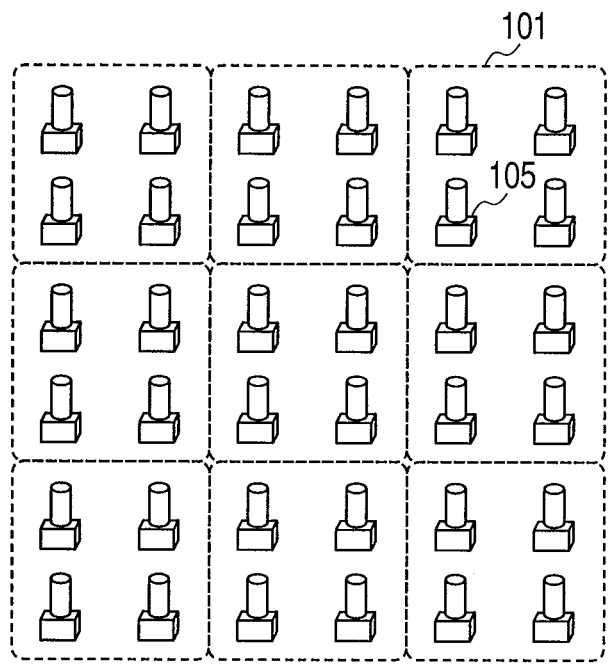
FIG. 9A is an explanatory diagram showing a correspondence relationship between the front end portion and the cell in an anchor subband or an anchor symbol according to the first embodiment of the present invention.
Figure 9B:
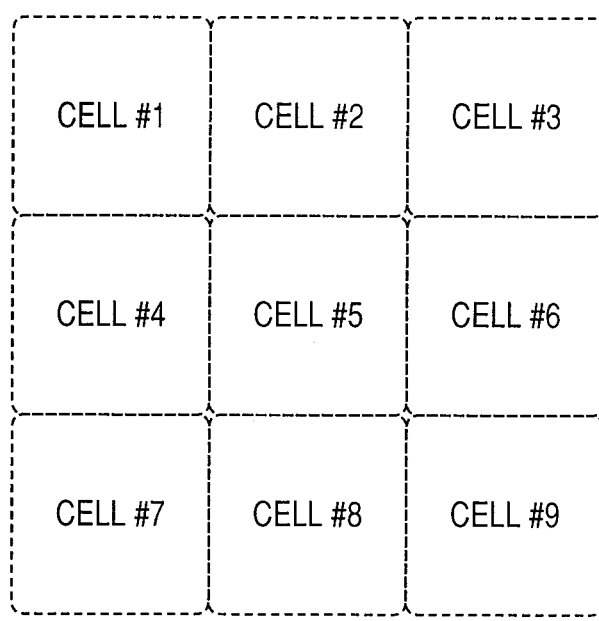
FIG. 9B is an explanatory diagram showing a correspondence relationship between the front end portion and the cell in the anchor subband or the anchor symbol according to the first embodiment of the present invention.

FIGS. 9A and 9B are explanatory diagrams showing a correspondence between the front end portions 105 and the cells 101 in the anchor subband or the anchor symbol according to the first embodiment of the present invention, respectively.

FIG. 9A shows the correspondence of the front end portions 105 and the cells 101. FIG. 9B is a diagram extracting only the cells 101 from FIG. 9A. Nos. of the cells 11 shown in FIG. 9B, that is, the cells #1 to #9 are numbers uniquely indicative of the respective cells 101.

Figure 9C:
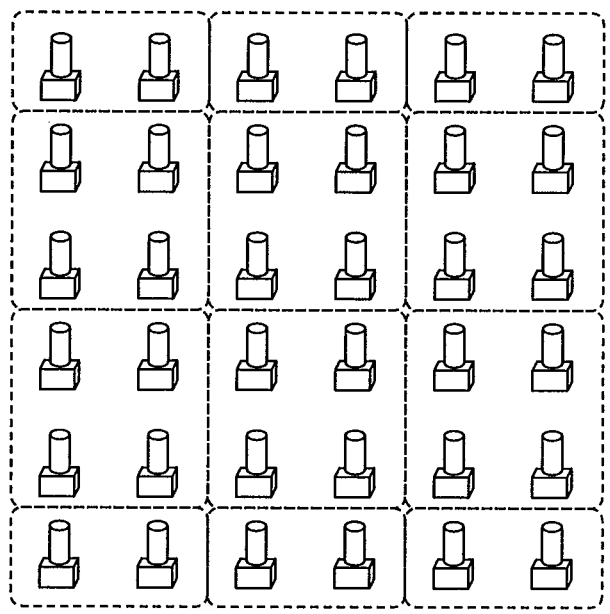
FIG. 9C is an explanatory diagram showing a correspondence relationship between the front end portion and the cell in the other first subband according to the first embodiment of the present invention.
Figure 9D:
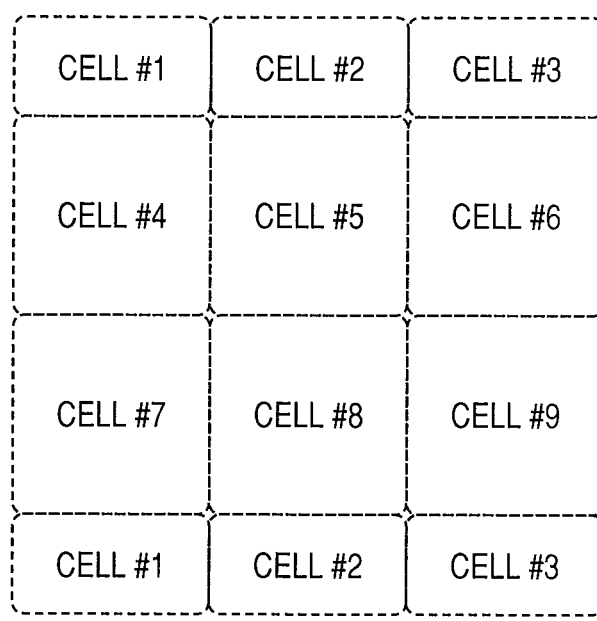
FIG. 9D is an explanatory diagram showing a correspondence relationship between the front end portion and the cell in the other first subband according to the first embodiment of the present invention.

FIGS. 9C and 9D are explanatory diagrams showing a correspondence relationship between the front end portions 105 and the cells 101 in the other first subband according to the first embodiment of the present invention, respectively.

The cells 101 shown in FIGS. 9C and 9D are the cells 101 obtained by offsetting the entire cells 101 shown in FIGS. 9A and 9B to the upper side as compared with the front end portions 105. For that reason, the cell #1, the cell #2, and the cell #3 shown in FIGS. 9C and 9D are generated by the upper front end portions 105 and the lower front end portions 105 among the entire front end portions 105. The modem-to-RRU switch 108 controls the generation of the cells 101 by the front end portions 105 so that the cells 101 shown in FIGS. 9A to 9D correspond to the front end portions 105.

FIG. 10A is an explanatory diagram showing traffic information included in the control unit 110 according to the first embodiment of the present invention.

The explanatory diagram shown in FIG. 10A indicates to which baseband modem 103 the respective cells 101 in the anchor subband or the anchor symbol are connected. Also, the control unit 110 tallies the number of terminals 102 that can most strongly transmit and receive the radio signal between the front end portions 105 and the terminals 102 included in the respective cells 101, and the total amount of data transmitted in the respective cells 101 by unit time, and writes the tallied results in the explanatory diagram shown in FIG. 10A. The downlink communication data volume and the uplink communication data volume shown in FIG. 10A are Gbit/hour in unit, but any unit may be applied if the data communication volume can be compared between the cells 101.

FIG. 10B is an explanatory diagram showing a correspondence between the baseband modems 103 included in the control unit 110 and the cells 101 configured by the front end portions, and the operating states of the baseband models 103 according to the first embodiment of the present invention.

The operating state of the baseband modems 103 shown in FIG. 10B indicates "active" in a "state" column when the baseband modem 103 operates, and indicates "inactive" in the "state" column when the baseband modem 103 stops. In the case of tallying the traffic information including the number of terminals 102 and the data volume for each of the baseband modems 103, the control unit 110 tallies and obtains the traffic information in FIG. 10A corresponding to cell Nos. in FIG. 10B.

Figure 11:
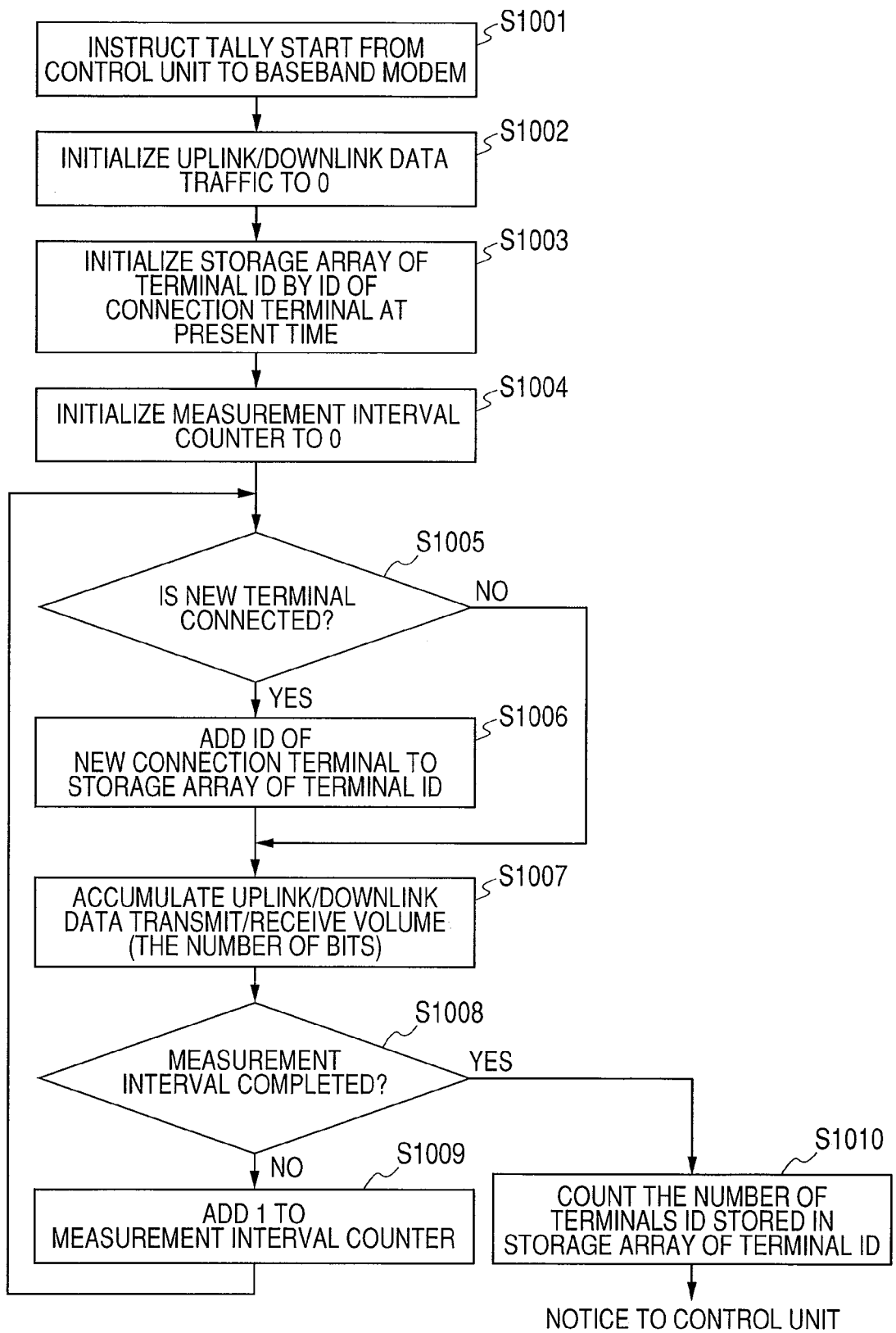
FIG. 11 is an explanatory diagram showing a process of tallying the traffic information for each of the baseband modems according to the first embodiment of the present invention.

FIG. 11 is an explanatory diagram showing a process of tallying the traffic information for each of the baseband modems 103 according to the first embodiment of the present invention.

First, the control unit 110 instructs the baseband modem 103 to start the tally of the traffic information (S1001). A period of time for tallying the traffic information is predetermined, and may be instructed from the control unit 110 to the baseband modem 103 in S1001, or may be set in the baseband modem 103 by a manager in advance. In this embodiment, the period of time for tallying the traffic information is 1 hour.

Upon receiving an instruction from the control unit 110, the baseband modem 103 initializes the uplink and downlink data communication traffic that has been stored in a memory of the baseband modem 103 to 0 (S1002). Also, the baseband modem 103 initializes an array (memory) of terminal IDs indicative of the terminals 102 belonging to each of the cells 101, which have been stored in the memory in advance, to an array of IDs of the terminals 102 at this time, that is, at a time of receiving the instruction of S1001 (S1003). Also, for the purpose of tallying the traffic information for a given period of time, the baseband modem 103 initializes a counter that counts up every data transmit interval of the sub-frame or the like in the multicarrier system to 0 (S1004). The baseband modem 103 includes the counter that counts up every data transmit interval in advance.

The baseband modem 103 repeats the subsequent processing until reaching a period of time for tallying predetermined traffic information every data transmit interval of the sub-frame or the like in the multicarrier system.

The baseband modem 103 determines whether there is a connection from a new terminal not included at the time point of S1003 in the array of the terminal IDs indicative of the terminals 102 belonging to each of the cells 101, which has been initialized in S1001, or not, every data transmit interval. When there is the connection from the new terminal 102, processing is advanced to S1006, and when there is no connection from the new terminal 102, processing is advanced to S1007 (S1005).

When it is determined in S1005 that there is the connection from the terminal 102, the baseband modem 103 adds ID of the terminal 102 newly connected according to the determination in S1005 to the array of the terminal IDs (S1006). Then, the baseband modem 103 accumulates the number of bits of transmit data transmitted in the downlink communication to the terminal 102 included in the array of the terminal IDs, and the number of bits of receive data received in the uplink communication from the terminal 102 included in the array of the terminal IDs, respectively (S1007).

The baseband modem 103 determines whether the counter that has been initialized in S1004 becomes equal to or higher than a threshold value (for example, when the data transmit interval is 1 ms, and a period of time for tallying the traffic information is 1 hour, the threshold value of the counter is 3600000), or not (S1008). When it is determined in S1008 that the value of the counter exceeds the threshold value, because the period of time for tallying the traffic information has been elapsed, the baseband modem 103 proceeds to S1010. Also, when it is determined in S1008 that the value of the counter is equal to or lower than the threshold value, the baseband modem 103 proceeds to S1009.

In S1009, the baseband modem adds 1 to the counter, and returns to S1005.

In S1010, the baseband modem 103 calculates the number of terminal IDs that have been stored in the array of the terminal IDs as the number of terminals 102, and notifies the control unit 110 of the calculated number of terminals 102, and the uplink/downlink data communication volume accumulated in S1007. The control unit 110 receives the number of terminals 102 transmitted from the baseband modem 103, and the uplink/downlink data communication volume as the tallied traffic information.

With the above-mentioned processing shown in FIG. 11, the number of terminals 102 connected to the baseband modem 103, and the uplink/downlink data communication volume in the baseband modem 103 are tallied by the baseband modem 103 every unit time (for example, every hour), and notified the control unit 110 of. As a result, the control unit 110 enables the control of the modem-to-RRU switch 108, which will be described later, based on the traffic information.

Also, the above-mentioned processing shown in FIG. 11 may be tallied not for each of the baseband modems, but for each of the front end portions. When tally is conducted for each of the front end portions 105, the baseband modem 103 has the uplink/downlink data communication volume initialized in S1002 and S1003, the array of the terminal IDs, the array of the terminal IDs added in S1006, and the uplink/downlink data communication volume accumulated in S1007, for each of the front end portions.

Figure 12:
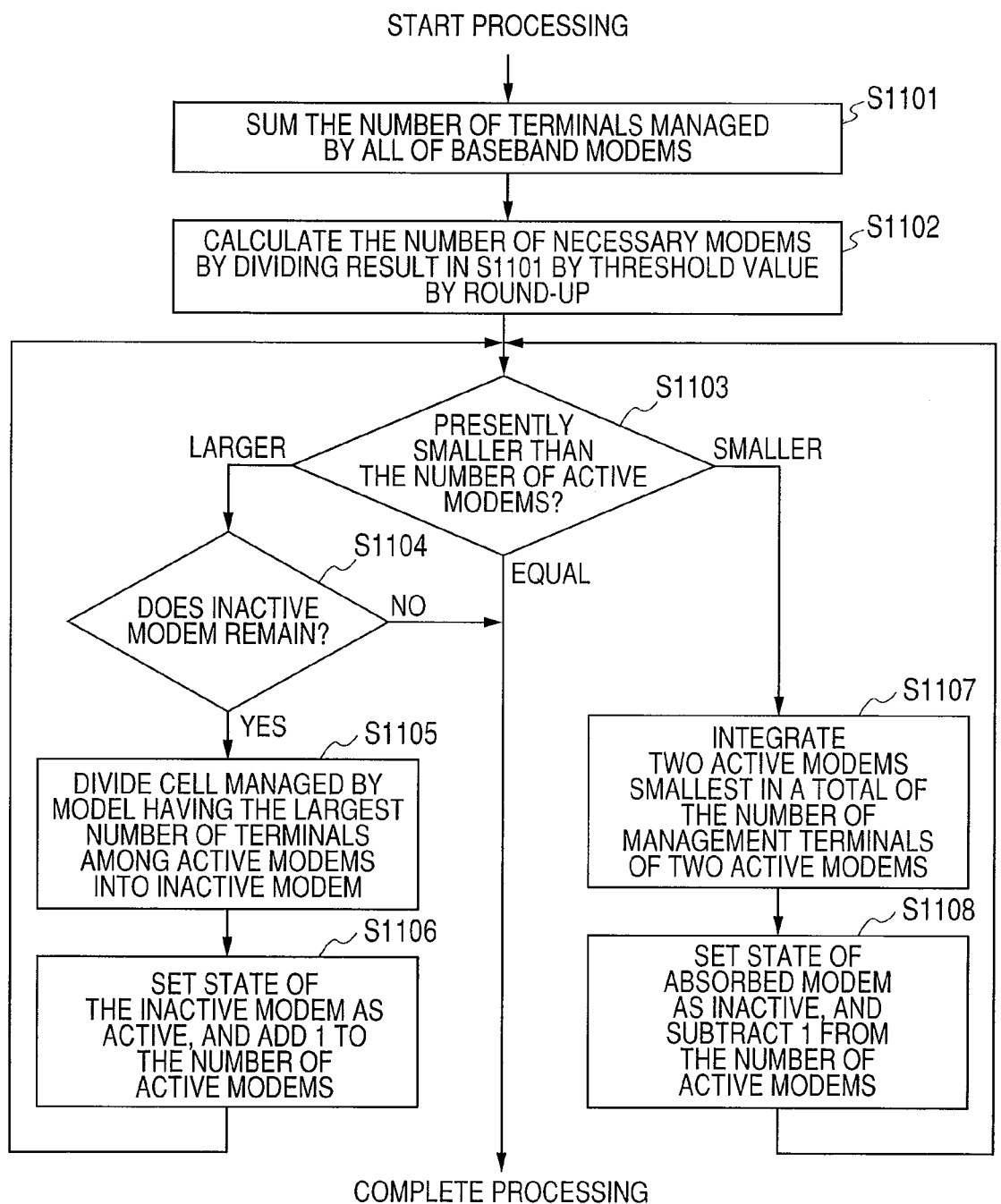
FIG. 12 is a flowchart showing a process of allocating the cells and the baseband modems by the control unit according to the first embodiment of the present invention.

FIG. 12 is a flowchart showing a process of allocating the cells 101 and the baseband modems 103 by the control unit 110 according to the first embodiment of the present invention.

The cell 101 in the flowchart shown in FIG. 12 includes one or plural front end portions 105.

The processing shown in FIG. 12 uses the number of terminals 102 as an index, but the same flowchart is applied also in the case of using the data communication volume as the index. In processing that will be described later, the number of terminals 102 can be replaced with the data communication volume.

First, the control unit 110 calculates a total of the number of terminals 102 connected with all of the baseband modems 103 (a total of the number of terminals 102 in FIG. 10A) (S1101). The control unit 110 divides the result obtained in S1101 by an appropriate number of terminals 102 that are processed in each of the baseband modems 103, which has been acquired in advance (for example, 200 terminals taking a margin into consideration assuming that the processing capacity limit of each baseband modem is 250 terminals). With the above division, the control unit 110 calculates the number of baseband modems 103 required in the entire radio communications system (S1102).

The control unit 110 compares the number of baseband modems 103 in which the "state" column shown in table 18B is "active" (hereinafter called "active modem") with the number of baseband modems 103 required in the entire radio communications system, which has been calculated in S1102 (hereinafter called "appropriate baseband modem"). When the number of appropriate baseband modems is larger than the number of active modems, the control unit 110 proceeds to S1104 for the purpose of increasing the number of active modems. When the number of appropriate baseband modems is smaller than the number of active modems, the control unit 110 proceeds to S1107 for the purpose of decreasing the number of active modems. When the number of active modems is equal to the number of appropriate baseband modems, the control unit 110 completes the processing shown in FIG. 12 (S1103).

As a result of S1103, when the number of appropriate baseband modems is larger than the number of active modems, the control unit 110 refers to information shown in FIG. 10B for determining whether the active modem can be added, or not, and determines whether there is a baseband modem 103 being "inactive" (hereinafter called "inactive modem"), or not (S1104).

As a result of S1104, when there is no inactive modem in the information shown in FIG. 10B, the control unit 110 completes the processing shown in FIG. 12 because the active modem cannot be increased.

As a result of S1104, when there is the inactive modem in the information shown in FIG. 10B, the control unit 110 allocates parts of the cells 101 formed by an active modem which is the largest in the number of connected terminals 102 among the active modems to the inactive modem (S1105). As a result of S1105, because the state of the inactive modem to which the cells 101 have been allocated transits to the active state, the control unit 110 adds 1 to the number of active modems calculated in S1102, and returns to S1103 (S1106).

As a result of S1103, when the number of appropriated baseband modems is smaller than the number of active modems, the control unit 110 calculates a total of the number of terminals 102 which is assumed when two active modems are coupled together for the purpose of decreasing the number of active modems, and extracts the combination of the active modems which is the smallest in a total of the number of terminals 102. Hereinafter, one of the extracted combination of active modems is represented by an active modem A, and the other one is represented by an active modem B. The control unit 110 integrates the active modem with the active modem A (S1107).

The state of the integrated active modem B transits to the inactive state, and therefore the control unit 110 subtracts 1 from the number of active modems calculated in S1102 (S1108).

The control unit 110 updates the information shown in FIG. 10B when the state of the baseband modem 103 transits to another state in the processing shown in FIG. 12.

The specific results of the processing shown in FIG. 12 are shown in FIGS. 13A and 13B.

FIG. 13A is an explanatory diagram showing a relationship of the baseband modems 103, the front end portions 105, and the cells 101 before processing shown in FIG. 12 according to the first embodiment of the present invention.

FIG. 13B is an explanatory diagram showing a relationship of the baseband modems 103, the front end portions 105, and the cells 101 after the processing shown in FIG. 12 according to the first embodiment of the present invention.

The explanatory diagram shown in FIG. 13A is identical with the explanatory diagram shown in FIG. 10B. When it is assumed that the threshold value used in S1102 shown in FIG. 12 is 200, the number of appropriate baseband modems is calculated as 4 on the basis of the state of the baseband modems 103 shown in FIG. 10A. In S1103, the control unit 110 determines that the number of appropriate baseband modems is smaller than the number of active modems according to the calculated number of appropriate baseband modems, and proceeds to S1107.

In S1107, the control unit 110 integrates the baseband modems 103 together as indicated by the combination of arrows shown in FIG. 13A. The results integrated in S1107 are shown in FIG. 13B.

The results shown in FIG. 13B show one case in which one or plural cells 101 are allocated to one baseband modem 103, and another case in which the baseband 103 whose state has been "active" before the processing shown in FIG. 12 becomes "inactive". The number of terminals 102 shown in FIG. 13B is the number of terminals 102 connected to the baseband modem 103, which is calculated on the basis of the correspondence of the cells 101 with the number of terminals 102 shown in FIG. 10A. The number of terminals 102 connected to the baseband modem #1 shown in FIG. 13B is 240, and exceeds the threshold value 200 used in S1102. In the processing shown in FIG. 12, the number of terminals 102 is not set to an appropriate value because only the number of baseband modems 103 is set to an appropriate number. Accordingly, a process of setting the number of terminals 102 connected to the baseband modem 103 to an appropriate number for each of the baseband modems 103, separately, will be described later with reference to FIG. 15.

FIG. 14A is an explanatory diagram showing a state of a switch control by the modem-to-RRU switch 108 in correspondence to the state of FIG. 13A according to the first embodiment of the present invention.

FIG. 14B is an explanatory diagram showing a state of switch control by the modem-to-RRU switch 108 in correspondence to the state of FIG. 13B according to the first embodiment of the present invention.

A mark O shown in FIG. 14A indicates that the baseband modem 103 and the cell 101 corresponding to each other are connected to each other, and a mark X indicates that the baseband modem 103 and the cell 101 corresponding to each other are not connected to each other. In the case of using the modem-to-RRU switch 108 shown in FIG. 6A, the mark O shown in FIG. 14A uses an AND mask of all bits being 1, and the mark X uses the AND mark of all bits being 0. The control unit 110 conducts the processing shown in FIG. 12 on the state of the switch control shown in FIG. 14A to allocate the baseband modems 103 and the cells 101 as shown in FIG. 14B. As a result of processing shown in FIG. 12, the changed correspondence of the baseband modems 103 and the cells 101 is a correspondence indicated by a portion where the background is changed. For example, the baseband modem #1 is connected in parallel to the cell #1, #3, #4, and #6. In transmitting the downlink signal, the same signal is transmitted to those cells #1, #3, #4, and #6. In transmitting the uplink signal, all of the signals from the terminals 102, which have been received in those cells #1, #3, #4, and #6 are superimposed on each other, and received.

Accordingly, in the case where the baseband modems 103 are made to correspond to the cells 101 as shown in the results of FIG. 14B, when the communication resources such as the frequency band is allocated to the terminals in the uplink communication, the same communication resource is allocated to the terminal 102 belonging to the cells #1, #3, #4, and #6. In this case, the uplink data signals transmitted by the terminals 102 interfere with each other. In order to prevent the uplink data signals from interfering with each other, it is necessary that the cells #1, #3, #4, and #6 are regarded as one large cell 101, and the communication resource is allocated to all of the terminals 102 belonging to the large cell 101.

In the downlink communication, those cells #1, #3, #4, and #6 become one large cell 101, and the data signal transmitted to the terminal 102 belonging to any cell among those cells is broadcasted by the large cell of those cells #1, #3, #4, and #6.

The terminal 102 belonging to, for example, the cell #6 does not require the downlink signal addressed to the terminal belonging to the cell #1, as a result of which unnecessary interference affects the cells 101 (cells #3, #5, #9) around the cell #6. For that reason, it is necessary to realize mask processing for suppressing radiation of unnecessary signal to the respective cells #1, #3, #4, and #6. The mask processing for suppressing radiation of unnecessary signals to the respective cells #1, #3, #4, and #6 will be described with reference to FIG. 26A.

Figure 15:
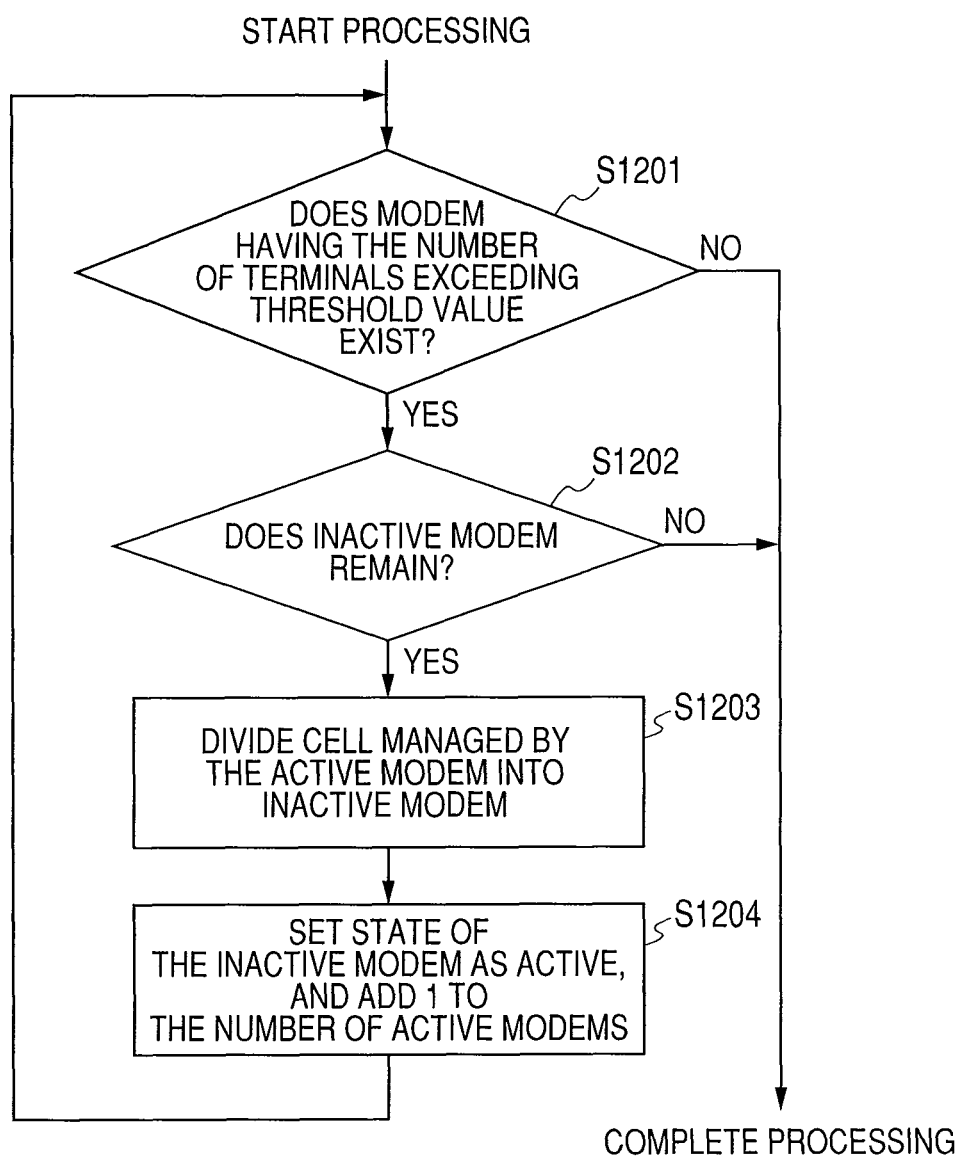
FIG. 15 is a flowchart showing a process of allocating the cells and the baseband modems by the control unit according to the first embodiment of the present invention.

FIG. 15 is a flowchart showing a process of allocating the cells 101 and the baseband modems 103 by the control unit 110 according to the first embodiment of the present invention.

The processing shown in FIG. 15 is subsequent to the processing shown in FIG. 12, and a process of allocating the cell 101, one or plural front end portions 105 included in the cell 101, and the baseband modem 103. The processing shown in FIG. 15 uses the number of terminals 102 as an index, but the same flowchart is applied even when the data communication volume is used as the index. The number of terminals 102 can be replaced with the data communication volume in processing which will be described later.

First, the control unit 110 determines whether there exists the baseband modem 103 in which the number of terminals 102 connected to the base modem 103 is larger than a threshold value (it is assumed that the threshold value is 200 in FIG. 15 like FIG. 12), or not. When there exists no base modem 103 in which the number of terminals 102 connected to the baseband modem 103 is larger than the threshold value, because the number of terminals 102 connected to the baseband modem 103 is appropriate, the control unit 110 completes the processing shown in FIG. 15. Also, when there exists the base modem 103 in which the number of terminals 102 connected to the baseband modem 103 is larger than the threshold value, because the number of terminals 102 connected to the baseband modem 103 is inappropriate, the control unit 110 proceeds to S1202 (S1201).

Then, the control unit 110 determines whether there exists the inactive modem, or not, with an aim to reduce the number of terminals 102 of the baseband modem 103 in which the number of connected terminals 102 is larger than the threshold value, that is, with an aim to divide a load on the baseband modem 103 to other baseband modems 103. When there exists no inactive modem, because there exists no baseband modem 103 to which the terminals 102 are divided, the control unit 110 completes the processing shown in FIG. 15. When there exists the inactive modem, because there exists the baseband modem 103 to which the terminals 102 are divided, the control unit 110 proceeds to S1203 (S1202).

In S1202, when there exists the inactive modem, the control unit 110 divides the terminals 102 of the baseband modem 103 in which the number of terminals connected to the baseband modem 103 exceeds the threshold value in S1201 to one of the inactive modems (S1203).

The control unit 110 transits the state of the inactive modem to which the terminals 102 are divided to the active state, and adds 1 to the number of active modems (S1204).

The results of the above-mentioned processing shown in FIG. 15 are shown in FIGS. 16A and 16B.

FIG. 16A is an explanatory diagram showing a relationship of the baseband modems 103, the front end portions 105, and the cells 101 before processing shown in FIG. 15 according to the first embodiment of the present invention.

FIG. 16B is an explanatory diagram showing a relationship of the baseband modems 103, the front end portions 105, and the cells 101 after processing shown in FIG. 15 according to the first embodiment of the present invention.

The relationship of FIG. 16A is identical with that of FIG. 13B. When the state of FIG. 16A is set to an initial state of FIG. 15, and a threshold value shown in FIG. 15 is 200, the baseband modem 103 in which the number of terminals 102 connected to the baseband modem 103 exceeds the threshold value is determined as the baseband modem #1 by the control unit 110 in S1201.

Subsequently, in the determination of S1202, the control unit 110 selects the baseband modem 3 of the inactive modem shown in FIG. 16A. In S1202, a plurality of inactive modems exists, but the control unit 110 may select an arbitrary inactive modem.

The control unit 110 divides two cells 101 consisting of the cells #4 and #6 among the cells #1, #3, #4, and #6 managed by the baseband modem 1 to the baseband modem 3 through processing of S1203. In S1203, the cells 101 to be divided to the baseband modem 3 may be selected at random. Also, in S1203, in the case where the number of terminals 102 is managed for each of the cells 101 as shown in FIG. 10A, when the cells 101 are divided to the baseband modem 1 and the baseband modem 3, the control unit 110 may divide the cells 101 so that a difference in the number of terminals 102 connected to the baseband modem 3 becomes the minimum.

In S1203, a relationship of the baseband modems 103 and the cells 101 after the cells 101 have been divided by the control unit 110 is shown in FIG. 16B.

In order that the control unit 110 manages the number of terminals 102 for each of the cells 101 (one or plural front end portions configuring the cell 101), there are required a structure of transmitting a signal specific to the cell 101, and a structure of analyzing an access signal from the terminal to the cell. Those structures will be described later.

FIG. 17A is an explanatory diagram showing a state of the control by the modem-to-RRU switch 108 in correspondence to the state of FIG. 16A according to the first embodiment of the present invention.

FIG. 17B is an explanatory diagram showing a state of the control by the modem-to-RRU switch 108 in correspondence to the state of FIG. 16B according to the first embodiment of the present invention.

The marks O and X shown in FIGS. 17A and 17B have the same meanings as those in FIGS. 14A and 14B.

The explanatory diagram shown in FIG. 17A shows that the baseband modem #1 is connected to the cells #4 and the cell #6, and the baseband modem #3 is not connected to the cell #4 and the cell #6. On the contrary, the explanatory diagram shown in FIG. 17B shows that the baseband modem #1 is not connected to the cells #4 and the cell #6, and the baseband modem #3 is connected to the cell #4 and the cell #6.

Figure 18A:
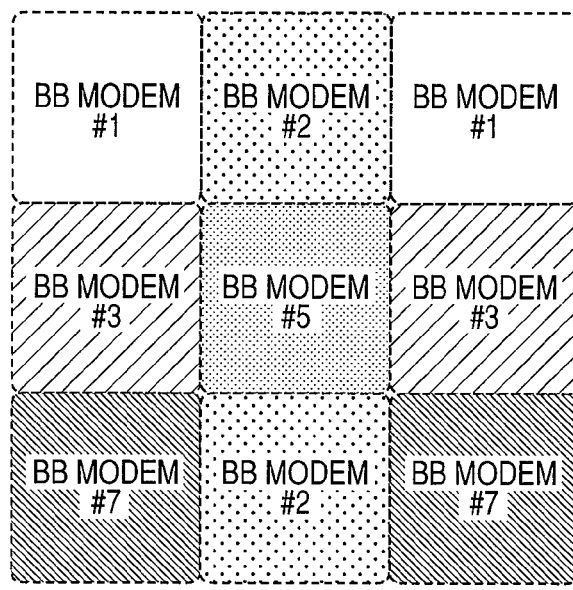
FIG. 18A is an explanatory diagram showing a relationship between the baseband modem 103 and the cell 101 in an anchor subband or an anchor symbol according to the first embodiment of the present invention.

FIG. 18A is an explanatory diagram showing a relationship between the baseband modems 103 and the cells 101 in an anchor subband or an anchor symbol according to the first embodiment of the present invention.

Figure 18B:
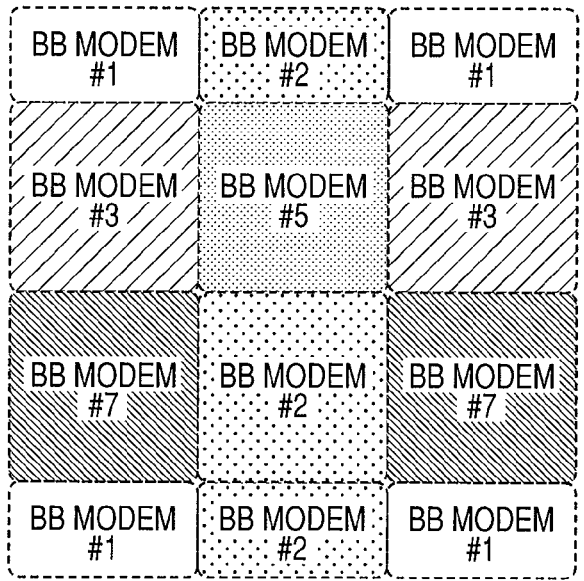
FIG. 18B is an explanatory diagram showing a relationship between the baseband modem 103 and the cell 101 in the other first subband according to the first embodiment of the present invention.

FIG. 18B is an explanatory diagram showing a relationship between the baseband modems 103 and the cells 101 in the other first subband according to the first embodiment of the present invention.

FIGS. 18A and 18B show a relationship of the baseband modems and the cells when the changeover of the modem-to-RRU switch 108 is set to 1 in input and N in output in the downlink communication, and N in input and 1 in output in the uplink communication. The explanatory diagrams shown in FIGS. 18A and 18B are represented by background different in each of the baseband modems 103 corresponding to the cell 101. The explanatory diagrams shown in FIGS. 18 and 18B are based on the state of the control of the modem-to-RRU switch 108 shown in FIG. 17B.

When the modem-to-RRU switch 108 allocates the baseband modems 103 and the cells 101 as with the relationship shown in FIG. 14A by transmitting the relationship shown in FIG. 14A from the control unit 110, it is necessary that the radio communications system forms nine cell 101 by nine baseband modems 103. On the contrary, in the case of using the relationship of the baseband modems 103 and the cells 101 shown in FIG. 18A, the radio communications system forms nine cells 101 by five baseband modems 103. As a result, the power consumption of the four baseband modems 103 can be reduced. Also, in the case of using the relationship shown in FIG. 18A, in the radio communications system, the plurality of cells 101 geographically far from each other can share the same baseband modem 103, and the cells 101 can be flexibly configured according to the traffic distribution.

In a relationship of the baseband modems 103 and the cells 101 shown in FIG. 18B, all of the cells 101 are offset upward, and the upper end cells 101 are allocated to the lower end cells 101 as compared with the cells 101 shown in FIG. 18A. In the relationship shown in FIG. 18B, the center of the lower end is adjacent to the cell 101 of the same baseband modem 103. A diagram enlarging the center of the lower end shown in FIG. 18 is shown in FIG. 18C.

Figure 18C:
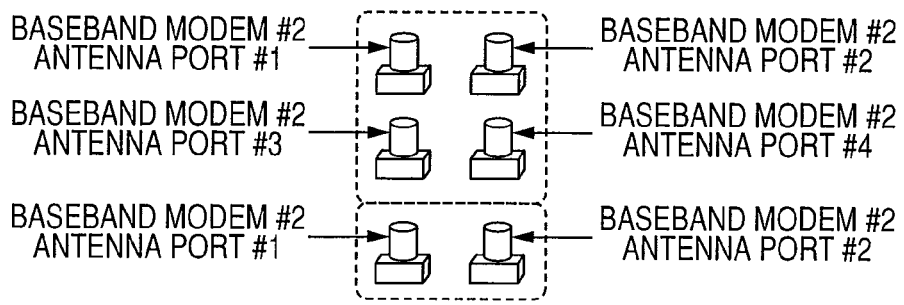
FIG. 18C is an explanatory diagram showing the front end portion when the cells formed by the same baseband modem are adjacent to each other according to the first embodiment of the present invention.

FIG. 18C is an explanatory diagram showing the front end portion when the cells 101 formed by the same baseband modem 103 are adjacent to each other according to the first embodiment of the present invention.

When the four antenna ports of the baseband modem #2 are connected the front end portion 105 as shown in FIG. 18C, the boundary of the cells existing among four lower front end portions 105 is not a cell boundary for the terminal located at the boundary place because of the same cell 101. That is, when the cells connected with the same baseband modem 103 are adjacent to each other, the boundary of the adjacent cells can be eliminated.

Figure 19A:
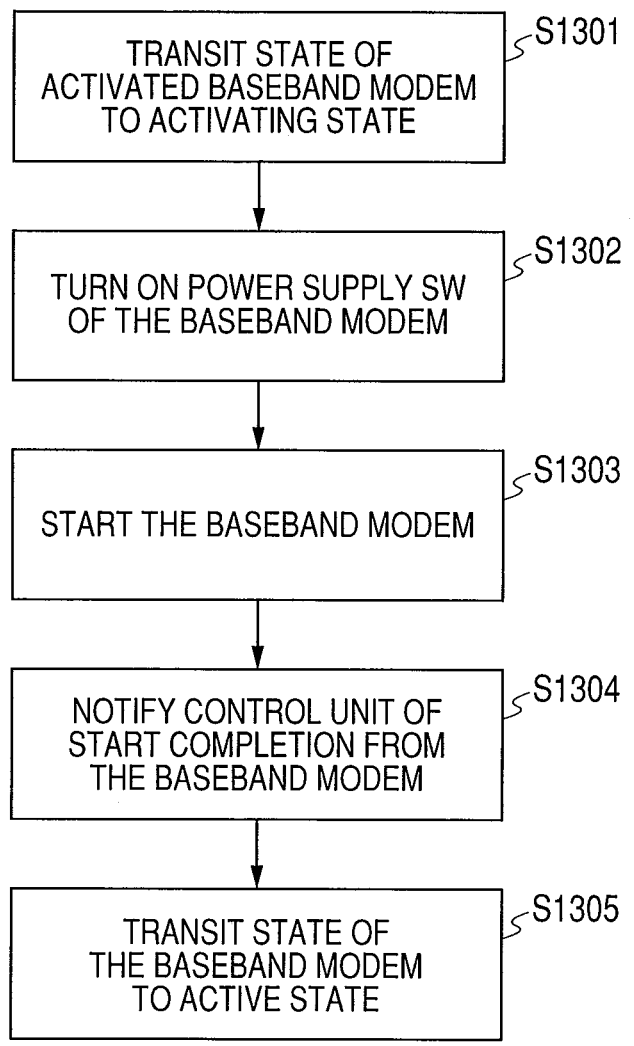
FIG. 19A is a flowchart showing a start of the baseband modem according to the first embodiment of the present invention.

FIG. 19A is a flowchart showing a start of the baseband modem 103 according to the first embodiment of the present invention.

The flowchart shown in FIG. 19A shows a process of starting the baseband modem 103 when the state of the baseband modem 103 managed by the control unit 110 transits from the inactive state to the active state according to the operation flows of FIGS. 12 and 15.

First, when the baseband modem 103 to which the cell 101 or the terminal 102 is newly allocated and whose state is instructed to be made active is generated by the processing shown in FIG. 12 or 15, the control unit 110 transits the state of the baseband modem 103 becoming active to "activating" indicative of an active state (S1301). The control unit 110 turns on a switch between the baseband modem 103 whose state is transited to the activating state and the power supply (S1302).

Thereafter, the control unit 110 waits for start processing of the baseband modem 103 (read a program in a processor or a logic circuit, initialization) (S1303), receives a start process completion notification from the baseband modem 103 that has started (S1304), and thereafter transits the state of the baseband modem 103 that has transmitted the start process completion notification to the active state (S1305).

Figure 19B:
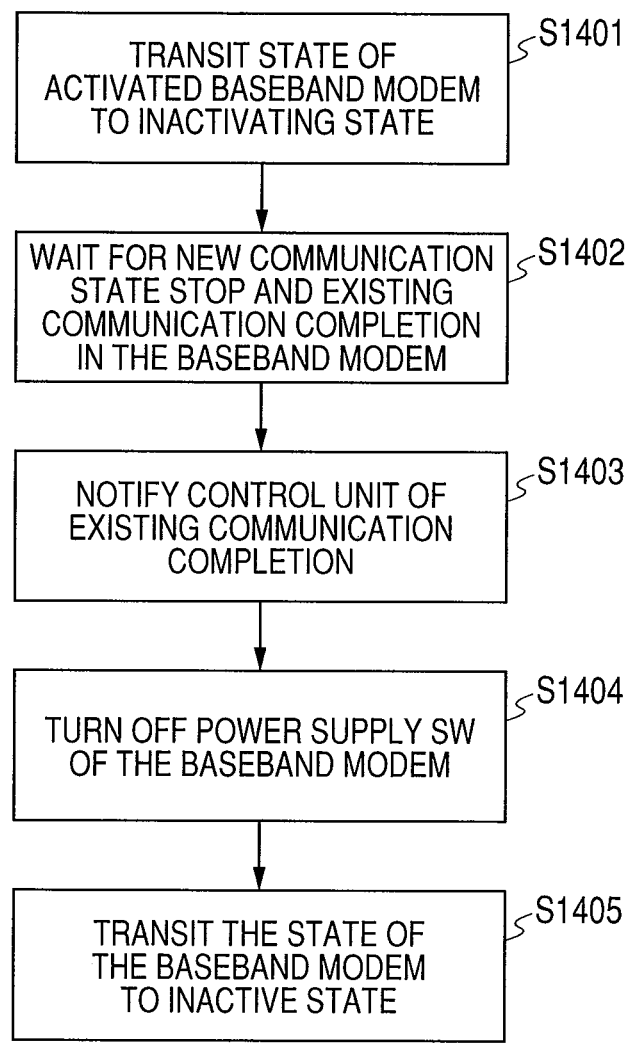
FIG. 19B is a flowchart showing a stop of the baseband modem according to the first embodiment of the present invention.

FIG. 19B is a flowchart showing the stop of the baseband modem 103 according to the first embodiment of the present invention.

The flowchart shown in FIG. 19B shows a process of stopping the baseband modem 103 in the case where the state of the baseband modem 103 managed by the control unit 110 is transited from the active state to the inactive state according to the flowcharts of FIGS. 12 and 15.

First, when the baseband modem 103 from which all of the cells 101 or the terminals 102 are disconnected and whose state is instructed to be made inactive is generated by the processing shown in FIG. 12 or 15, the control unit 110 transits the inactive state of the baseband modem 103 to an activating state (S1401).

The control unit 110 stops a new communication in the baseband modem 103 whose state is transited to the inactivating state, and waits for the completion of the existing communication (S1402). The baseband modem whose state is transited to the inactivating state notifies the control unit 110 of the completion of the existing communication (S1403). The control unit 110 turns off the switch between the baseband modem 103 that has completed the existing communication and the power supply (S1404).

Thereafter, the control unit 110 transits the state of the baseband modem 103 in which the switch between the baseband modem 103 and the power supply turns off to the inactive state (S1405).

Figure 20:
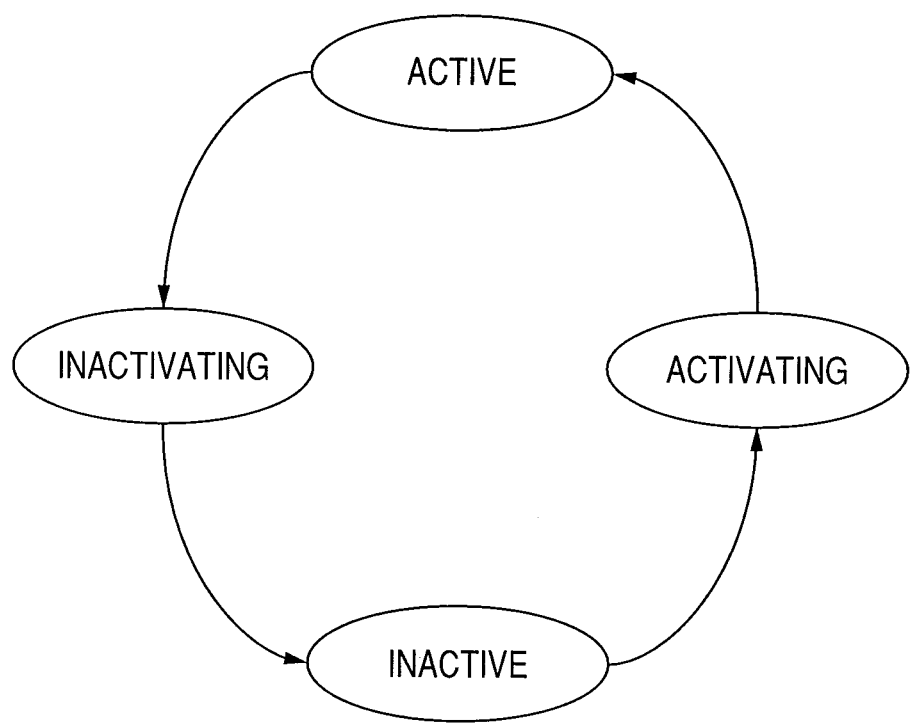
FIG. 20 is an explanatory diagram showing a state transition of the baseband modem according to the first embodiment of the present invention.

FIG. 20 is an explanatory diagram showing a state transition of the baseband modem 103 according to the first embodiment of the present invention.

FIG. 20 shows a state transition shown in FIGS. 18A and 18B.

Figure 21A:
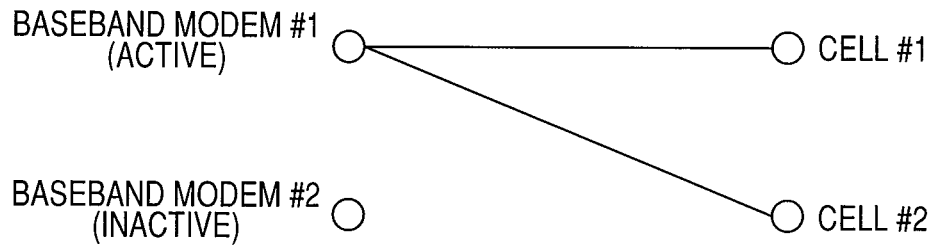
FIG. 21A is an explanatory diagram showing the connection of the modem-to-RRU switch in an inactive state when the baseband modem transits from the inactive state to an active state according to the first embodiment of the present invention.
Figure 21B:
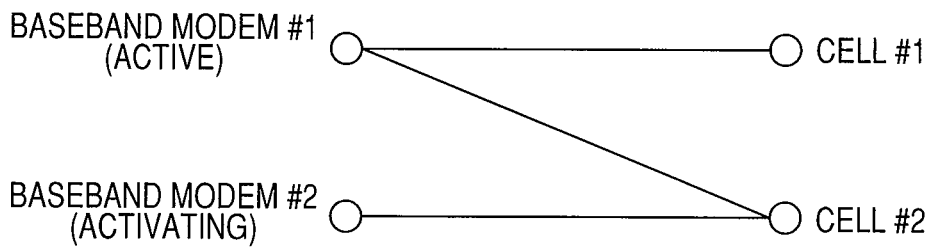
FIG. 21B is an explanatory diagram showing the connection of the modem-to-RRU switch in the activating state when the baseband modem transits from the inactive state to the active state according to the first embodiment of the present invention.
Figure 21C:
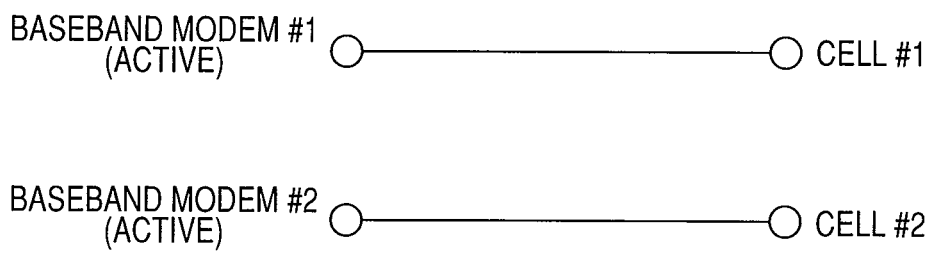
FIG. 21C is an explanatory diagram showing the connection of the modem-to-RRU switch in the active state when the baseband modem transits from the inactive state to the active state according to the first embodiment of the present invention.

FIGS. 21A to 21C are explanatory diagrams showing the connection of the modem-to-RRU switch in an inactive state when the baseband modem transits from the inactive state to an active state according to the first embodiment of the present invention.

FIGS. 21A to 21C show a case in which the state of the baseband modem #2 is transited from the inactive state to the active state through the processing shown in FIG. 19A.

FIG. 21A shows the connection of the modem-to-RRU switch 108 when the state of the baseband modem #2 is inactive. The baseband modem #1 shown in FIG. 21A is connected to both of one or plural front end portions 105 that form the cell #1, and one or plural front end portion 105 that form the cell #2. The control unit 110 turns on the power supply of the baseband modem #2, receives the start completion notification, and thereafter proceeds to FIG. 21B.

FIG. 21 shows the connection of the modem-to-RRU switch 108 when the control unit 110 transits the state of the baseband modem #2 from the inactive state to the activating state. After receiving the start completion notification of the baseband modem #2, one or plural front end portions 105 that forms the cell #2 are temporarily connected to both of the baseband modem #1 and the baseband modem #2. Among the data communication of the terminal 102 belonging to the cell #2, a data communication continuous before the modem-to-RRU switch 108 changes over the connection (for example, data communication during retransmission) is processed by the baseband modem #1.

Also, the data communication that has not yet been subjected to resource allocation, which is transmitted to the terminal 102 belonging to the cell #2 and has been buffered to the baseband modem #1, is transferred to the baseband modem #2 by communication with the baseband modem 103 through the control unit 110 or according to an instruction from the control unit 110. A new data communication coming from the gateway 113 is also transferred to the baseband modem #2.

In the baseband modem #1, after the data communication continuous before the modem-to-RRU switch 108 changes over the connection has been completed, the modem-to-RRU switch 108 switches to the connection shown in FIG. 21C. The control unit 110 transits the state of the baseband modem #2 to the active state after having switched to the connection shown in FIG. 21C.

Figure 22A:
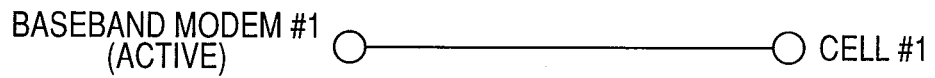
FIG. 22A is an explanatory diagram showing the connection of the modem-to-RRU switch in an active state when the baseband modem transits from the active state to an inactive state according to the first embodiment of the present invention.
Figure 22B:
FIG. 22B is an explanatory diagram showing the connection of the modem-to-RRU switch in the inactivating state when the baseband modem transits from the active state to the inactive state according to the first embodiment of the present invention.
Figure 22C:
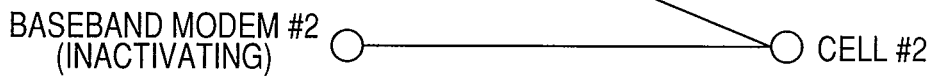
FIG. 22C is an explanatory diagram showing the connection of the modem-to-RRU switch in the inactive state when the baseband modem transits from the active state to the inactive state according to the first embodiment of the present invention.

FIGS. 22A to 22C are explanatory diagrams showing the connection of the modem-to-RRU switch 108 in an active state when the baseband modem transits from the active state to the inactive state.

FIGS. 22A to 22C show a case in which the state of the baseband modem #2 is transited from the active state to the inactive state by the processing shown in FIG. 19B. FIG. 22A shows the connection of the modem-to-RRU switch 108 when the state of the baseband modem #2 is active. The baseband modem #1 shown in FIG. 22A is connected to one or plural front end portions 105 forming the cell #1, and the baseband modem #2 shown in FIG. 22A is connected to one or plural front end portions 105 forming the cell #2.

FIG. 22B shows the connection of the modem-to-RRU switch 108 when the control unit 11 transits the state of the baseband modem #2 from the active state to the inactivating state. After the state of the baseband modem #2 has been transited from the active state to the inactivating state by the control unit 110, one or plural front end portions 105 forming the cell #2 are temporarily connected to both of the baseband modem #1 and the baseband modem #2. Among the data communication of the terminal 102 belonging to the cell #2, a data communication continuous before the modem-to-RRU switch 108 changes over the connection (for example, data communication during retransmission) is processed by the baseband modem #2.

Also, the data communication that has not yet been subjected to resource allocation, which is transmitted to the terminal 102 belonging to the cell #2 and has been buffered to the baseband modem #2, is transferred to the baseband modem #1 by communication with the baseband modem 103 through the control unit 110 or according to an instruction from the control unit 110. A new data communication coming from the gateway 113 side is also transferred to the baseband modem #1.

In the baseband modem #2, after a data communication continuous before the modem-to-RRU switch 108 changes over the connection has been completed, the modem-to-RRU switch 108 changes to the connection shown in FIG. 22C. The control unit 110 transits the state of the baseband modem #2 to the inactive state, and blocks the power supply of the baseband modem #2.

FIG. 23A is a flowchart showing a detailed process of starting the baseband modem 103 according to the first embodiment of the present invention.

FIG. 23A is a processing flow adding a processing flow made by the modem-to-RRU 108 shown in FIGS. 21A to 21C to the processing flow shown in FIG. 19A.

First, the control unit 110 turns on a switch of a power supply of the baseband modem 103 whose state is transited to the active state (S1401), and the baseband modem 103 whose state is transited to the active state implement start processing (S1402). The start completion is notified the control unit 110 of from the baseband modem 103 that has started after the completion of the start processing (S1403).

The control unit 110 receives the notification of the start completion, and transits the state of the baseband modem 103 to the activating state (S1404). The control unit 110 transmits an instruction to the modem-to-RRU switch 108 to connect one baseband modem 103 whose state has been transited to the activating state and another baseband modem 103 that divides the processing to the one baseband modem 103 to the front end portions 105 forming the same cell 101 (S1405).

The another baseband modem 103 that divides the processing waits for the completion of the existing data communication (S1406), and transmits a notification indicating that the existing data communication has been completed to the control unit 110 (S1407). Upon receiving the notification indicating that the existing data communication has been completed, the control unit 101 blocks the connection of the another baseband modem 103 side that has completed the existing data communication in S1407 among the baseband modems 103 connected to the front end portions 105 forming the same cell in S1405 (S1408). Finally, the control unit 110 transits the activating state of the baseband modem 103 to the active state.

Figure 23B:
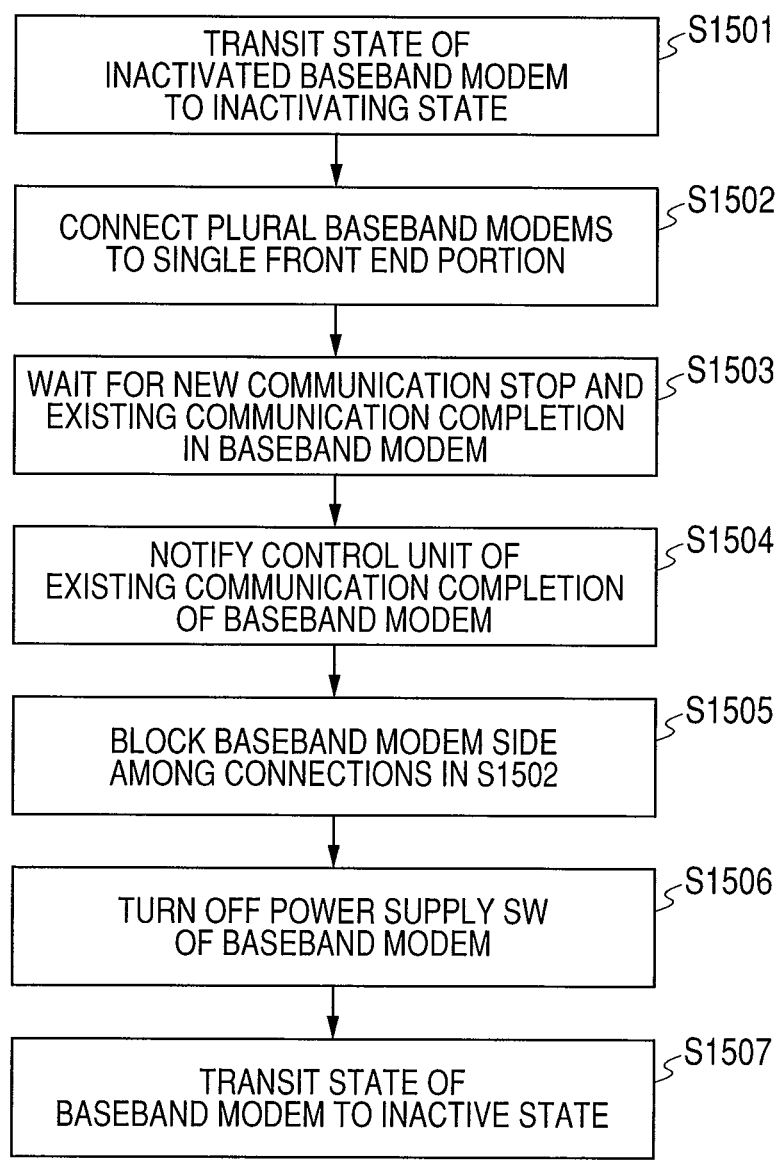
FIG. 23B is a flowchart showing a detailed process of stopping the baseband modem according to the first embodiment of the present invention.

FIG. 23B is a flowchart showing a detailed process of stopping the baseband modem 103 according to the first embodiment of the present invention.

FIG. 23B is a processing flow adding a processing flow made by the modem-to-RRM switch 108 shown in FIGS. 22A to 22C to the processing flow of FIG. 19B.

First, the control unit 110 transits the state of the baseband modem 103 to be stopped to the inactivating state (S1501), and connects the baseband modem 103 to be stopped and another baseband modem 103 that takes over the processing from the baseband modem 103 to be stopped to the front end portions 105 forming the same cell (S1502). The control unit 110 waits for the completion of the existing data communication of the baseband modem 103 to be stopped (S1503). The baseband modem 103 to be stopped transmits a notification indicating that the existing data communication has been completed to the control unit 110 (S1504). Upon receiving the notification, the control unit 110 blocks the connection of the baseband modem 103 side that has completed the existing data communication in S1504 among the plurality of baseband modems 103 connected to the front end portions 105 forming the same cell 101 in S1502 (S1505). Thereafter, the control unit 110 turns off the power supply switch of the baseband modem 103 blocked from the connection with the front end portion 105 (S1506), and transits the state of the subject baseband modem to the inactive state.

Figure 24A:
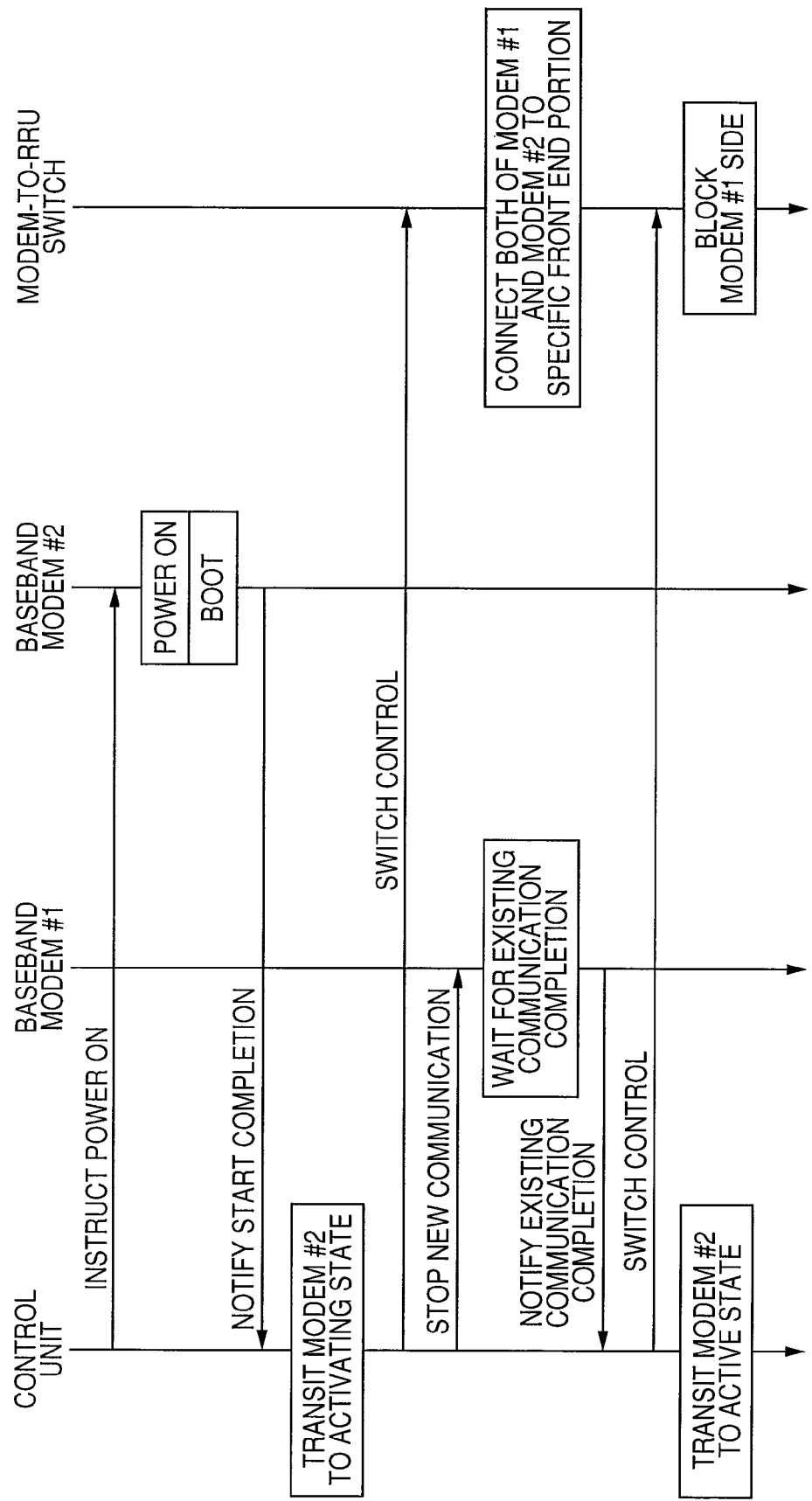
FIG. 24A is a sequence diagram showing a process of starting the baseband modem according to the first embodiment of the present invention.

FIG. 24A is a sequence diagram showing a process of starting the baseband modem according to the first embodiment of the present invention.

The control unit 110 turns on the power supply, instructs the baseband modem #2 to turn on the power supply of the baseband modem #2 whose state is transited to the active state, turns on the power supply of the baseband modem #2, and waits for the start processing. After the completion of the start processing, the baseband modem #2 transmits a start completion notification to the control unit 110. Upon receiving the start completion notification, the control unit 110 transits the state of the baseband modem #2 to the activating state. With this operation, the control unit 110 instructs the modem-to-RRU switch 108 to connect the modem-to-RRU switch 108 to be connected to the front end portions 105 (specific front end portions) of the cell 101 from which the baseband modem #2 takes over the processing among the cells 101 managed by the baseband modem #1, to be connected to both of the baseband modem #1 and the baseband modem #2. At the same time, the control unit 110 transmits, to the baseband modem #1, an instruction for stopping a new communication of the processing of the data signal related to the cell 101 from which the baseband modem #2 takes over the processing. Thereafter, the baseband modem #1 completes the existing data communication during the data communication (for example, during retransmission), and transmits a notification indicating that the existing data communication has been completed to the control unit 110 after the completion of the processing. Upon receiving the notification indicating that the existing data communication has been completed, the control unit 110 instructs the modem-to-RRU switch 108 to block the switch at the baseband modem #1 side among the switches that have been connected to both of the baseband modem #1 and the baseband modem #2. Thereafter, the control unit 110 transits the state of the baseband modem #2 to the active state.

Figure 24B:
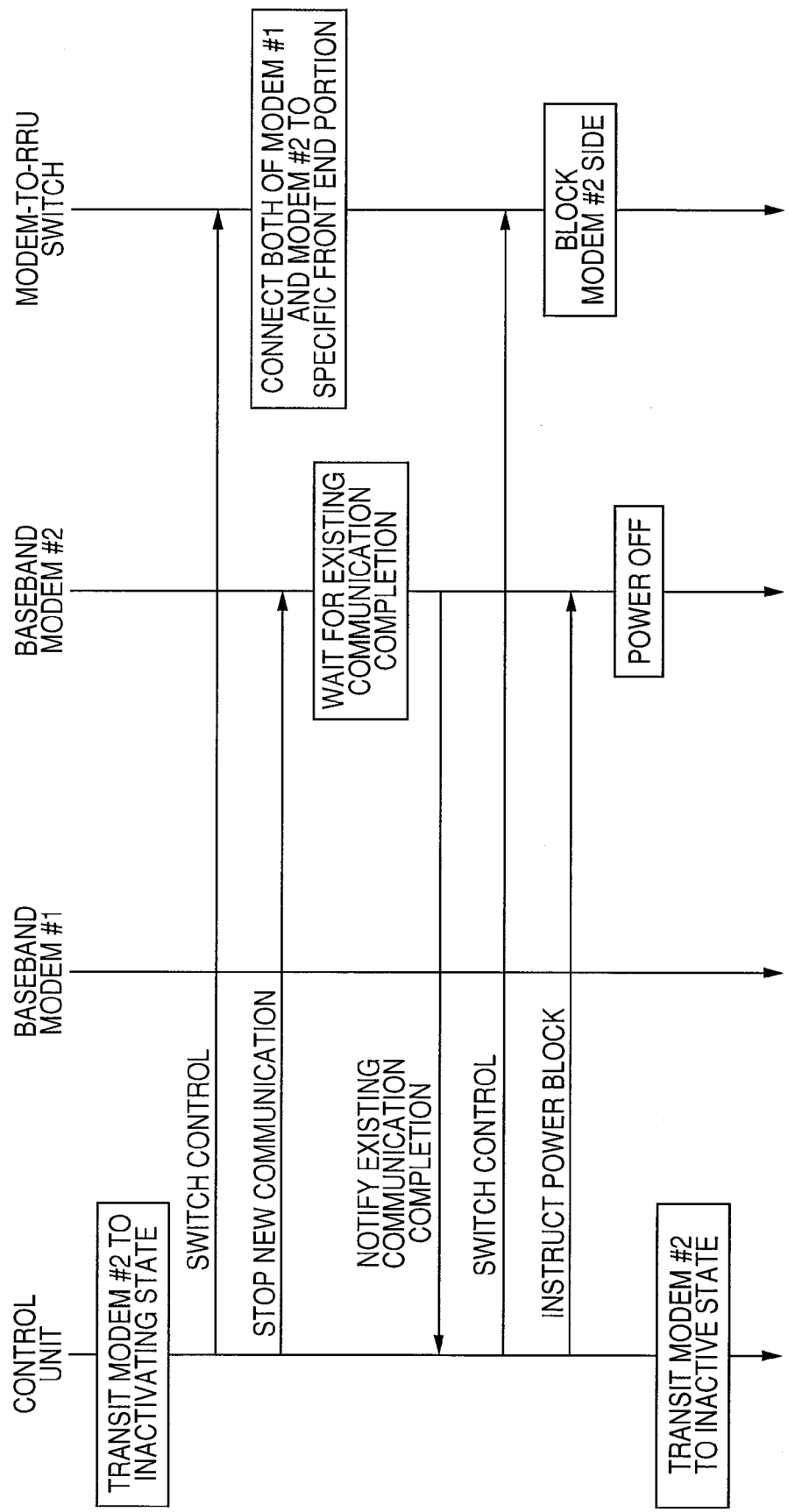
FIG. 24B is a sequence diagram showing a process of stopping the baseband modem according to the first embodiment of the present invention.

FIG. 24B is a sequence diagram showing a process of stopping the baseband modem according to the first embodiment of the present invention.

The control unit 110 blocks the power supply, transits the state of the baseband modem #2 whose state is inactivated to the inactivating state, and instructs the modem-to-RRU switch 108 to connect the modem-to-RRU switch 108 to be connected to the front end portions 105 (specific front end portions) of all the cells 101 that have been connected to the baseband modem #2 to both of the baseband modem #1 and the baseband modem #2. At the same time, the control unit 110 transmits an instruction for stopping a new communication to the baseband modem #2. The baseband modem #2 completes the existing data communication during the data communication (for example, during retransmission), and transmits a notification indicating that the existing data communication has been completed to the control unit 110 after the completion of the processing. Upon receiving the notification indicating that the existing data communication has been completed, the control unit 110 instructs the modem-to-RRU switch 108 to block the switch at the baseband modem #2 side among the switches that have been connected to both of the baseband modem #1 and the baseband modem #2. Thereafter, the control unit 110 transits the state of the baseband modem #2 to the inactive state.

Figure 25:
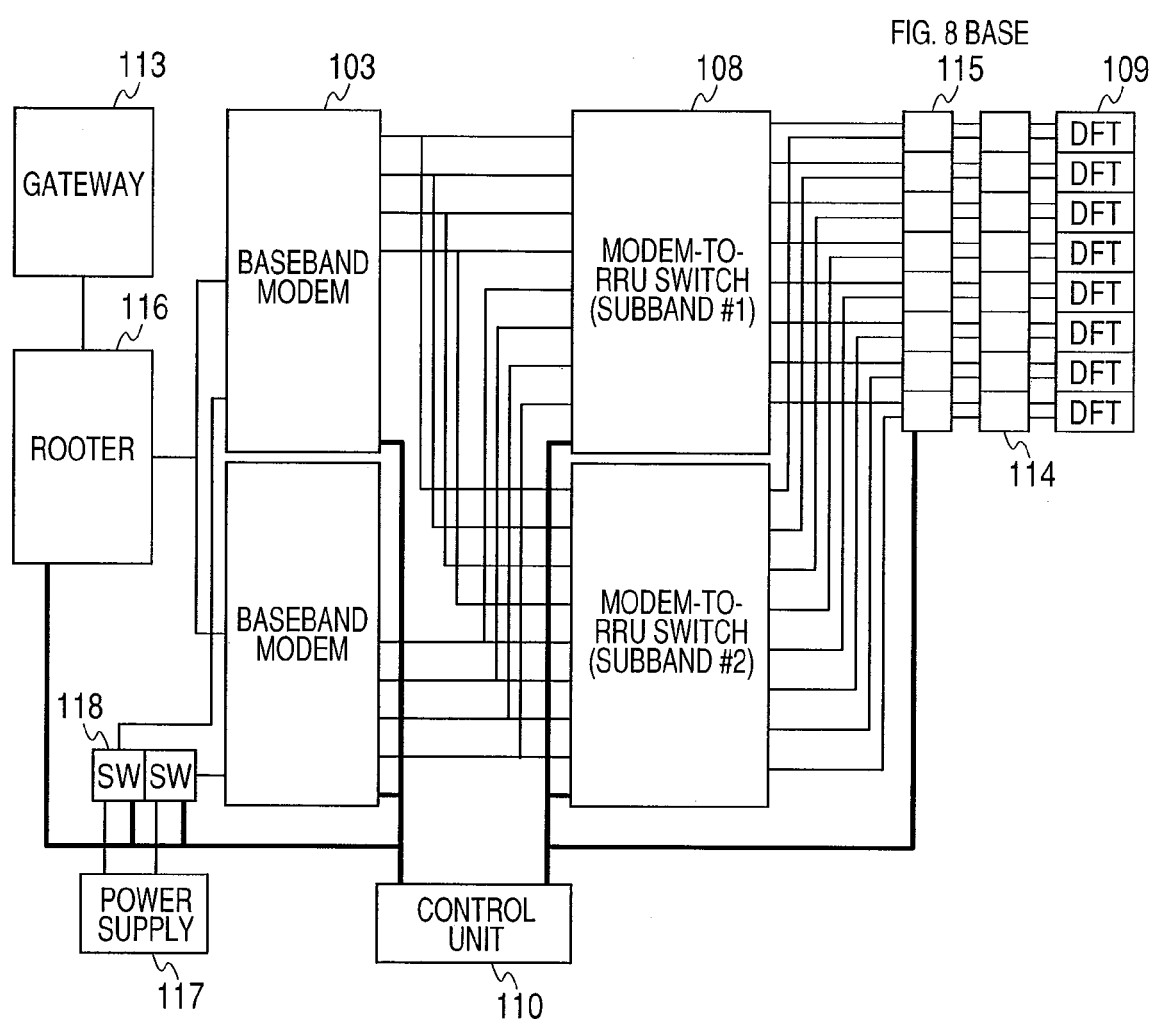
FIG. 25 is a block diagram showing the configuration of a network device for reducing the power consumption of the baseband modem in the entire radio communications system according to the first embodiment of the present invention.

FIG. 25 is a block diagram showing the configuration of a network device for reducing the power consumption of the baseband modem in the entire radio communications system according to the first embodiment of the present invention.

To the configuration of the network device shown in FIG. 5 are added a router 116 that distributes data among the baseband modems 103, a power supply 117, power supply switches 118 for controlling on/off changeover of power supply to the respective baseband modems 108, which are disposed between the power supply 117 and the respective baseband modems 103, data mask processing units 115 for preventing unnecessary radiation of interference in the downlink communication, and cell specific signal insertion units 114 for inserting a signal specific to each cell 101 formed by one or plural front end portions 105. Upon receiving an instruction from the control unit 110, the router 116 distributes the data communication for each of the terminals 102 to the baseband modem 103. The control unit 110 allocates the baseband modems 103 to each of the terminals 102 referring to information on the cells 101 connected to each of the baseband modems 103 and the terminals 102 belonging to the cell 101.

The power supply switch 118 receives an instruction of on/off from the control unit 110 according to the processing shown in FIGS. 23A and 23B.

The data mask processing unit 115 is located at a post stage of the modem-to-RRU switch 108 for the downlink communication, and executes data mask processing for preventing unnecessary radiation of interference, that is, discards data.

Figure 26A:
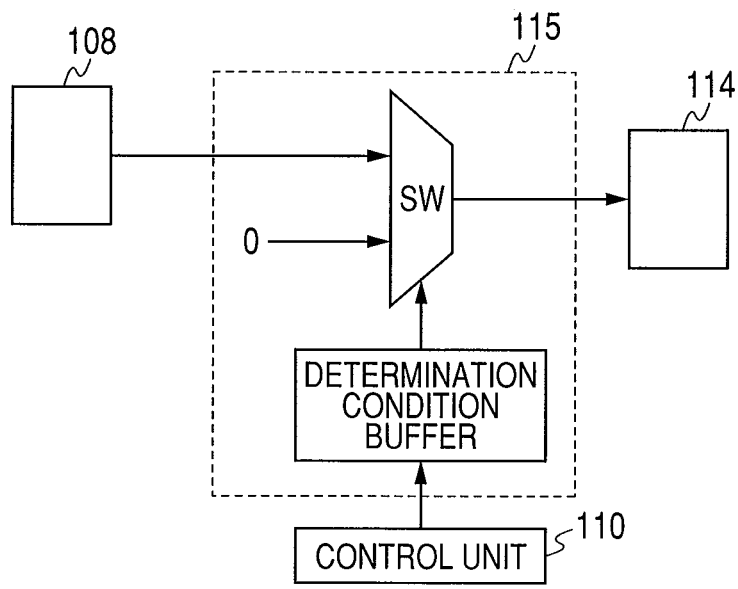
FIG. 26A is a block diagram showing a data mask processing unit according to the first embodiment of the present invention.

FIG. 26A is a block diagram showing the data mask processing unit 115 according to the first embodiment of the present invention.

The data mask processing unit 115 outputs the data signal transmitted from the modem-to-RRU switch 108 as it is, or outputs 0, and executes a changeover of whether the received data signal is discarded, or not. In the data mask processing unit 115, because the data signal to the cells 101 to which the data signal does not need to be transmitted as it is discarded, the data mask processing unit 115 receives, from the control unit 110, information on IDs of the cells 102 to which the received output needs to be output as it is in advance, stores the information in a determination condition buffer, and controls the switch on the basis of the determination condition buffer.

Figure 26B:
FIG. 26B is an explanatory diagram showing header addition for implementing data mask processing according to the first embodiment of the present invention.

The baseband modem 103 generates the data signal shown in FIG. 26B in order to make the changeover of the data signal by the data mask processing unit 115 effective.

FIG. 26B is an explanatory diagram showing header addition for implementing data mask processing according to the first embodiment of the present invention.

The baseband modem 103 adds a header including the information on the ID of the destination cell 101 to the data signal, and outputs the data signal as it is if the added header is identical with the ID of the cell 101 stored in the determination condition buffer, and outputs 0 if not identical.

Figure 27:
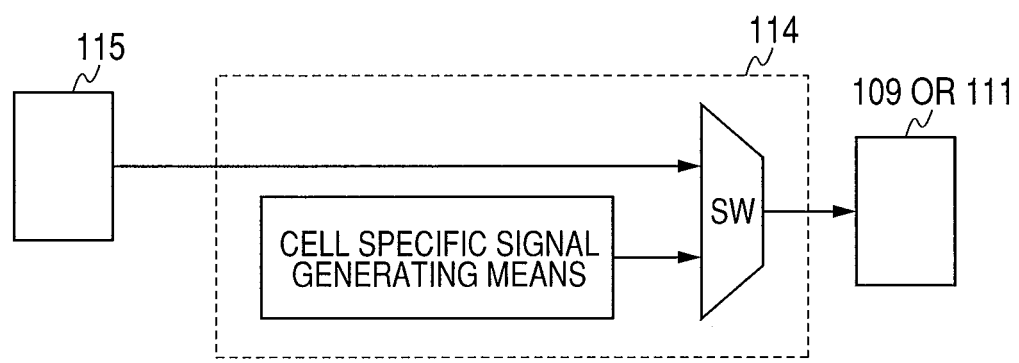
FIG. 27 is a block diagram showing a cell specific signal generation unit according to the first embodiment of the present invention.

FIG. 27 is a block diagram showing the cell specific signal generation unit 114 according to the first embodiment of the present invention.

The cell specific signal generation unit 114 changes over between the output of the data mask processing unit 115 and the output of the cell specific signal generating means. The cell specific signal generating means is configured to generate the signal specific to the cell 101, generates the common control signal and the synchronization signal by a method defined by protocol, and serves as resource mapping that allocates the common control signal and the synchronization signal to the resource defined by the protocol.

Figure 28:
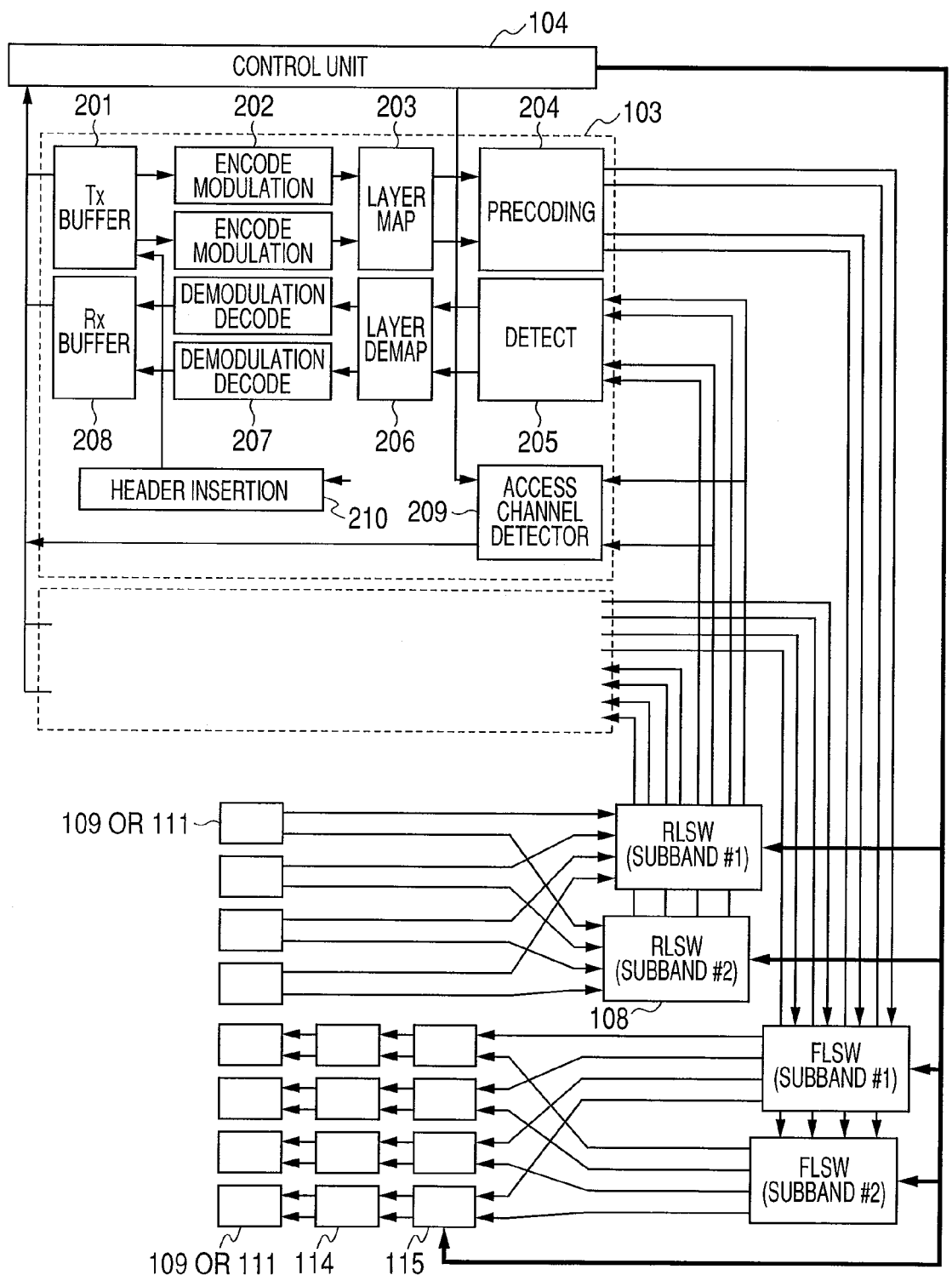
FIG. 28 is an explanatory diagram showing the detailed configuration of the network device for reducing the power consumption of the baseband modem in the entire system according to the first embodiment of the present invention.

FIG. 28 is an explanatory diagram showing the detailed configuration of the network device for reducing the power consumption of the baseband modems 103 in the entire system according to the first embodiment of the present invention.

The configuration of the network device shown in FIG. 28 adds, to the configuration of the network device shown in FIG. 7, a header insertion unit 210, an access signal analysis unit 209, a data mask unit 115, and a cell specific signal insertion unit 114. The data mask unit 115 and the cell specific signal insertion unit 114 are identical with the data mask unit 115 and the cell specific signal insertion unit 114 shown in FIG. 25.

The header insertion unit 210 has a function of adding the header to the data signal shown in FIG. 28B. The header insertion unit 210 adds the ID of the cell 101 to which the terminal 102 belongs to the header when the data signal addressed to a specific terminal 102 is input to the coding/demodulation unit 202 from the transmit buffer 201.

The access signal analysis unit 209 analyzes an access signal transmitted from the terminals 102, and identifies the cell 101 that is required to be connected by the terminal 102 which has transmitted the access signal. The access signal transmitted by the terminal 102 includes the cyclic shift quantity of the access signal series (for example, PN series or Zadoff-Chu series) of a specific low mutual correlation, with the cyclic shift quantity being changed for each of the cells 101. The access signal analysis unit 209 specifies the cyclic shift quantity to clarify a relationship between the terminals 102 and the cells 101. Because the baseband modem 103 may be connected to the plurality of cells 101, in this case, the baseband modem 103 specifies the most likely cyclic shift quantity while changing the cyclic shift quantity by the number of the cells 101 connected to the baseband modem 103. The expression "most likely" means that the mutual correlation of the access signal received from the terminals 102 and the known access signal series whose cyclic shift quantity is changed is calculated by, for example, a matched filter with the result that the highest mutual correlation is obtained.

An embodiment described below uses a network configuration different from the network configuration used in the first embodiment of the present invention.

Figure 29:
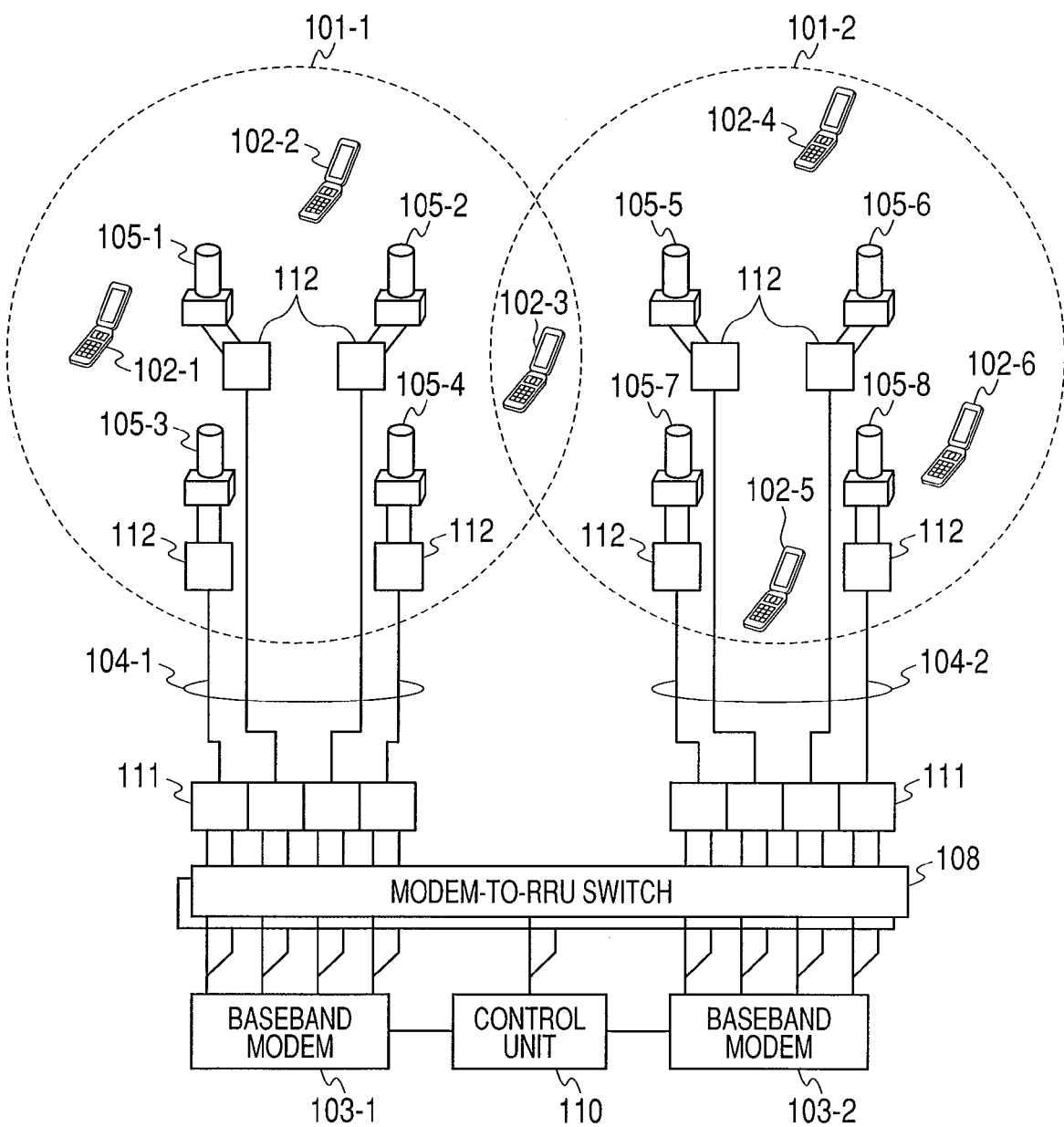
FIG. 29 is an explanatory diagram showing the configuration of a network system according to a second embodiment of the present invention.

FIG. 29 is an explanatory diagram showing the configuration of a network system according to a second embodiment of the present invention.

The first embodiment uses the OFDM radio communications system whereas the second embodiment shown in FIG. 29 uses the general multicarrier radio communications system. A difference from the configuration of the first embodiment resides in both ends of the optical fiber 104. When the optical fibers 104 are allocated to the signals of the respective carriers in the multicarrier radio communications system, individually, the radio communications system can be implemented by providing an optical modulator/demodulator and an electrical/optical converter which to each of the optical fibers. However, when the optical fiber is allocated to each of the carriers, because the costs for providing the optical fibers are increased, it is desirable to transmit the signals of the plural carriers by one optical fiber. For that reason, the radio communications system according to the second embodiment includes multicarrier coupling/separation units 111 and multicarrier coupling/separation units 112 for coupling the signals of the plural carriers together or separating those signals from each other, at both ends of the optical fibers 104.

Figure 30:
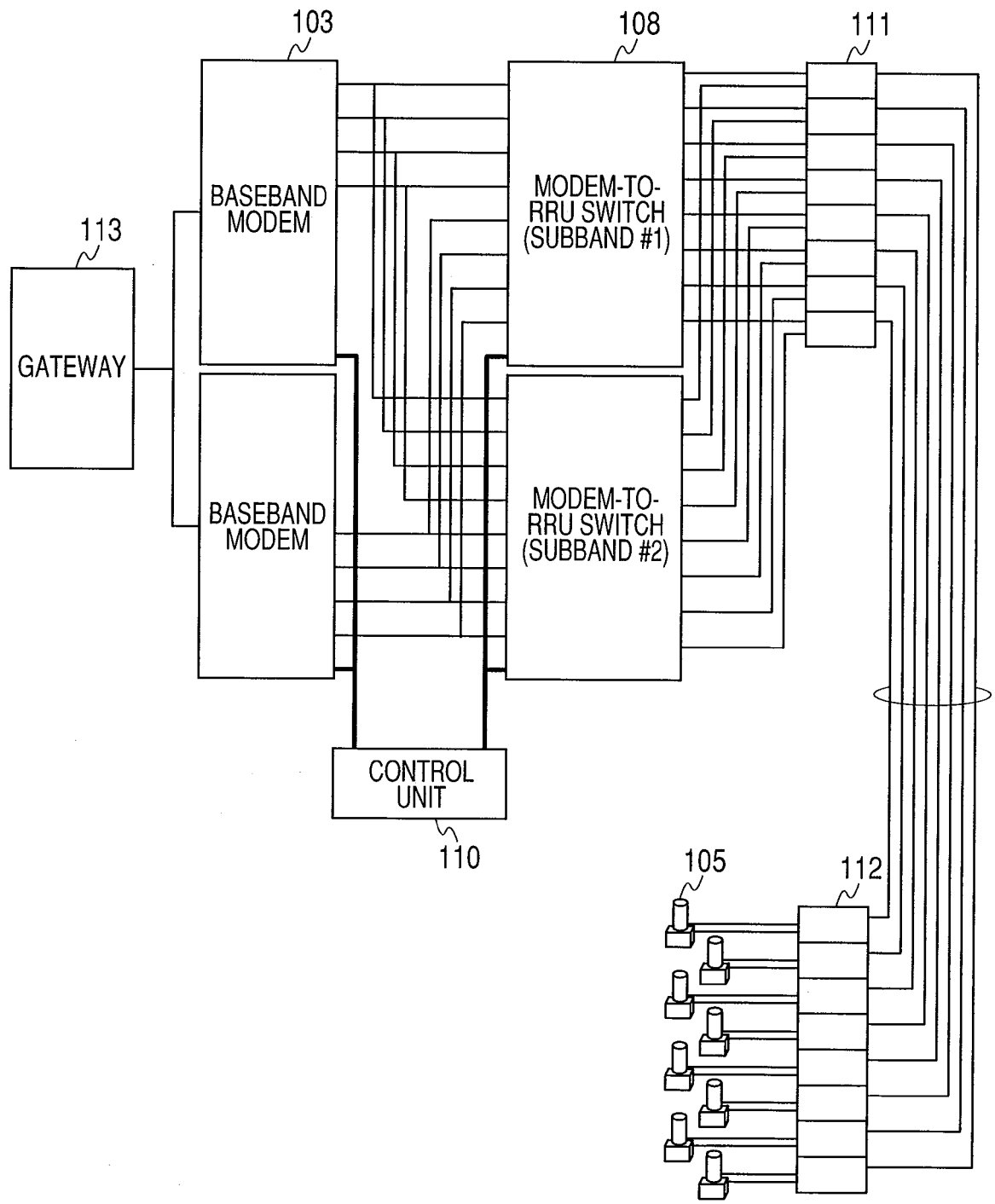
FIG. 30 is an explanatory diagram showing the configuration of a network device according to the second embodiment of the present invention.

FIG. 30 is an explanatory diagram showing the configuration of a network device according to the second embodiment of the present invention.

A difference from the configuration of the network device according to the first embodiment shown in FIG. 5 resides in that the multicarrier coupling/separation units 111 and the multicarrier coupling/separation units 112 for coupling the signals of the plural carriers together or separating those signals from each other are disposed at both ends of the optical fibers 104 instead of the DFT processing units 109. The multicarrier coupling/separation units 111 each have a downlink multiplexer and an uplink demultiplexer. Also, the multicarrier coupling/separation units 112 each have an uplink multiplexer and a downlink demultiplexer. A method of multiplexing the signals of the plural carriers includes time division multiplexing, frequency division multiplexing, waveform multiplexing, and so on.

Figure 31:
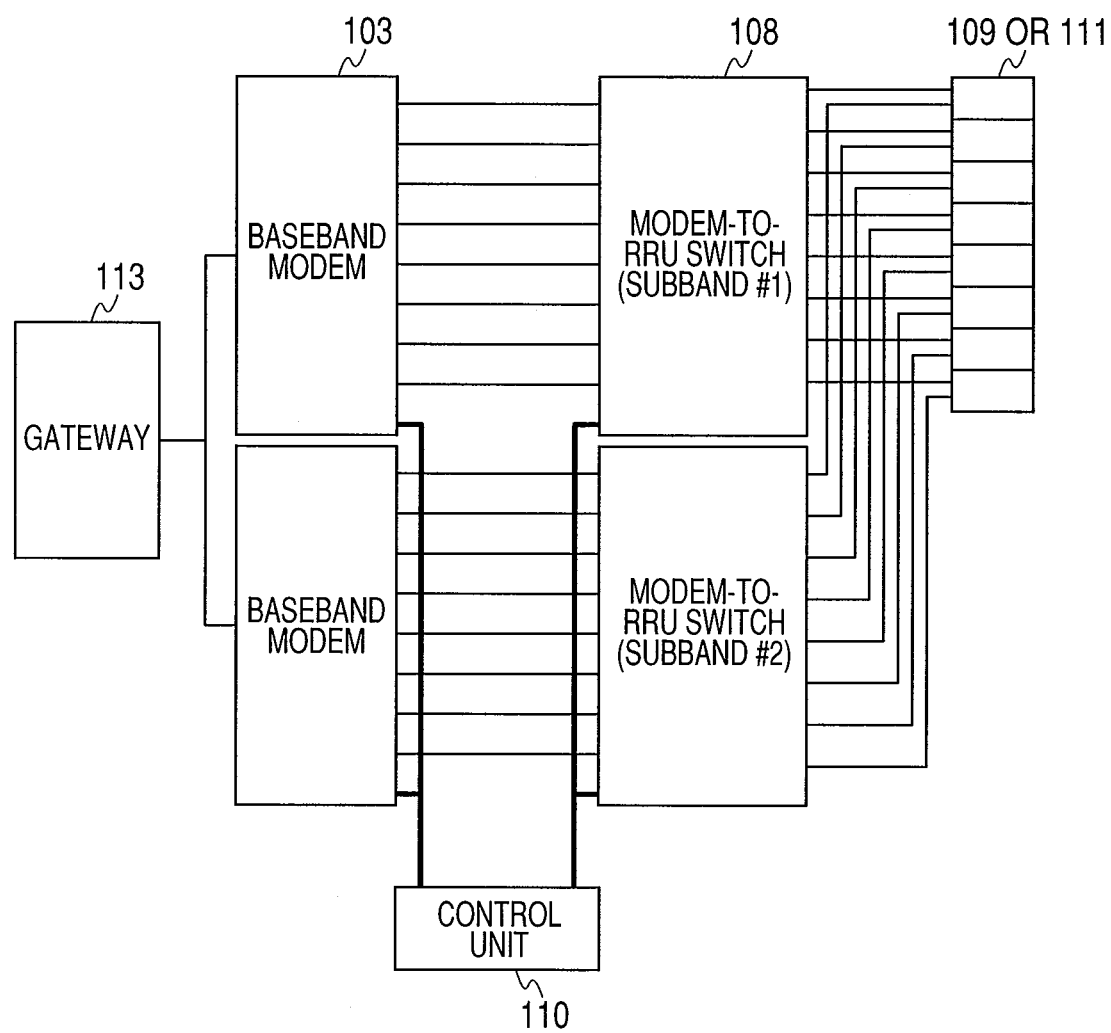
FIG. 31 is an explanatory diagram showing the configuration of a network device according to a third embodiment of the present invention.

FIG. 31 is an explanatory diagram showing the configuration of a network device according to a third embodiment of the present invention.

The termination of the optical fibers 104 is the DFT processing units 109 in the first embodiment shown in FIG. 5, and the multicarrier coupling/separation units 111 in the second embodiment shown in FIG. 30.

In the configuration of the network device according to the third embodiment, each of the baseband modems 103 executes the signal processing of the subband being a control unit of the modem-to-RRU switch 108 at the plurality of antenna ports in a lump. According to the third embodiment, switching of each subband between the baseband modems 103 and the modem-to-RRU switches 108 is not required with the result that the array wiring in the same section is eased.

Figure 32:
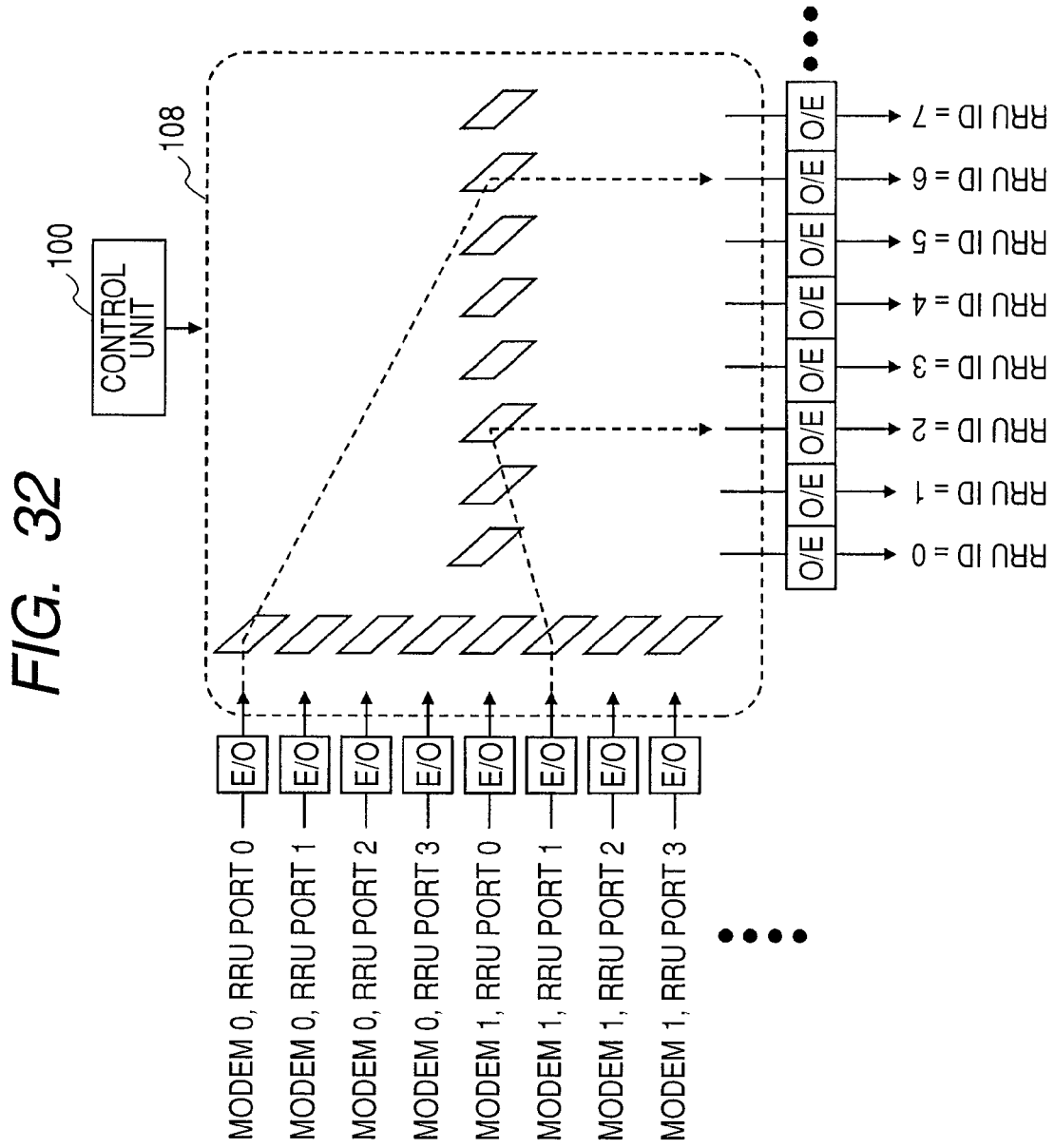
FIG. 32 is an explanatory diagram showing a modem-to-RRU switch according to a fourth embodiment of the present invention.

FIG. 32 is an explanatory diagram showing the modem-to-RRU switch 108 according to a fourth embodiment of the present invention.

The modem-to-RRU switch 108 shown in FIG. 32 is implemented by a 3D-MEMS (3 Dimensions-Micro Electro Mechanical Systems) optical switch.

The mirrors at the input port side are so aligned as to reflect the input signal by all of the output side mirrors, and may be aligned, for example, in the height direction. The mirrors at the output port side are so aligned as to output the signals reflected from any input port side mirror to the output port, and may be aligned, for example, in a planar direction. The control unit 110 controls an orientation of the mirrors for each of the subbands.

Electro/optical converters (E/O) are disposed at the input side of the modem-to-RRU switch 108, and optical/electric converters (O/E) are disposed at the input side thereof. However, in the case where the radio communications system according to the present invention is not a system that requires the DFT processing as in the general multicarrier radio communications system, because the front end portion 105 side (output in the downlink communication, and input in the uplink communication) accepts an optical signal, the O/E conversion at the downlink output side and the E/O conversion at the uplink input side are unnecessary. In addition, the downlink E/O conversion and the uplink O/E conversion of the termination of the optical fibers 104 at the modem-to-RRU switch 108 side are unnecessary.

Figure 33:
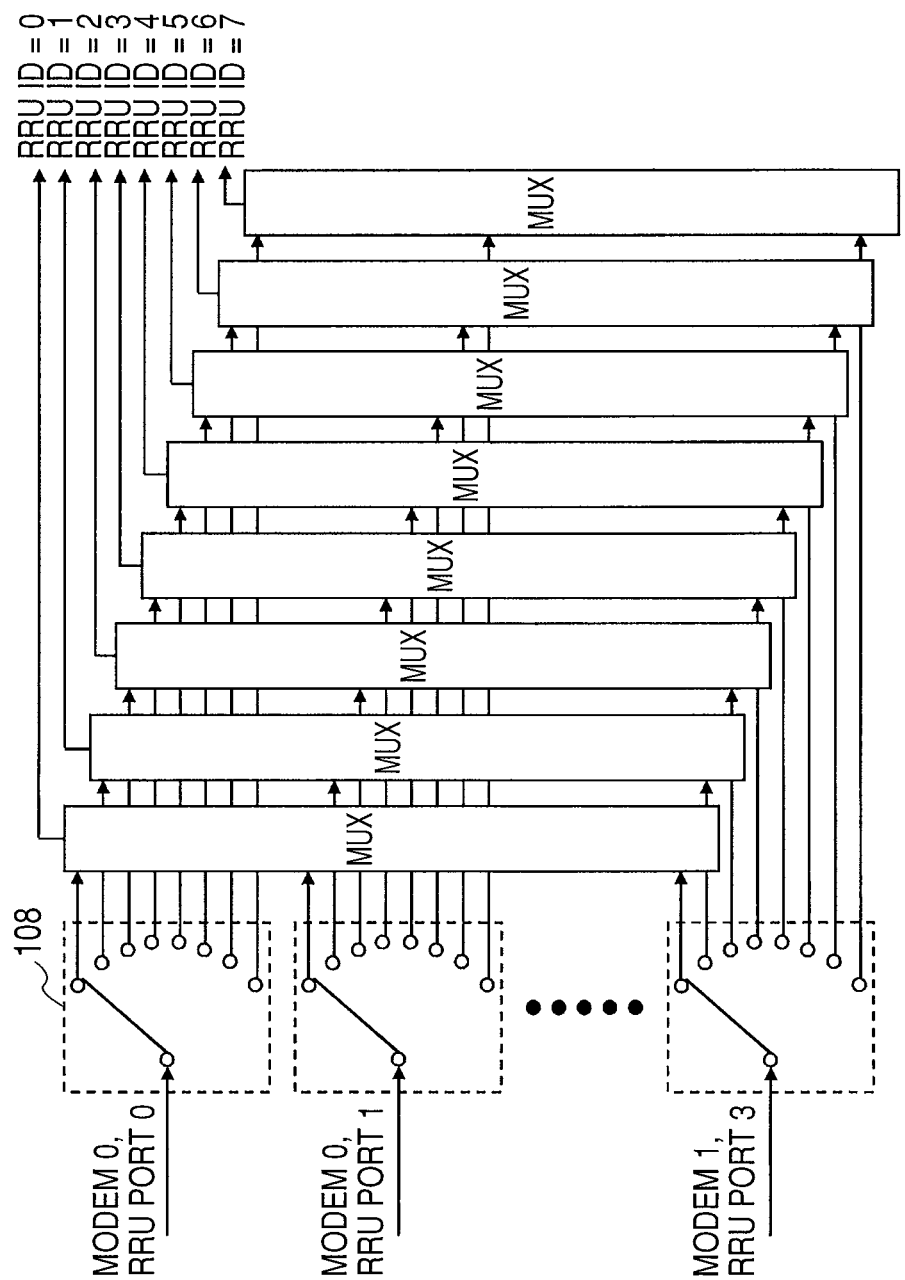
FIG. 33 is an explanatory diagram showing a modem-to-RRU switch according to a fifth embodiment of the present invention.

FIG. 33 is an explanatory diagram showing the modem-to-RRU switches 108 according to a fifth embodiment of the present invention.

The modem-to-RRU switches 108 shown in FIG. 33 are each implemented by a rotary switch. Because the rotary switch is manually changed over, the rotary switch is applied to a case in which the configuration of the cell 101 is fixedly employed in the small scaled radio communications system. The modem-to-RRU switches 108 shown in FIG. 33 are provided with the rotary switch at each of the input ports, and synthesize and output the outputs of a rotary switch having all input ports at each of the output ports. The modem-to-RRU switch 108 is disposed in each of the subbands, and can be implemented by changing the respective switch setting.

Figure 34:
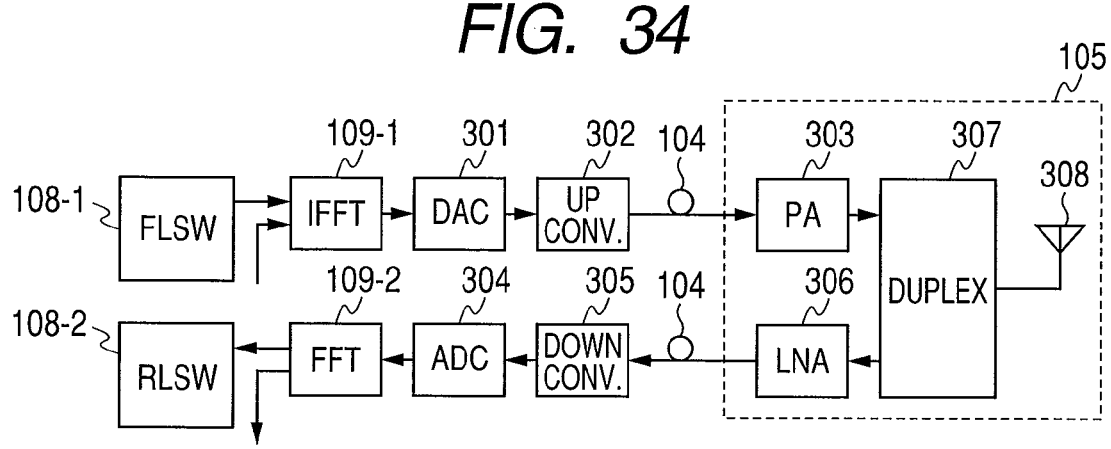
FIG. 34 is a block diagram showing a connection between the modem-to-RRU switch and the front end portion in an OFDM system according to a sixth embodiment of the present invention.

FIG. 34 is a block diagram showing, a connection between the modem-to-RRU switches 108 and the front end portion 105 in an OFDM system according to a sixth embodiment of the present invention.

FIG. 34 shows the configuration in which the analog signal of the radio frequency band is transmitted by the optical fibers 104. The configuration shown in FIG. 34 is generally called "RoF (Radio on Fiber)".

The feature of the configuration shown in FIG. 34 resides in that the components including the up converter 302 and the down converter 305 shown in FIG. 8 are disposed at the modem-to-RRU switch 108 side, and the optical fibers 104 are located at positions shown in FIG. 34, thereby making it possible to easily mount the front end portion 105. However, when the analog signal is transmitted by the optical fibers 104, the EVM (error vector magnitude) of the signal is increased by a group delay within the optical fibers to lower the upper limit of the SINR (Signal to Interference plus Noise Ratio) of the signal. As a result, it is difficult to transmit the analog signal at a high speed. Also, the EVM is more increased as a distance by which the signal is transmitted in the optical fiber 104 is longer.

From the above features, the configuration shown in FIG. 34 is adapted to a case in which a large number of front end portions 105 are arranged in an indoor (for example, buildings or underground) in which the wiring length of the optical fibers is short. The configuration shown in FIG. 8 is small in the degradation of EVM because of the transmission of the baseband digital signal, and can transmit the signal in the optical fiber 104 at a long distance and at a high speed. Accordingly, the configuration shown in FIG. 8 is suitable for a cellular system having the front end portions 105 outdoor.

Figure 35:
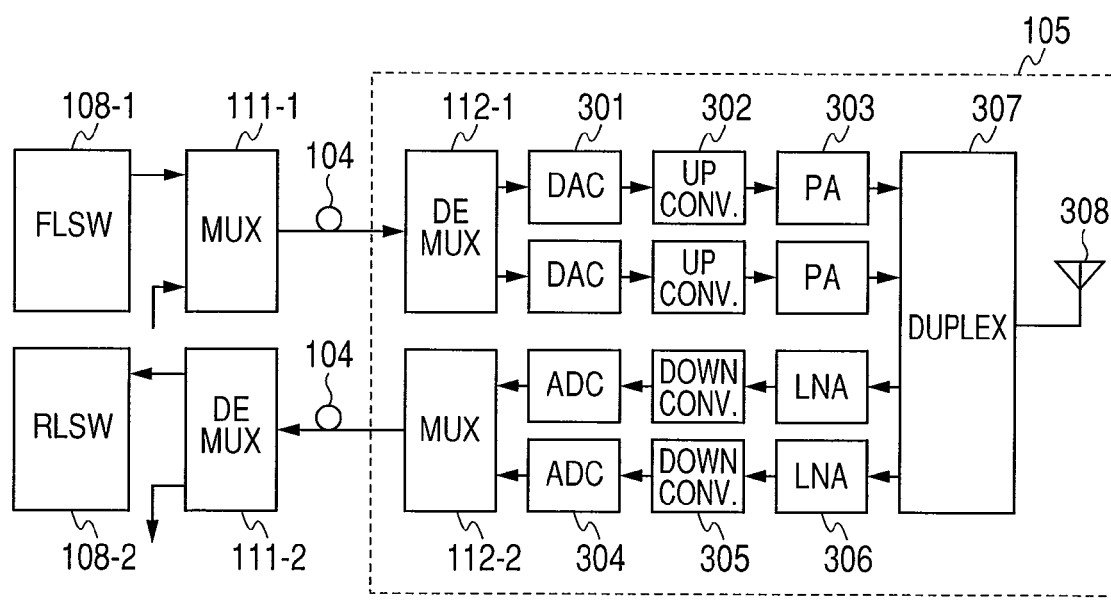
FIG. 35 is a block diagram showing a connection between the modem-to-RRU switch and the front end portion in a general multicarrier system according to a seventh embodiment of the present invention.

FIG. 35 is a block diagram showing a connection between the modem-to-RRU switch 108 and the front end portion 105 in a general multicarrier system according to a seventh embodiment of the present invention.

The configuration shown in FIG. 35 is a configuration in a case where two carriers are used, and the multicarrier system in the case where three or more carriers are used is implemented by the same configuration as that shown in FIG. 35. Also, the configuration shown in FIG. 35 is based on the configuration shown in FIG. 8. On the other hand, when the configuration in FIG. 35 is based on the configuration shown in FIG. 34, the multicarrier coupling/separation units 111 and 112 are disposed between the up converter 302 and the power amplifier 303 in the downlink communication, and between the low noise amplifier 306 and the down converter 305 in the uplink communication, respectively. The DAC 301 and the ADC 304 for each of the subbands are connected directly to the modem-to-RRU switch 108 for each of the subbands.

The feature of the configuration shown in FIG. 35 resides in that for the purpose of transmitting the signals for the plurality of subbands by one optical fiber 104, the multicarrier coupling/separation units 111 and 112 are disposed at both ends of the optical fibers 104. The analog signal for each of the subbands is processed within the front end portion 105. Also, the up converters 302 and the down converters 305 transmit the signal at a radio frequency different in each of the subbands. As a result, the up converters 302 and the down converters 305 are disposed at each of the subbands, separately, and execute parallel processing.

The components other than the up converters 302 and the down converters 305 may be shared between the subbands. It is difficult to share the DAC 301 and the ADC 304 between the subbands because the sampling rate is different between the subbands. On the other hand, the power amplifier 303 and the low noise amplifier 306 can be shared between the subbands if the plurality of subbands falls within the frequency band at which the respective amplifiers can ensure the performance. In the case where the power amplifier 303 and the low noise amplifier 306 are shared between the subbands, a multiplexer is added to the input source of the power amplifier 303.

Figure 36:
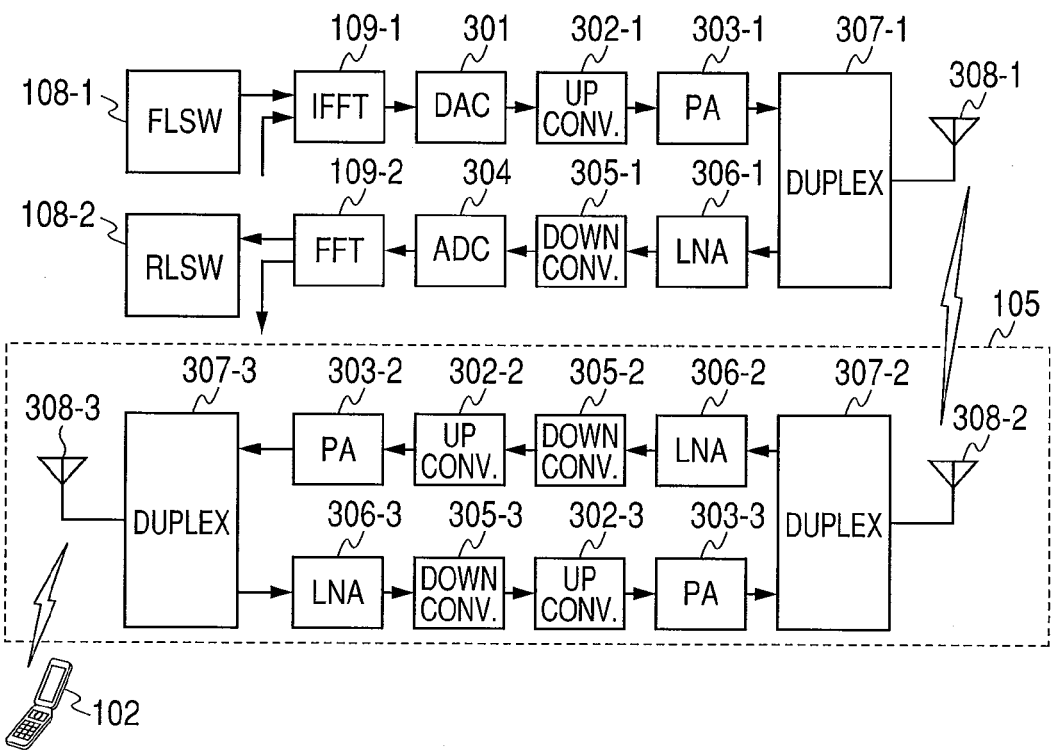
FIG. 36 is a block diagram showing the configuration of wirelessly connecting the modem-to-RRU switch and the front end portion according to an eighth embodiment of the present invention.

FIG. 36 is a block diagram showing the configuration of wirelessly connecting the modem-to-RRU switch 108 and the front end portion 105 according to an eighth embodiment of the present invention.

The front end portion 105 shown in FIG. 36 has a function of a repeater that amplifies and relays the signal.

The modem-to-RRU switch 108 shown in an upper half of FIG. 36 is added with an IFFT processing unit 109-1, an FFT processing unit 109-2, a DAC 301, an ADC 304, an up converter 302, a down converter 305, a power amplifier 303, a low noise amplifier 306, a duplexer 307, and an antenna 308-1. The modem-to-RRU switch 108 wirelessly communicates with the front end portion 105 shown in a lower half of FIG. 36 by the antenna 308-1.

The front end portion 105 includes an antenna 308-2 that conducts a radio communication with the modem-to-RRU switch 108, and a duplexer 307-2 for sharing the antenna 308-2 in the uplink communication and the downlink communication.

Upon receiving the downlink signal from the modem-to-RRU switch 108, the front end portion 105 amplifiers the received downlink signal, that is, the signal that has been converted into the downlink radio frequency band by a low noise amplifier 306-2, and returns the amplified downlink signal to the baseband by a down converter 305-2. Then, the downlink signal returned to the baseband is transmitted to the terminal 102 via a duplexer 307-3 and an antenna 308-3 at the terminal side after having passed through an up converter 302-2 for converting the downlink signal into a frequency band for conducting a radio communication with the terminal 102, and a power amplifier 303-2 for amplifying the radio signal.

The signal of the uplink radio frequency band which has been transmitted from the terminal 102 is received through the antenna 308-3 and the duplexer 307-3. The received uplink signal is amplified by the low noise amplifier 306-3, and then transmitted to a down converter 305-3 for returning the uplink signal that has been up-converted in the terminal 102 to the baseband. The uplink signal is then transmitted to the antenna 308-1 through the duplexer 307-2 and the antenna 308-2 after having passed through an up converter 302-3 for converting the uplink signal into a frequency band for conducting a radio communication with the modem-to-RRU switch 108, and a power amplifier 303-3 that amplifies the radio signal.

In the configuration shown in FIG. 36, the radio frequency band between the modem-to-RRU switch 108 and the front end portion 105, and the radio frequency band between the front end portion 105 and the terminal 102 may be identical with each other, or may be different from each other.

According to the configuration shown in FIG. 36, the costs for disposing the optical fibers 104 between the modem-to-RRU switches 108 and the front end portions 105 can be reduced. However, in the configuration shown in FIG. 36, the components for transmitting and receiving the radio signal are added to the modem-to-RRU switch 108 and the front end portion 10, to thereby require higher costs. Also, because the radio frequency band is newly required, the existing radio frequency band is tightened.

Figure 37:
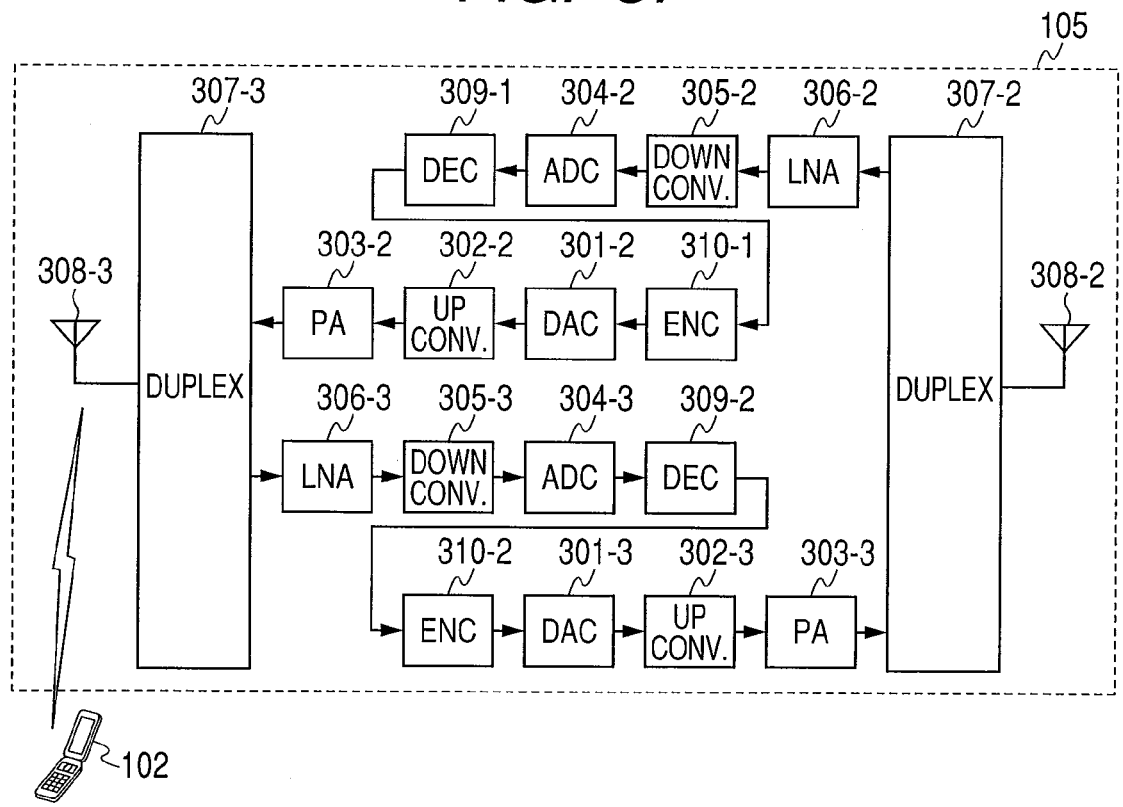
FIG. 37 is a block diagram showing the configuration of wirelessly connecting the modem-to-RRU switch and the front end portion according to a ninth embodiment of the present invention.

FIG. 37 is a block diagram showing the configuration of wirelessly connecting the modem-to-RRU switch 108 and the front end portion 105 according to a ninth embodiment of the present invention.

The front end portion 105 shown in FIG. 37 is added with an encoder and a decoder which function as the baseband modem, and has a function of a repeater that performs decode and forward (a function of returning the signal added with noises through transmission to the signal before transmission). The modem-to-RRU switch 108 that communicates with the front end portion 105 shown in FIG. 37 is identical with the modem-to-RRU switch 108 shown in the upper half of FIG. 36, and the configuration added to the modem-to-RRU switch 108, and therefore the modem-to-RRU switch 108 will be omitted from FIG. 37.

The front end portion 105 amplifies the downlink signal received from the modem-to-RRU switch 108 by the low noise amplifier 306-2, and down-converts the amplified downlink signal by the down converter 305-2. Thereafter, the front end portion 105 converts the down-converted downlink signal into a baseband digital signal by the analog to digital converter 304-2. Thereafter, the front end portion 105 decodes the downlink signal by the decoder 309-1 that performs channel estimation and decoding. The front end portion 105 subjects the downlink signal to processing of decoding, modulation to IFFT in the encoder 310-1 for the purpose of reproducing and repeating the decoded downlink signal. The front end portion 105 converts the output from the encoder 310-1 into a baseband analog signal by the digital to analog converter 301-2, converts the baseband analog signal into a radio frequency band analog signal by the up converter 302-2, and amplifies the radio frequency band analog signal by the power amplifier 303-2. The amplified signal is wirelessly transmitted to the terminal 102 through the duplexer 307-3 and the antenna 308-3. The uplink signal from the terminal 102 is subjected to inverse processing of the processing conducted on the downlink signal, and then transmitted to the modem-to-RRU switch 108.

According to the first embodiment of the present invention, as in the configuration of the network system shown in FIG. 1, the switch between the baseband modem 103 and the front end portion 105 is configured by the modem-to-RRU switch 108 that is switchable for each of the subbands, thereby enabling the object of the present invention to be achieved.

More specifically, as shown in FIG. 2A, the subband that sets the modem-to-RRU switch 108 as in the related art, and the cell configuration different from that in FIG. 2A are formed for each of the subbands as with the configuration of the cells 101 shown in FIG. 2B. As a result, the terminal 102 is located at the cell boundary in the subband of FIG. 2A, but located at a place (the center of the cell in the example of FIG. 2B) being not the cell boundary in the subband of FIG. 2B, thereby enabling such an object that the cell boundary is eliminated to be achieved.

Also, the modem-to-RRU switch 108 is changed over according to the traffic distribution of the terminal 102. As a result, the load among the baseband modems 103 can be dispersed, and the power consumption of the entire radio communications system is reduced.

With the provision of the modem-to-RRU switch 108 switchable for each of the subbands, the elimination of the boundary of the cells 101 in the entire radio communications system, and a reduction in the power consumption in the entire system due to the load dispersion can be compatibly achieved.

Also, according to the first embodiment of the present invention, the front end portion 105 that forms the cell 101 for each of the subbands, or the combination thereof can be selected, individually, and the configuration of the cell 101 for each of the subbands can be changed. Because the terminal that is located at the cell boundary in one subband is located at a place being not the cell boundary in another subband, the communication quality at each of the terminals is improved.

Also, at least one front end portion 105 is shared between the subbands or between the time symbols, as a result of which the shared front end portion 105 can transmit the common control signal and the common synchronization signal between the subbands for each of the subbands. Therefore, it is unnecessary to manage and operate the complicated control signal and the complicated synchronization signal between the subbands.

Also, the position of the anchor subband or the anchor symbol is predetermined in the system, and the control signal and the synchronization signal common between the subbands can be transmitted by the anchor subband or the anchor symbol. Also, because the terminal 102 presets the position of the anchor subband or the anchor symbol as a given value, it is easy to grasp the control signal and the synchronization signal.

Also, the front end portion 105 or the combination thereof is selected according to the load of signal processing to select the front end portion 105 reduced in the load or the combination thereof, and the same data signal can be broadcasted by the plural front end portions 105 or the combination thereof. As a result, the power consumption can be reduced in proportion to the number of units that executes the data signal processing, or the number of operating devices.

Also, the load information can be collected for each of the front end portions 105 or each of the combinations thereof, and on the basis of that load information, the same data signal can be broadcasted by the plurality of front end portions 105 or the combination thereof as the occasion demands. As a result, the number of baseband modems 103 or the number of operating baseband modems 103 can be reduced in proportion to the number of the broadcasted same data signals to reduce the power consumption.

Also, the load information can be collected for each of the baseband modems 103. A small number of front end portions 105 or the combination thereof are allocated to the baseband modem 103 heavy in the load, and a large number of front end portions 105 or the combination thereof are allocated to the baseband modem 103 light in the load, thereby enabling the load between the baseband modems 103 to be dispersed. As a result, the power consumption can be reduced in proportion to the number of baseband modems 103 or the number of operating baseband modems 103.

Also, the modem-to-RRU switch 108 is introduced between the baseband modem 103 and the front end portion 105, and the modem-to-RRU switch 108 is controlled for each of the subbands, individually, to thereby eliminate the boundary of the cell 101 in at least one subband with respect to the terminal 10 to improve the communication quality.

Also, the modem-to-RRU switch 108 is changed over on the basis of the load information to reduce the power consumption.

Also, the transmit signal from the baseband modem 103 is output to the plurality of front end portions 105 by the modem-to-RRU switch 108, thereby enabling the cells and the service area which are connected with the baseband modem 103 to be broadened. As a result, the number of baseband modems 103 necessary to cover all of the service areas can be reduced to reduce the power consumption.

Also, a part of the data signal, that is, the data signal addressed to the terminal 102 that cannot communicate with an front end portion 105 connected to the output port is discarded for each of the output ports, individually, with respect to the signal copied and output with respect to the plurality of output ports, to thereby reduce the unnecessary interference with respect to the data signal transmitted from front end portions 105 around that front end portion 105.

Also, the receive signals received by the plurality of front end portions 105 are synthesized by the modem-to-RRU switch 108, and input to one baseband modem 103, to thereby enable a service area covered by the baseband modem 103 to be broadened. As a result, the power consumption is reduced.

Also, the base modem 103 that is disconnected from the front end portion 105 by changing over the modem-to-RRU switch 108 comes to a state in which the communication path is blocked by the modem-to-RRU switch 108. In the baseband modem 103 whose communication path has been blocked, even if the power supply is blocked, the system is not stopped. For that reason, the power consumption is reduced by blocking the power supply of the baseband modem 103.

Also, the power supply of the baseband modem 103 turns on at the same time when the connection of the front end portion 105 starts by changing over the modem-to-RRU switch 108. As a result, when the load status of the signal processing in the entire system is saturated, the power supply of the baseband modem 103 whose power supply has been blocked turns on, to thereby increase the signal processing allowance in the entire system. As a result, an increase in the throughput in the entire system and per terminal can be improved.

Also, the appropriate number of baseband modems 103 is calculated taking the processing capacity and the real throughput of the baseband modem 103 into consideration. The state of the baseband modem 103 is transited on the basis of the results of comparing the calculated results with the number of baseband modems 103 that is in operation at the time point of calculation to normalize the number of operating baseband modems 103 according to the traffic status. For example, this prevents useless power consumption of the baseband modem 103 from occurring because the number of operating baseband modems 103 is too large as compared with the traffic status. Also, this prevents the throughput per terminal 102 from being degraded because the number of operating baseband modems 103 is too small as compared with the traffic status, and the number of terminals 102 processed by each baseband modem 103 becomes large.

Also, the processing of the baseband modem 103 that transits from in-operation to under-suspension is taken over by another baseband modem 103 that is in operation. As a result, the power consumption reduction effect caused by a reduction in the number of operating baseband modems 103 can be realized without blocking a communication between the baseband modem 103 and the terminal 102 due to a change of the baseband modem 103 which is a party communicating with the terminal 102.

Also, the baseband modem 103 that transits from under-suspension to in-operation takes over the processing from another baseband modem 103 that is in operation, thereby making it possible to increase the number of operating baseband modems 103 without blocking a communication between the baseband modem 103 and the terminal 102. As a result, the number of terminals 102 processed by each of the baseband modems 103 is reduced, and the throughput per terminal 102 is improved.

According to the second embodiment, in the interval between the modem-to-RRU switch 108 controllable for each of the subbands, individually, and the front end portion 105, at least one of the multiplexer that multiplexes the signals from the plural subbands, and the demultiplexer that demultiplexes the multiplexed signals for each of the subbands is provided, and the signal transmission in the interval is implemented by multiplexing the plural subbands. As a result, because it is unnecessary to ensure the communication path for each of the plural subbands, independently, the costs for constructing the communication paths in the interval can be reduced.

According to the seventh embodiment, the modem-to-RRU switch 108 and the front end portion 105 are connected to each other by a wired cable, and the signals obtained by multiplexing the plural subbands of the baseband digital signal are transmitted, thereby making it possible to suppress the degradation of EVM due to the group delay in the cable. Thus, the long-distance cable can be wired. As a result, a large number of front end portions 105 can be aggregated to the baseband modem 103, and the number of baseband modems 103 can be reduced by the statistical multiplexing effect, and the effect of the power consumption reduction due to a reduction in the number of operating baseband modems 103 can be enhanced.

According to the sixth embodiment, the modem-to-RRU switch 108 and the front end portion 105 are connected to each other by the wired cable, and the signals obtained by multiplexing the plural subbands of the analog signals in the radio frequency band are transmitted, thereby making it possible to simplify the device configuration at the front end portion 105 side. As a result, the installation costs of the front end portions 105 can be reduced.

According to the eighth embodiment, the signal is transmitted by the radio communication between the modem-to-RRU switch 108 and the front end portion 105, and radio communication means for implementing the radio communication in the interval is additionally provided to both of the modem-to-RRU switch 108 and the front end portion 105, with the result that the capable wired between the modem-to-RRU switch 108 and the front end portion 105 is unnecessary.

The interference between the cells, which is a serious problem with the radio communications system is removed by eliminating the cell boundary in at least one subband. As a result, the service gap between the terminals within the service area of the radio communications system can be eliminated. Also, the communication quality of the terminal which has been bottlenecked by the interference between the cells is improved, as a result of which the excessive resource allocation to the terminals is prevented from occurring, and the frequency use efficiency of the entire radio communications system is improved.

In addition, because the control unit controls the load dispersion so as to reduce the electric power consumed in the baseband modem, there can be provided the radio communications system that is good for the environment.

What is claimed is:

1. A radio communications system, comprising:
   at least one terminal communication unit having one or more antennas that conduct radio communication with a plurality of terminals;
   at least one baseband modem that generates and decrypts a data signal,
   wherein the baseband modem divides a radio frequency band used for the radio communication into two or more subbands, generates and decrypts the data signal specific to each of the divided subbands, and allocates the data signal specific to the respective subbands to the terminal communication unit, and
   wherein the terminal communication unit receives the data signal specific to the respective subbands generated by the baseband modem, and forms a configuration of cells for each of said subbands using the data signal specific to the received subbands and a combination of the antennas, in which the combination of the antennas configuring the cells is changed for each of the subbands;
   wherein the divided subbands include a first subband for transmitting a control data signal, and a second subband other than the first subband, and
   wherein the baseband modem allocates the data signal specific to the respective subbands to the terminal communication unit so that the data signal specific to the first subband is common to the respective cells.

2. The radio communications system according to claim 1, wherein the baseband modem allocates the data signal specific to the subband allocated to the at least one terminal communication unit that forms adjacent cells common to the subbands.

3. The radio communications system according to claim 1, wherein the baseband modem allocates the specific data signal to the terminal communication unit so that the control data signal common to the plurality of subbands is transmitted at a specific time.

4. The radio communications system according to claim 1, wherein the baseband modem determines the allocation of the terminal communication unit that forms the cells of the subband on the basis of information on a load on the radio communications system.

5. The radio communications system according to claim 4, wherein the baseband modem tallies the load information for each of the terminal communication units, or for each of the terminal communication units that form the cells of the subband.

6. The radio communications system according to claim 4, wherein the baseband modem tallies the load information for each of the baseband modems.

7. A radio communications system, comprising:
   at least one terminal communication unit having one or more antennas that conduct radio communication with a plurality of terminals;
   at least one baseband modem that generates and decrypts a data signal,
   wherein the baseband modem divides a radio frequency band used for the radio communication into two or more subbands, generates and decrypts the data signal specific to each of the divided subbands, and allocates the data signal specific to the respective subbands to the terminal communication unit, and
   wherein the terminal communication unit receives the data signal specific to the respective subbands generated by the baseband modem, and forms a configuration of cells for each of said subbands using the data signal specific to the received subbands and a combination of the antennas, in which the combination of the antennas configuring the cells is changed for each of the subbands;
   wherein the baseband modem and the terminal communication unit are connected to each other by a switch unit,
   wherein the switch unit receives the data signal specific to the received subbands of the baseband modem, and allocates a path for transmitting the specific data signal to the terminal communication unit to each of the subbands, and
   wherein the switch unit allocates a path for transmitting the specific data signal to the terminal communication unit to each of the subbands according to load information acquired by the baseband modem.

8. The radio communications system according to claim 7, wherein the switch unit copies one data signal received from the baseband modem or the terminal communication unit, and
   wherein each of the copied data signals is output from a plurality of ports.

9. The radio communications system according to claim 7, wherein the data signals output from the plurality of ports are discarded for each of the plurality of ports.

10. The radio communications system according to claim 7, wherein the switch unit synthesizes the data signal received from the baseband modem or the terminal communication unit, and outputs the synthesized data signal from one port.

11. The radio communications system according to claim 7, wherein the switch unit blocks the power supply of the baseband modem that does not transmit and receive the data signal with respect to the terminal communication unit.

12. The radio communications system according to claim 7, wherein the switch unit turns on a power supply of the baseband modem to which the path for transmitting and receiving the data signal with respect to at least one terminal communication unit is allocated.

13. The radio communications system according to claim 7,
   wherein the baseband modem and the switch unit are connected to the control unit,
   wherein the control unit acquires a transmit/receive quality of the data signal processed by the baseband modem and a throughput of the baseband modem, and
   wherein the control unit compares the acquired transmit/receive quantity with the acquired throughput, and allocates a part of the transmitted/received data signal to another baseband modem when it is determined that the throughput of the baseband modem is short as a result of the comparison.

14. The radio communications system according to claim 13, wherein when the power supply is blocked, another baseband modem takes over the transmit/receive of the data signal processed by the baseband modem.

15. The radio communications system according to claim 13, wherein when the power supply turns on, the baseband modem takes over the transmit/receive of the data signal processed by the another baseband modem.

16. A radio communications system, comprising:
   at least one terminal communication unit having one or more antennas that conduct radio communication with a plurality of terminals;
   at least one baseband modem that generates and decrypts a data signal,
   wherein the baseband modem divides a radio frequency band used for the radio communication into two or more subbands, generates and decrypts the data signal specific to each of the divided subbands, and allocates the data signal specific to the respective subbands to the terminal communication unit, and wherein the terminal communication unit receives the data signal specific to the respective subbands generated by the baseband modem, and forms a configuration of cells for each of said subbands using the data signal specific to the received subbands and a combination of the antennas, in which the combination of the antennas configuring the cells is changed for each of the subbands;

wherein the baseband modem and the terminal communication unit are connected to each other by a switch unit, wherein the switch unit receives the data signal specific to the received subbands of the baseband modem, and allocates a path for transmitting the specific data signal to the terminal communication unit to each of the subbands, and wherein a multiplexer that multiplexes the data signals for each of the subbands, and a demultiplexer that demultiplexes the multiplexed data signal for each of the subbands are disposed between the terminal communication unit and the switch unit.

17. The radio communications system according to claim 16, wherein the switch unit and the terminal communication unit are connected by at least one wired cable, and wherein the switch unit transmits the data signal specific to the subband which has been converted into a digital signal of a baseband by a wired cable.

18. The radio communications system according to claim 16, wherein the switch unit and the terminal communication unit are connected by at least one wired cable, and wherein the switch unit transmits the data signal specific to the subband which has been converted into an analog signal of a radio signal by a wired cable.

19. The radio communications system according to claim 16, wherein the switch unit and the terminal communication unit are connected by radio.

\* \* \* \* \*